US011574488B2

(12) United States Patent
Gesley et al.

(10) Patent No.: US 11,574,488 B2
(45) Date of Patent: *Feb. 7, 2023

(54) MACHINE LEARNING AND/OR IMAGE PROCESSING FOR SPECTRAL OBJECT CLASSIFICATION

(71) Applicant: Spynsite LLC, Oakland, CA (US)

(72) Inventors: Mark Gesley, Oakland, CA (US); Romin Puri, Sunnyvale, CA (US)

(73) Assignee: Spynsite LLC, Oakland, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/156,215

(22) Filed: Jan. 22, 2021

(65) Prior Publication Data
US 2021/0182635 A1    Jun. 17, 2021

Related U.S. Application Data

(63) Continuation of application No. 15/624,622, filed on Jun. 15, 2017, now Pat. No. 10,936,921.

(51) Int. Cl.
*G06K 9/00* (2022.01)
*G06K 9/62* (2022.01)
*G06V 30/194* (2022.01)
*G06V 10/143* (2022.01)
*G06V 10/145* (2022.01)
*G06V 20/69* (2022.01)

(52) U.S. Cl.
CPC ......... *G06V 30/194* (2022.01); *G06K 9/6223* (2013.01); *G06K 9/6269* (2013.01); *G06K 9/6274* (2013.01); *G06K 9/6277* (2013.01); *G06K 9/6286* (2013.01); *G06K 9/6287* (2013.01); *G06V 10/143* (2022.01); *G06V 10/145* (2022.01); *G06V 20/693* (2022.01); *G06V 20/695* (2022.01); *G06V 20/698* (2022.01); *G06K 9/6282* (2013.01); *G06V 2201/03* (2022.01)

(58) Field of Classification Search
None
See application file for complete search history.

(56) References Cited

U.S. PATENT DOCUMENTS

| | | | | |
|---|---|---|---|---|
| 6,269,323 B1 * | 7/2001 | Vapnik | ................ | G06F 17/17 706/20 |
| 8,095,483 B2 * | 1/2012 | Weston | ................ | G06N 20/10 706/62 |
| 8,913,121 B2 * | 12/2014 | Gesley | ................ | G01N 21/6458 348/79 |
| 10,936,921 B2 | 3/2021 | Gesley et al. | | |

(Continued)

OTHER PUBLICATIONS

Notice of Allowance, U.S. Appl. No. 15/624,622, dated Oct. 30, 2020, 10 Pages.

(Continued)

*Primary Examiner* — Avinash Yentrapati
(74) *Attorney, Agent, or Firm* — Berkeley Law & Technology Group, LLP

(57) ABSTRACT

In one embodiment, a method of machine learning and/or image processing for spectral object classification is described. In another embodiment, a device is described for using spectral object classification. Other embodiments are likewise described.

20 Claims, 17 Drawing Sheets

(56) References Cited

U.S. PATENT DOCUMENTS

| | | | | |
|---|---|---|---|---|
| 2006/0245631 | A1* | 11/2006 | Levenson | G06K 9/6247 382/133 |
| 2008/0317325 | A1* | 12/2008 | Ortyn | G01N 15/147 382/133 |
| 2009/0279081 | A1 | 11/2009 | Urano et al. | |
| 2010/0075373 | A1* | 3/2010 | Hoyt | G01N 1/30 435/40.5 |
| 2010/0111396 | A1* | 5/2010 | Boucheron | G06V 10/771 382/133 |
| 2010/0177950 | A1* | 7/2010 | Donovan | G16H 50/50 702/19 |
| 2011/0119213 | A1* | 5/2011 | Elisseeff | G16B 25/10 706/12 |
| 2011/0142301 | A1 | 6/2011 | Boroczky et al. | |
| 2012/0069170 | A1* | 3/2012 | Gesley | G01N 21/6458 348/79 |
| 2012/0136259 | A1 | 5/2012 | Milner et al. | |
| 2012/0269417 | A1* | 10/2012 | Bautista | G01N 1/312 382/133 |
| 2014/0286561 | A1* | 9/2014 | Remiszewski | G06V 30/1916 382/133 |
| 2015/0102216 | A1* | 4/2015 | Roder | G16B 40/20 250/281 |
| 2016/0110584 | A1* | 4/2016 | Remiszewski | G06V 20/69 382/133 |
| 2018/0365535 | A1 | 12/2018 | Gesley et al. | |

OTHER PUBLICATIONS

Chen, et al, "Microfluidic chip for blood cell separation and collection based on crossflow filtration," www.sciencedirect.com, Aug. 6, 2007, pp. 216-221.
Fisher, "The Use of Multiple Measurements in Taxonomic Problems," Reproduced from "Contributions to Mathematical Statics" (1950) by permission of John Wiley & Sons, Inc., pp. 465-475.
Harris, "Spectral Mapping Tools from the Earth Sciences Applied to Spectral Microscopy Data," International Society for Analytical Cytology, 2006, pp. 872-879.
Sollier, et al, "Passive microfluidic devices for plasma extraction from whole human blood," www.elsevier.com/locate/snb, 2009, pp. 617-624.
Lim, et al, "Light-scattering spectroscopy differentiates fetal from adult nucleated red blood cells: may lead to noninvasive prenatal diagnosis," May 1, 2009, vol. 34, No. 9, Optics Letters, pp. 1483-1485.
Lee, et al, "Treelets—An Adaptive Multi-Scale Basis for Sparse Unordered Data," The Annals of Applied Statistics, 2008, vol. 2, No. 2, pp. 435-471.
Alfano, "Preface to the Second Edition," The Supercontinuum Laser Source: Fundamentals with Updated References, Springer 2006, 3 pages.
Fianium, "Supercontinuum SC400 and SC450," New Product Datasheet, http://www.fianium.com/pdf/sc-400-450.pdf, Jan. 2010, 2 pages.
Sony, "Diagonal 11mm (Type 2/3) Progressive Scan CCD Image Sensor with Square Pixel for B/W Cameras," http://www.unibrain.com/download/pdfs/ub1394cam/ICX285AL.pdf, 2013, pp. 1-21.
Candes, et al, "The Dantzig Selector: Statistical Estimation When p is Much Larger than n1," The Annals of Statistics, 2007, vol. 35, No. 6, pp. 1-41.
Ding, et al, "K-Means Clustering via Principal Component Analysis," Proceedings of the 21st International Conference on Machine Learning, Banff, Canada, 2004, pp. 1-9.
Donoho, "Compressed Sensing," Department of Statistics Stanford University, Sep. 14, 2004, pp. 1-34.
Fisher, "The Use of Multiple Measurements in Taxonomic Problems," Annals of Eugenics, v. 7, 1936, pp. 465-475.
Friedman, Regularized Discriminant Analysis,: Department of Statistics & Stanford Linear Accelerator Center, Jul. 1988, pp. 1-32.
Goldberg, "What Every Computer Scientist Should Know about Floating-Point Arithmetic," Copyright 1991, Association for Computing Machinery, Inc., pp. 171-264.
Guo, et al, "A Study of Regularized Gaussian Classifiers in High-Dimension Small Sample Set Case Based on MDL Principle with Application to Spectrum Recognition," Elsevier Ltd., 2008, pp. 2842-2854.
Houle, et al, "Can Shared-Neighbor Distances Defeat the Curse of Dimensionality?," Proceedings of the 22nd International Conference of Scientific and Statistical Database Management, Jun. 31-Jul. 2, 2010, Heidelberg, Germany, 18 pages.
Hughes, "On the Mean Accuracy of Statistical Pattern Recognizers," IEEE, Downloaded Apr. 7, 2010, pp. 55-63.
Saito, et all, "Local Discriminant Bases," SPIE vol. 2303, 1994, pp. 1-13.
Smith, et al, "Integrated Raman and Angular Scattering Microscopy Reveals Chemical and Morphological Differences Between Activated and Nonactivated CD8+ T Lymphocytes," Journal of Biomedical Optics, May/Jun. 2010, vol. 15(3), pp. 1-11.
Tibshirani, "Regression Shrinkage and Selection via the Lasso," Journal of the Royal Statistical Society, Series B (Methodological), vol. 58, Issue 1, 1996, pp. 267-288.
Uzunbajakava, et al., "Nonresonant Raman Imaging of Protein Distribution in Single Human Cells," Biopolymers (Biospectroscopy), vol. 72, 2003, pp. 1-9.
Wu, et al, "Probability Estimates for Multi-class Classification by Pairwise Coupling," Journal of Machine Learning Research 5, 2004, pp. 975-1005.
Saad, et al, "Interative Solution of Linear Systems in the 20th Century," Journal of Computational and Applied Mathematics 123, 2000, pp. 1-33.
Golub, et al, "Eigenvalue Computation in the 20th Century," Journal of Computational and Applied Mathematics 123, 2000, pp. 35-65.
Watkins, "QR-like Algorithms for Eigenvalue Problems," Journal of Computational and Applied Mathematics 123, 2000, pp. 67-83.
Van Loan, "The Ubiquitous Kronecker Product," Journal of Computational and Applied Mathematics 123, 2000, pp. 85-100.
Morgan, "Preconditioning Eigenvalues and Some Comparison of Solvers," Journal of Computational and Applied Mathematics 123, 2000, pp. 101-115.
Parlett, "For Tridiagonals T Replace T with LDLt," Journal of Computational and Applied Mathematics 123, 2000, pp. 117-130.
Ipsen, "An Overview of Relative Sin Theorems for Invariant Subspaces of Complex Matrices," Journal of Computational and Applied Mathematics 123, 2000, pp. 131-153.
Sameh, et al, "The Trace Minimization Method for the Symmetric Generalized Eigenvalue Problem," Journal of Computational and Applied Mathematics 123, 2000, pp. 155-175.
Hadjidimos, "Successive Overrelaxation (SOR) and Related Methods," Journal of Computational and Applied Mathematics 123, 2000, 177-199.
Frommer, et al, "On Asynchronous Iterations," Journal of Computational and Applied Mathematics 123, 2000, pp. 201-216.
Calvetti, et al, "Interative Methods for Large Continuation Problems," Journal of Computational and Applied Mathematics 123, 2000, pp. 217-240.
Brezinski, et al, "The Matrix and Polynomial Approaches to Lanczos-type Algorithms," Journal of Computational and Applied Mathematics 123, 2000, pp. 241-260.
Eiermann, et al, "Analysis of Acceleration Strategies for Restarted Minimal Residual Methods," Journal of Computational and Applied Mathematics 123, 2000, pp. 261-292.
Bridson, et al, "Refining an Approximate Inverse," Journal of Computational and Applied Mathematics 123, 2000, pp. 293-306.
Koning, et al, "Scalable Preconditioned Conjugate Gradient Inversion of Vector Finite Element Mass Matrices," Journal of Computational and Applied Mathematics 123, 2000, pp. 307-321.
Chan, et al, "Robust Multigrid Methods for Nonsmooth Coefficient Elliptic Linear Systems," Journal of Computational and Applied Mathematics 123, 2000, pp. 323-352.
Poole, et al, "The Rook's Pivoting Strategy," Journal of Computational and Applied Mathematics 123, 2000, pp. 353-369.

(56) References Cited

OTHER PUBLICATIONS

Mehrmann, et al, "Numerical Methods in Control," Journal of Computational and Applied Mathematics 123, 2000, pp. 371-394.
Freund, "Krylov-subspace Methods for Reduced-Order Modeling in Circuit Simulation," Journal of Computational and Applied Mathematics 123, 2000, pp. 395-421.
Calvetti, et al, "Tikhonov Regularization and the L-curve for Large Discrete III-posed Problems," Journal of Computational and Applied Mathematics 123, 2000, pp. 423-446.
O'Leary, "Symbosis Between Linear Algebra and Optimization," Journal of Computational and Applied Mathematics 123, 2000, pp. 447-465.
Plemmons, et al, "Some Computational Problems Arising in Adaptive Optics Imaging Systems," ournal of Computational and Applied Mathematics 123, 2000, pp. 467-487.
Dongarra, et al, "Numerical Linear Algebra Algorithms and Software," Journal of Computational and Applied Mathematics 123, 2000, pp. 489-514.
Duff, "The Impact of High-performance Computing in the Solution of Linear Systems: Trends and Problems," Journal of Computational and Applied Mathematics 123, 2000, pp. 515-530.
Hastie, et al, "Classification by Pairwise Coupling," Department of Statistics, trevor@playfair.stanford.edu, Department of Preventive Medicine and Biostatistics, tibs@utstat.toronto.edu, 1998, 38 pages.
Von Neumann, et al, "Numerical Inverting of Matrices of High Order," Presented to the Society Sep. 5, 1947, pp. 1021-1099.
Moritz, et al, "Evaluation of *Escherichia coli* Cell Response to Antibiotic Treatment Using Laser Tweezers Raman Spectroscopy," Nov. 2010, Journal of Clinical Microbiol 48(11), 13 pages.
Press, et al, "Numerical Receipes: The Art of Scientific Computing," 3rd Addition, Cambridge University Press, Section 11.0.6 and Section 11.1, 2007, pp. 570-572.
Dean, "Elements of Abstract Algebra," Wiley and Sons, Inc. Theorem 16, 1966, p. 299.
Golub, et al, "Matrix Computations," 3rd Edition, John Hopkins University Press, Singular Value Decomposition, Section 2.5.3, 1996, pp. 70-71, Sensitivity of Square Systems, Section 2.7, pp. 80-82 and Determinants and Nearness to Singularity, Section 2.7.3, pp. 82-83.
Knuth, "The Art of Computer Programming," vol. 2, Seminumerical Algorithms, 3rd Edition, 1998, pp. 229-235, 246-247, 264-265 and 278.
Fukunaga, "Introduction to Statistical Pattern Recognition," 2nd Edition, Academic Press, Chapter 10, 1991, pp. 441-507.
Blanchard, et al, "Mathematical Methods in Physics," 2003, p. 193.
Boser, et al, "A Training Algorithm for Optimal Margin Classifiers," 5th Annual Workshop on Computational Learning Theory, Pittsburgh, ACM (1992), pp. 144-152.
Long, et al, "Random Classification Noise Defeats All Convex Potential," Mach Learn (2010) 78: 287-304, DOI 10.1007/s10994-009-5165-z, pp. 287-304.
Breiman, "Bagging Predictors," Machine Learning, 24, 1996, Kluwer Academic Publishers, Boston, MA, pp. 123-140.
Freund, et al, "A Decision-Theoretic Generalization of On-Line Learning and an Application to Boosting," Journal of Computer and System Sciences 55, 1997, Article No. SS971504, pp. 119-139.
Breiman, "Random Forests," Machine Learning, 45, 2001, Kluwer Academic Publishers, pp. 5-32.
Rojas, "Perception Learning," Neural Networks, Springer-Verlag, Berlin, 1996, pp. 77-99.
Paxton, et al, "Imaging the near-Earth space environment," Newsroom, 10.1117/2.1201609.006721, SPIE, 2016, 3 Pages.
Lu, "Medical hyperspectral imaging: a review," Journal of Biomedical Optics, vol. 19(1), Jan. 2014, 24 Pages.
Cauwenberghs, et al, "Incremental and Decremental Support Vector Machine Learning," Adv. Neural Information Processing Systems (NIPS 2000), Cambridge, MA: MIT Press, vol. 13, 2001, 7 Pages.
Diehl, et al, SVM Incremental Learning, Adaption and Optimization, Proc. IEEE int. Joint Conf. Neural Networks (IJCNN 2003), Portland, OR, Jul. 20-23, 2003, 6 Pages.
Chakrabartty, et al, "Gini Support Vector Machine: Quadric Entropy Based Robust Multi-Class Probability Regression," Journal of Machine Learning Research 8, 2007, pp. 814-839.
Chakrabartty, et al, Forward Decoding Kernel Machines: A Hybrid HMM/SVM Approach to Sequence Recognition, Proc. SVM 2002, Lecture Notes in Computer Science, vol. 2388, 15 Pages.
Chakrabartty, et al, "Forward-Decoding Kernel-Based Phone Sequence Recognition," Adv. Neural Information Processing Systems (NIPS 2002), Cambridge: MIT Press, vol. 15, 2003, 8 Pages.
U.S. Appl. No. 13/180,544, filed Jul. 11, 2011, 227 Pages.
Filing Receipt and Notice to File Missing Parts, U.S. Appl. No. 13/180,544, dated Aug. 5, 2011, 5 Pages.
Notice of Publication, U.S. Appl. No. 13/180,544, dated Mar. 22, 2012, 1 Page.
Response to Notice to File Missing Parts, U.S. Appl. No. 13/180,544, filed Nov. 7, 2011, 25 Pages.
Notice of Incomplete Reply, U.S. Appl. No. 13/180,544, dated Nov. 21, 2011, 2 Pages.
Response to Notice of Incomplete Reply, U.S. Appl. No. 13/180,544, filed Dec. 1, 2011, 6 Pages.
Updated Filing Receipt, U.S. Appl. No. 13/180,544, dated Dec. 13, 2011, 3 Pages.
Notice of Allowance, U.S. Appl. No. 13/180,544, dated Jul. 14, 2014, 27 Pages.
Notice to File Corrected Application Papers, U.S. Appl. No. 13/180,544, dated Sep. 12, 2014, 3 Pages.
Response to Notice to File Corrected Application Papers and Issue Fee, U.S. Appl. No. 13/180,544, filed Oct. 14, 2014, 10 Pages.
Issue Notification, U.S. Appl. No. 13/180,544, filed Nov. 25, 2014, 1 Page.
U.S. Appl. No. 15/624,622, filed Jun. 15, 2017, 215 Pages.
Filing Receipt and Notice to File Missing Parts, U.S. Appl. No. 15/624,622, dated Jun. 29, 2017, 5 Pages.
Response to Notice to File Missing Parts, U.S. Appl. No. 15/624,622, dated Aug. 29, 2017, 6 Pages.
Notice of Publication, U.S. Appl. No. 15/624,622, dated Dec. 20, 2018, 1 Page.
Updated Filing Receipt, U.S. Appl. No. 15/624,622, dated Aug. 30, 2017, 3 Pages.
Office Action, U.S. Appl. No. 15/624,622, dated Dec. 26, 2018, 16 Pages.
Response to Office Action, U.S. Appl. No. 15/624,622, filed Mar. 6, 2019, 27 Pages.
Final Office Action, U.S. Appl. No. 15/624,622, dated Jun. 12, 2019, 12 Pages.
Response to Final Office Action, U.S. Appl. No. 15/624,622, filed Oct. 15, 2019, 25 Pages.
Advisory Action, U.S. Appl. No. 15/624,622, dated Nov. 1, 2019, 3 Pages.
RCE/Amendment, U.S. Appl. No. 15/624,622, filed Nov. 12, 2019, 28 Pages.
Office Action, U.S. Appl. No. 15/624,622, dated Apr. 20, 2020, 6 Pages.
Response to Office Action, U.S. Appl. No. 15/624,622, filed Jul. 19, 2020, 26 Pages.
Issue Fee, U.S. Appl. No. 15/624,622, filed Jan. 21, 2021, 6 Pages.
Issue Notification, U.S. Appl. No. 15/624,622, dated Feb. 10, 2021, 1 Page.

\* cited by examiner

MACHINE LEARNING AND/OR IMAGE PROCESSING FOR SPECTRAL OBJECT CLASSIFICATION

BACKGROUND

1. Field

Subject matter disclosed herein relates generally to processing, such as via machine learning (ML) classification of measurement states, signals and/or signal samples, such as, that may form an image and/or image spectrum, for example. A system may, for example, transform one or more images, such as to enhance quality prior to recognition and/or classification, such as ML classification. For example, signals and/or signal samples may be discarded as irrelevant and/or not aiding performance so as to potentially improve more significant image aspects. Likewise, examples of image analysis applications may include medical, health, biomedical applications, and/or other life sciences.

2. Information

Supervised machine learning (SML) may comprise a technique for machine learning (ML), such as ML classification of measurement signals and/or states, for example. Typically, one or more samples may be made from a test population, e.g., signal sample measurement vectors comprising intensity signal sample value components may be stored in a computing device memory. Supervision may refer to use of an expert and/or other approach for verification with respect to a test population, e.g. a validation of a training class sample. Likewise, operation of a computing device may take place to process and/or classify stochastic signal sample measurement vectors, such as stored in a computing device memory, as mentioned, with the aid of test signal sample measurement vectors, also stored in the computing device memory, for example. A machine, such as a computing device, may execute computer instructions, for example, such that a training class may be assigned, referenced, or otherwise associated, etc., with signal sample measurement vectors sampled from a test population. Thus, training class signal sample measurement vectors may be employed to ML classify a stochastic signal sample measurement vector. Standard machine learning, such as Support Vector Machine (SVM) Learning, is well-known and need not be described in further detail.

SML may comprise a mapping, prediction, decision, approximation, equivalent or equivalence relation, etc., with respect to test populations and/or training class samples to classify stochastic signal sample measurement vectors by assigning a class value. For example, a qualitative class value may comprise a class label, code, target, name, etc. A quantitative class value may be a result of a regression method using estimation and/or prediction, for example. Classification and regression may, therefore, both be viewed as a type of approximation task.

Tree-structured classifiers to partition vectors have been formulated, e.g., by a sequential and/or serial process of evaluating components. These may be well suited if training class samples comprise a non-standard structure of variable dimension and/or a mixture of signal sample types. Other methods may employ parallel processing of vector components, and in some embodiments, may employ a fixed and/or reduced dimensional structure.

A training class sample may be handled as a multi-variate conditional probability density associated with an assigned class such that classification via statistical pattern recognition may employ hypothesis testing of a density function estimate and a Bayes decision rule may be employed to assign a stochastic vector, for example. Computation of multi-variate distributions is, in general, a complex problem. Thus, various approximations to a Bayes decision rule approach may include discriminant analysis, kernel density estimation and/or $K^{th}$ nearest neighbor as substitute procedures for a Bayes decision rule, for example.

Another technique to improve accuracy may use sets of ML classifiers to generate a lower error by some combination, averaging and/or consensus. For example, tree classifier approaches may have relatively high variance. This may, for example, be due at least in part to their hierarchical nature. However, a tree ensemble classifier approach, such as bootstrap aggregation (bagging), for example, may average multiple trees and, as a result, may reduce variance. If training classes are limited to sample replication by stochastic selection without replacement, bootstrapping may comprise a useful method. However, if a learning (e.g., training) set is not sufficiently perturbed, accuracy may not be improved. A stochastic forest comprises a collection of tree-like classifiers such that a tree may, in effect, cast one or more votes for a class. A stochastic forest approach may improve bagging in some cases, such as by reducing correlation between sampled trees. Other ensemble learning techniques may attempt to combine strengths of simpler base approaches. Boosting, for example, may use weighted sums of weak ML classifiers, which may evolve to a more accurate composite predictor and/or committee ML classifier. However, some boosting processes may be sensitive to stochastic classification noise.

Neural networks may employ nonlinear operations to transform samples, such as signal samples, and may be useful, e.g., for some problems having a relatively high signal-to-noise ratio and/or applications where prediction without an associated interpretation may be acceptable. However, if some further insight to an underlying physical process is desired, for example, they may be less desirable. Approaches, such as multiple layers of biased operations and/or training processes, e.g., back-propagation, exist with various results. However, an application-specific neural network architecture may be a challenge to generate, at least partly due to complexity.

A support vector machine (SVM), mentioned above, may provide a nonlinear transformation of signal sample measurement vectors to a numerical distribution to facilitate ML classification. A SVM method may also employ a fewer number of dimensions and/or degrees of freedom relative to a signal sample space. For selection of a kernel, analysis usually takes place, such as with respect to a problem and/or properties of signal samples, for example.

The so-called "curse of dimensionality" may occur if dimensionality of a signal sample (e.g., a corresponding mapped feature space dimension) grows and/or becomes relatively large. As a result, sampling may become sparse (e.g., since dimensionality is large). Likewise, errors and/or complexity of functional estimates may likewise increase. Dimensional reduction may be employed in some cases. For example, a technique may attempt to approximate kernels having a dimensionality that generally is less than a number of observations. Another technique may recursively remove features and update a kernel matrix in an attempt to separate samples into different classes.

As a result, improved techniques and/or approaches to ML-type classification, such as using signals, states, and/or signal samples (e.g., signal sample measurement vectors), continues to be sought.

BRIEF DESCRIPTION OF DRAWINGS

Claimed subject matter is particularly pointed out and distinctly claimed in the concluding portion of the specification. However, both as to organization and/or method of operation, together with items, features, and/or advantages thereof, it may best be understood by reference to the following detailed description if read with the accompanying drawings in which:

Figure 1:
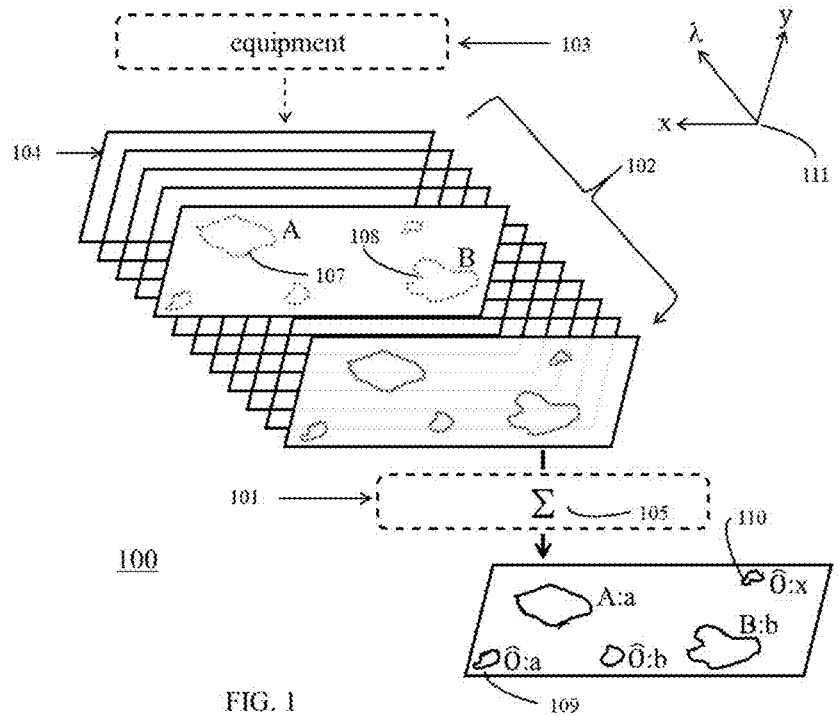
FIG. 1 is a schematic diagram illustrating an embodiment for a SMLC system.

Reference is made in the following detailed description to accompanying drawings, which form a part hereof, wherein like numerals may designate like parts throughout that are corresponding and/or analogous. It will be appreciated that figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or other similar references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the specification disclosure, particular context of description and/or usage provides helpful guidance regarding reasonable inferences to be drawn; however, likewise, "in this context" in general without further qualification refers to the context of the present specification disclosure.

As an illustration, one embodiment of claimed subject matter may, for example, comprise a spectral object classification system that employs a type of supervised machine learning. Spectral object classification employs processing of a spectral image, in which a spectral image may comprise signals, states and/or signal samples. Thus, spectral objects, image spectra, and/or spectral images, such as may be produced by optical equipment, refers to one or more frames, comprising signals, states and/or signal samples, generated with respect to a given field of view having been illuminated and/or impinged upon via emissions of one or more bands of an electromagnetic radiation spectrum and/or other forms of emissions, which may include energy and/or particles. Likewise, in an embodiment, a computing device may operate substantially in accordance with executable instructions (e.g., computer instructions) to classify (e.g., ML classify) a population, such as a map population, e.g., spectral maps, such as synthesized from signal states. It is noted, of course, that claimed subject matter is not intended to be limited to illustrative examples.

Nonetheless, continuing with this example embodiment, a map comprises a set of key-value pairs. Key-value pair is a well-known term of art in which a signal sample value, as an example, referred to as a 'value,' is associated with an identifier, referred to as a 'key.' Key-value pairs are often used in connection with database operations and/or management, for example. Thus, for example, in an embodiment, one or more 'values' may comprise a pixelated vector of measurement intensity values (e.g., signal sample measurements), such as may be generated from a signal (and/or signal sample) generating process. A 'key' identifier may likewise be associated with the 'value' (or values). For example, a key may be employed as part of an operation to sort, arrange, assemble, etc. a "value", e.g., an intensity signal value level (and/or signal sample value level) or a vector comprising intensity signal value levels (and/or signal sample value levels) as vector components, depending, for example, on context, as further described in example embodiments below.

For example, a pixelated vector may comprise a two- or three-dimensional coordinate signal sample measurement vector, e.g., a pixel or voxel, respectively, which may be associated with an intensity signal value level (e.g., intensity signal sample value level) or an intensity signal vector (e.g., intensity signal sample vector). Hereinafter, for convenience, the term "intensity vector," if employed refers to the latter. A map may be implemented in a variety of ways, all of which are intended to be covered by claimed subject matter. For example, a commonly used "map" implementation may employ latitude and longitudinal coordinates, colors, place names and/or the like. A map implementation may also comprise a spectral image comprising two dimensional spatial coordinates and measurement spectra. Thus, an illustrative embodiment, for example, may employ methods of ML classification of spectral images, as described below.

A spectral image of an object may exist or be generated and it may be desirable to have a capability to ML classify the object from a set of possible objects; however, it may be that the object classification choices for ML classification refer to objects that are extremely complex in make-up, such as having a variety of possible constituents and/or having a variety of possible forms with little known regarding spectral characteristics of constituents of such objects. For example, a blood cell type (e.g., classification) may be associated with a blood cell (e.g., object) yet relatively little, or possibly no knowledge, may be available regarding spectral characteristics of cell constituents. Multiple classes may be available as a reference, e.g., multiple blood cell class types may be known from sample test measurements, which may include spectral images, for example. Likewise, a stochastic cell object may be rendered from a spectral image comprising pixelized relatively high resolution signal sample measurement vectors of intensity levels from light scattering for a variety of wavelengths, for example. It may therefore be desirable to know the extent to which spectral images, such as described in this example, may be employed for object ML classification purposes, such as with respect to blood type in this example.

As employed herein, the terms "entity" and "physical entity", and/or similar terms, e.g., physical signals and/or physical states, are meant to refer to, and/or relate to, that which has physical manifestations that are measurable, whether actual or virtual (e.g., as may occur in optics). In an embodiment, an observation of physical entities, which includes synthesized (e.g., simulated) entities, may be recorded and/or stored as an image spectrum and/or image spectra comprising signal sample measurements. A physical entity may be determined, at least partially, by an observation, e.g., a human cell imaged with a microscope, a planet observed with a telescope, or a quasar measured with a spectrometer, as examples. A synthesized entity may be generated or formed, for example, a virtual optical image may be formed by an apparent convergence of rays geometrically, but not actually, prolonged, as an image formed by a lens or mirror. Thus, a synthesized entity may result in forming a spectral image, e.g., a multi-dimensional gray scale or color image may comprise a synthesized spectrum.

An entity may comprise one or more features and these may be measured in various ways. Entities determine attributes, which influence characteristics of signal sample measurements. An attribute may, therefore, be associated with particular measurements that may result from attempting to use a particular measurement approach for a particular feature of an entity. For example, a physical entity may give rise to an actual or virtual optical image, for example, which may result in corresponding signal sample measurements. As was mentioned, a virtual optical image may, for example, be formed by an apparent convergence of rays geometrically, but not actually, prolonged, as an image formed by a lens or mirror. It is likewise noted that the portion of an image that may be associated with a physical object that generated that portion of the image, for example, may be referred to as a spectral object. Likewise, therefore, an object may comprise a virtual spectral object having an associated synthesized entity.

Likewise, an approach to ML classification, such as use of a supervised learning machine, may employ signal sample measurements, such as may occur from interactions with (e.g., reflections and/or transmissions of electromagnetic energy) entities. Thus, for an illustrative embodiment, for example, entities, such as physical or synthesized entities, may result in corresponding signal sample measurements, such as in connection with producing a spectral image, for example. An image may comprise signal sample measurements of a corresponding optical field of view characterized, for example, by a spatial extent and resolution of observed entities, which may include entity features and/or entity attributes. Thus, an image may comprise a particular observation of a collection of entities, which may, for example, comprise signal sample measurements of one or more features.

Thus, for an embodiment, a collection of frames may be assembled corresponding to a particular optical field of view imaged at various wavelengths of electromagnetic energy. A spectral object may be rendered from an image of signal sample measurements. In particular, a spectral object, as an example of a sample object, may be rendered from a spectral image comprising signal sample measurements. Thus, for a spectral image, signal sample measurements (e.g., signal sample measurement vectors) may comprise intensity signal sample value levels with associated spatial coordinates, which may be associated with one or more entities and/or attributes as a result of a measurement process. Likewise, for an embodiment, as an example, a supervised learning machine may comprise a computing device operating substantially in accordance with executable instructions (e.g., computer instructions), which if executed, may employ training class samples in a ML classification process of object samples (e.g., spectral objects) comprising signal sample measurement vectors from a spectral image.

FIG. 1 is a schematic diagram illustrating an embodiment 100. It is noted that claimed subject matter is not intended to be limited to embodiments, such as 100, provided for purposes of illustration. Nonetheless, continuing, in an embodiment, for example, such as 100, a computing device 101 may perform executable instructions, such as computer instructions, to implement a supervised learning machine (SLM) system for sample object classification (SLMC), such as for spectral object classification, like 105, shown in FIG. 1. Computing device 101 may perform a variety of operations, in addition to an SLM system for spectral object classification, as described in more detail, including, as examples, calibration operations, initialization operations, and/or additional signal processing related operations, as described in more detail later.

An embodiment, such as 100, may or may not include equipment 103, which may, for example, comprise optics, as well as a broadband illumination source and filter to collect elastically scattered visible light, for example, such with respect to a microscope objective. As a result, a series of image frames 102 may be generated. For example, a separate computing device may be included in equipment 103 and may execute computer instructions to generate frames from visible light scattered as a result of use of the previously described source, filter, microscope objective and/or other equipment that may be desirable to generate frames. Thus, some system embodiments may include equipment to generate frames, but claimed subject matter is not limited in this respect. For example, some embodiments may be provided frames that have been otherwise generated.

In this example, a frame 104 may comprise signal sample measurements, such as signal samples of visible light intensities. In a spectral object ML classification implementation, as an illustrative example, human blood and cancer cells may be illuminated and imaged within a microscope optics field of view (FOV) using a broadband visible light source for illumination and a tunable monochromator. Thus, equipment, such as 103, may generate visible light and likewise detect scattering thereof, for example, to form a series of frames. Visible light over a band range, such as visible light approximately in the range of from approximately 440 nm to approximately 620 nm, for example, may be employed in an example. Likewise, a frame of signal sample measurements, for example, may be centered about a relatively narrow wavelength band of approximately 20 nm. It is noted that in this example elastic light scattering is used and filtered. Thus, signal sample measurements comprise filtered illumination of one or more objects, in this example, cells. Other embodiments may, of course, involve other forms of light scattering and/or other forms of energy transfer, e.g., Raman inelastic scattering, as a non-limiting example. It is noted that to accomplish ML classification of one or more objects, an approach to ML classification of spectral objects is provided as an illustration. Thus, for example, an object may be ML classified via ML classification of a spectral object associated with (e.g., formed via signal sample measurements of) the object; however, claimed subject matter is not intended to be limited to this particular illustration. For example, classification of other types of measurements of an object other than visible spectra may be employed in order to classify an object.

Nonetheless, continuing with the present illustrative example, a monochrome gray image may comprise a frame 104, in which, for example, digitized intensity per pixel may be determined, such as, for example, by camera-sensor bit resolution, quantum efficiency, imaging mode, spatial resolution, and/or channel noise. In an example implementation, two separate cameras may be used, but, again, claimed subject matter is not intended to be limited to this example, such as employing two cameras. Thus, a single camera or more cameras may be employed to generate frames to be processed. In this example, for the two cameras, a 10× objective lens with NA=0.5 yields a Rayleigh resolution of approximately 0.6 μm at 500 nm wavelength, again, as a non-limiting illustration. This microscope resolution, as an example, over a field of view (FOV) corresponds to relatively well resolved multiple pixels with respect to a cell object, e.g., in an embodiment, a satisfactory resolution may comprise a resolution approximately in the range from approximately 1 μm to approximately 10 μm. Bright-field and dark-field modes may be employed in an embodiment, for example, to image a particular FOV using a spatial filter in an optical configuration. Bright field imaging may include transmission and/or reflection of light, whereas a dark field mode may exclude specular (e.g., zero angle) transmission regarding that portion, but otherwise retain a remaining range of collection angles up to the objective lens numerical aperture. Of course, other possible modes of imaging, such as more complex modes, for example, may exist and be employed.

A supervised machine learning (SML) system 105, as mentioned, comprising, for example, a computing device performing executable instructions to implement SML classification (SMLC), may adjust signal sample measurements, e.g., signal samples arranged in the form of a (N-by-p) matrix of measurements of visible light intensity, denoted as $I=\{[\hat{I}_1, \ldots, \hat{I}_p]\}$, with N and p comprising positive integer numerals, in which a row of N signal sample measurements, with I being over p-channels and thus comprising p-dimensionality, that is comprising p real-valued components $\hat{I}_x$ ($1 \leq x \leq p$) of a signal sample measurement vector. Channel (e.g., optical channel) refers to a physical signal path, such as may be present in measurement equipment, such that a channel collects intensity signals and/or signal samples corresponding to a particular wavelength. Measurement signal samples for a frame 104, or a frame that may be part of a frame series 102, may comprise a relatively narrow band monochromatic gray image in this illustration. A series may, for example, comprise frames of signal sample measurements captured at different wavelengths, in an embodiment. For this example, at a given wavelength over a selected range, as was mentioned, an optical channel may be associated with a frame of signal sample measurements of pixelized visible light intensities, with a signal sample intensity comprising a scalar numerical signal sample value level. A frame series 102, therefore, may be collected (and/or processed) in a manner to form an intensity matrix $\mathbb{X} = \{\kappa_d; [\hat{I}(j)]\}$, as described, comprising rows of intensity vectors, where a row of signal sample measurements, in this example, corresponds to a pixel coordinate key, e.g., a two-dimensional pixel coordinate key $\kappa_d=(x, y)$. Thus, a measurement intensity matrix $[\hat{I}(j)]$ may have coordinates 111, shown in FIG. 1, determined from a frame series 102, in which j may comprise an index for frames at different wavelengths, for example. Thus, spectral image refers to a frame series, while gray scale image refers to a single frame. In an embodiment described below, a spectral image for a given optical field of view (FOV) comprises an assembled collection of intensity vectors with associated two-dimensional coordinate keys. In another embodiment, an intensity matrix row may comprise a voxel, which comprises a three-dimensional pixel, so to speak, that is, an intensity matrix, such as measured from a three-dimensional spectral image, e.g., a functional magnetic resonance image of a human brain. It is likewise noted that measurements of various other dimensionalities may be employed in other embodiments. For example, dimensions other than spatial dimensions may be indexed via a key, for example.

A test population may be qualified, verified, or otherwise identified, from 104, e.g., by an expert from visual evidence, prior knowledge, and/or as determined by a certification authority. In this context and without loss of generality, the terms qualified, qualification and/or the like refers to a positive a testament as to identification of a population, sample, etc., and are intended to include the foregoing. In an embodiment, for example, a supervised learning machine implementation may employ a training class sample of a test population to associate a class with a stochastically generated spectral object. For example, an expert may identify a sample class from one or more monochromatic gray images or a color composite of a FOV. Expert cell qualification may be based at least partially on morphology, e.g., a pathologist may classify a cell based at least partially on its shape and/or size; or as a result of a combination of spatial and/or spectral features, such as may be provided by a color image, wherein distinguishing attributes specific to a cell class may be displayed. Thus, a test population of training class samples may be specified.

Training class sample objects may be specified, e.g., gray scale images of cell A 107 and cell B 108. Thus, in an embodiment, a supervised learning machine 105, for example, may be employed to ML classify an object Ô, in a situation in which a classification for Ô is not known in advance. In an embodiment, such as this example, a tri-class labelling scheme may be employed, such as ":A", ":B", or ":X." Class ":X" in this example denotes a logical negation such that class ":X" objects are neither of class ":A" nor of class ":B". As mentioned previously, in an embodiment, an object may be classified by ML classification of a spectral object Ô that corresponds to an object to be classified. Thus, for example, referring to FIG. 1, a spectral object 109, may be assigned to class A, denoted ":A" and labeled as "Ô:A" in FIG. 1; likewise a spectral object 110 may be assigned an unknown class, in this example, denoted X, and labeled as "Ô:X" in FIG. 1.

In an embodiment, therefore, as an example, an implementation of a supervised learning machine classification (SLMC), such as implemented, as mentioned, via a computing device operating in accordance with executable instructions, may implement an SLMC, such as 105, for spectral object classification, as described in more detail below.

As mentioned previously, it may be convenient to employ key-value pairs in an embodiment. In an embodiment, key-value pairs may capture sequential order, such as via indices, for example. Key-value pairs that include sequential order, indices, maps or multimaps, may be desirable to implement various operations, such as sorting, and/or spectral object assembly from signal sample measurement vectors, as described in more detail below. In this context, the term map refers to key-value pairs used with signal sample measurements such that sequential or other order is captured. Thus, as alluded to, sorting and/or other reference operations may be implemented with a map in this example. In an embodiment, a signal sample measurement may have a format such that a key may be included. For example, a vector of signal sample values may include a pixel coordinate as well, for convenience. However, likewise, a signal sample measurement may have a format such that a key comprises a separate value. Likewise, in an embodiment, a key may be based at least in part on some implicit knowledge about an experimental configuration, e.g., an index, measurement sequence, polarization helicity, and/or other signal sample measurement structure.

In this context, the term multimap refers to a key associated with multiple values in a key-value type of association. For example, multimaps may be used with Raman spectra signal sample measurement. In this example, a key may comprise a protein concentration associated with an array of spectra. Likewise, a spectral object may be associated with spectra of various protein concentrations. Thus, a map may comprise a sortable key and a signal sample measurement value level or a vector of signal sample measurement value levels. Without loss in generality, in this context, a vector of signal sample measurement value levels may be referred to interchangeably as a measurement vector, signal measurement vector, and/or signal sample measurement vector. The examples discussed below in detail include, illustrated in tabular form, signal sample measurement vectors of intensity matrices in tabular form with pixel coordinates denoting associated keys. Thus, this example without loss of generality employs a form of signal sample measurement vector that includes an associated key as a pixel value with vector signal sample measurements.

A measurement vector, e.g., signal sample measurement vector, may be generated via a variety of processes that employ equipment, such as previously mentioned, to collect and/or synthesize signal samples of light intensity values. Light intensity signal sample values may be collected over a sequence of signal sample measurement channels, in which a channel may comprise a relatively narrow band wavelength used to collect signal sample measurements of visible light intensity in that narrow band wavelength range, as previously described, in an embodiment.

A variety of experimental configurations may be employed, but claimed subject matter is not intended to be limited in this respect. Thus, in an embodiment, filtered channels of broadband illumination over a field of view (FOV) may yield frames of pixelized intensities. A monochrome image series may be generated by varying an illumination mode, e.g., partially coherent, polarized, critical, Kohler, or quadrupolar illumination. Angle resolved signal measurement vectors may result from scattering of physical objects by a narrow band source. Thus, in an embodiment, angle resolved signal measurement vectors may result from a narrow band source producing visible light that scatters off of one or more physical objects. Thus, for an embodiment employing a configuration as described, spectra may be generated from signal sample measurements.

However, as mentioned previously, rather than generating spectra, likewise, in an embodiment, spectra may be provided for processing after having been generated elsewhere.

In general, a spectrum or spectra may be generated from signal sample measurements through averaging over an area of interest. For example, signal sample measurements produced at different times may be averaged over selected wavelengths. Spectra generated from visible light scattering may at times be associated with underlying physical processes. As an example, it is well-known, for example, that particular elements of the periodic chart may produce identifiable light spectra. In that example, although light scattering may be thought of as a stochastic process, the scattering that takes place is nonetheless time independent, or wide-sense stationary (WSS, e.g., a stochastic process may have a first moment and covariance substantially constant in time). The Wiener-Khinchin theorem states that the autocorrelation of a WSS stochastic process has a spectral decomposition given by the power spectrum of that process. This theorem is often used in conjunction with linear, time-invariant systems.

If the Wiener-Khinchin theorem is applicable to a particular situation, a time series measurement of visible light intensity, for example, may be used to generate a power spectrum as a function of frequency. Thus, for example, in such a situation, optical spectra may be associated with measured intensity per wavelength generated from elastic scattering of visible light, as an example. Likewise, a similar approach may be taken with other forms of energy transfer, particularly light energy, such as inelastic Raman scattering, or fluorescence, for example.

Spectral maps may comprise measurement vectors in a particular form, such as a variety of signal measurement compositions in the form of one or more images, e.g., frames comprising various spatial regions in a plurality of optical FOVs and/or a spatially localized series of spectra. Of course, claimed subject matter is not intended to be limited to a particular type of spectral map, particularly a map provided as an illustrative example. Nonetheless, as an example, a pixel coordinate key and spectral signal sample measurement value may form a pixel-spectrum. Spectral maps therefore may comprise, as non-limiting examples, spectral objects, image spectra, and/or spectral images, such as may be produced by optical equipment, which may, for example, record (e.g., store) results for a set of signal frames, generated with respect to a given field of view having been illuminated and/or impinged upon via emissions of one or more bands of an electromagnetic radiation spectrum and/or other forms of emissions, which may include energy and/or particles. For example, a spectral object may comprise a collection of measurement vectors thereby forming pixel spectra. Spectral objects may be specified in a variety of ways, non-limiting examples may include by key (e.g., pixel coordinates), by value (e.g., spectra), and/or by combinations of both. A host of digital technologies may be employed in connection with generation of one or more spectral maps, e.g., multispectral imaging, hyperspectral imaging, spectral imaging, imaging spectroscopy and/or chemical imaging, as non-limiting examples. Illustrative fields of use may include microscopy, astronomy, and/or Earth remote sensing. However, likewise, methods may differ as well in a variety of ways, such as, to provide a few non-limiting examples, spectral range and/or resolution, number of bands, width and/or contiguousness of bands, etc. It is, of course, appreciated that claimed subject matter is intended to not be limited to these examples, mentioned for purposes of illustration. That is, in general, claimed subject matter is not intended to be limited to examples provided for purposes of illustration.

Known spectral objects comprising signal sample measurement vectors may be employed as test populations and/or training class samples for ML classification, such as to ML classify unknown spectral objects. A training class may be associated with a sample test object, without necessarily having prior knowledge of constituent signal sample measurement vectors for the particular sample test object. It may, for example, be desirable to have a capability, such as via implementation of a supervised learning machine, to ML classify spectral objects, such as spectral objects comprising signal sample measurement vectors associated with heterogenous objects, as shall be described in more detail below. Heterogeneity, as an object attribute, refers to one of a plurality of physically measurable characteristics of an object, in which, for a set of objects, the object attributes vary across the objects. Thus, in an embodiment, for example, spectral object partition of member measurement vectors and/or one or more object-classes from training class samples and/or test populations may be employed in connection with heterogeneous objects to accomplish ML classification, as again, shall be described in more detail below. For SLMC, for example, objects may be associated with known and/or unknown spectral test populations. In an embodiment, expert knowledge may be employed with a training class of sample test spectral objects, and, in an embodiment, may be used to implement a supervised learning machine classification of spectral objects. A spectral map may comprise one or more spectral objects that may include pixelized measurement vectors that may be ML classified with respect to one or more test populations, in an embodiment. For example, spectral objects, rendered from an image field of view, may be ML classified according to test sample spectral objects, which may comprise signal measurement vectors. In an embodiment, supervised learning machine techniques may be employed to select training class samples and to ML classify spectral objects comprising measurement vectors. In example embodiments below, human blood and cancer cells, for example, may be ML classified according to multiple blood cell types employing spectral images obtained from elastically scattered visible light obtained via microscope.

An embodiment of a SLMC system, for example, may use a training sample from a test population, e.g., known spectral objects identified by an expert, as an example, such that a training class may be associated with a test sample object. ML classification of a random object does not require a priori knowledge of training class sample object member measurement vectors. For example, a test population and/or a training class object, e.g., although associated with expert knowledge, may comprise a sample of otherwise unknown measurement vectors. Thus, in this illustrative example, an expert may have knowledge about an object, but possibly relatively little knowledge or perhaps even no knowledge about measured components with respect to that object, e.g., a human blood cell may be identified from an optical image by a pathologist without knowledge on the part of the pathologist regarding measurement vector composition for that human blood cell, for example, as resulting, for example, from light interaction at a subcellular level. A training class may thus be assigned to a sample spectral object comprising otherwise unknown (e.g., otherwise not predicted in advance) member measurement vectors. A training class sample may comprise one or more objects with associated spectral objects, for example, in an illustrative situation.

Figure 2:
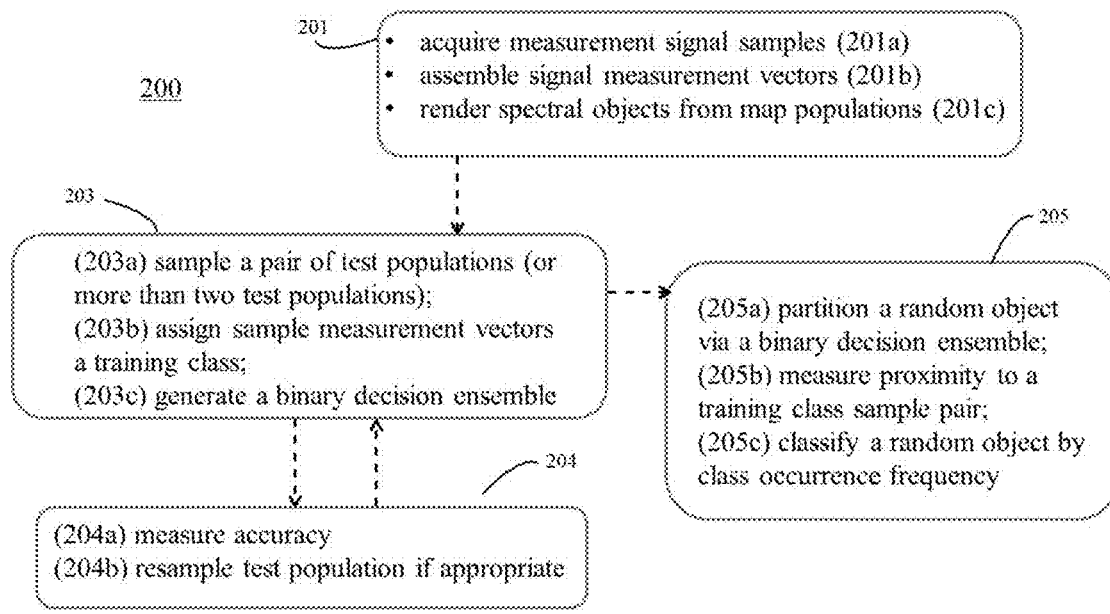
FIG. 2 is a schematic diagram illustrating an embodiment of a method of SMLC.

FIG. 2 is a diagram illustrating an embodiment 200 of one possible approach to implement a method of supervised machine learning classification (SMLC) of random objects, such as via ML classification of random spectral objects. ML classification, as previously indicated, refers to machine learning classification in this context. For example, as previously mentioned, a qualitative class value may comprise a class label, code, target, name, etc., whereas a quantitative class value may be a result of regression using estimation and/or prediction. Thus, classification, such as ML classification, here, refers to associating objects having one or more common features and/or attributes with a class label, code, target, name, etc. that represent common features and/or attributes of objects in the class. Characteristics comprise measurements related to common features and/or attributes, as previously described.

However, for ML classification, various stages of processing may take place in a particular embodiment to accomplish such classification. Thus, for example, an object, such as a spectral object, as an example, may be partitioned. Partitioning refers to decomposition of an object, spectral object, and/or portion thereof. As an illustrative example, a field of view may be decomposed into objects within the field of view, such as a result of spatial decomposition, and in such cases, will be specifically referred to as a "spatial partition" herein. Likewise, as another illustration, a spectral object may be decomposed into partitions as a result of a binary decision ensemble operation, as described below in more detail. Thus, partitioning refers to decomposition of an object, spectral object, and/or portion thereof, into subsets by some rule, e.g. by a spatial partition for objects in a field of view, or a partition of a spectral object by member vectors associated with a binary decision ensemble.

Similarly, a stage in processing in an embodiment may include categorization. Categorization refers to processing that involves comparisons made between measurable characteristics, such as between characteristics of a training class and characteristics of a test object, as an illustrative example. Thus, categorization as a process may be useful to ML classify objects, as specified in more detail below. For example, objects to be ML classifiied may have external and/or internal heterogeneous characteristics, e.g. a cell may be externally heterogeneous in the sense of being one or more of a variety of cell types or classes. Likewise, a cell may be internally heterogeneous in the sense of comprising a variety of signal measurement vectors, which may, for example, be revealed by a partition resulting from a binary decision ensemble, again, as described in more detail below. Thus, partitioning and/or categorization may be employed, such as described in more detail below, to facilitate ML classification for a particular embodiment.

Random object, stochastic object, spectral object, and/or random spectral object are interchangeable terms respectively referring to a collection of one or more signal measurement vectors. Thus, typically, the term random object or stochastic object refers to an object drawn from an otherwise unknown population, such as an object that does not have an associated test population and/or training class, for example. Likewise, a random or stochastic signal sample, vector, vector component, etc., similarly may relate to a random or stochastic object and/or may be drawn from an otherwise unknown population, for example. A signal processor, such as a processor executing instructions for an application, may, for example, acquire measurement signal samples (e.g., shown by 201a), assemble signal measurement vectors (e.g., shown by 201b), and/or generate map populations comprising signal measurement vectors, from which spectral objects may be rendered (e.g., shown by 201c). Random spectral objects may thus comprise one or more signal measurement vectors rendered from a spectral image (e.g., shown by 201c).

Thus, spectral images may be generated, for example, so that spectral objects may be rendered as pixelated signal measurement vectors, such as shown by embodiments discussed below. Spectral object assembly may be specific to an implementation technique and/or depend at least in part on measurement signal format, dimensionality, content, etc. A random object, nonetheless, may, for example, be assembled from a set of signal measurement vectors, as shown by 201b, e.g., a random object may be rendered from a spectral image by partitioning portions of the spectral image, such as via an index, map, key, or multi-map, for example. Thus, random objects may be identified and/or otherwise be generated from a spectral image using a technique in which pixels of the image are spatially partitioned, as one example. Illustrative implementations below employ spatially partitioned spectral images corresponding to a field of view rendered into n-sets, e.g., set unions $1\text{Obj} \cup \ldots \cup n\text{Obj} = \{x\text{Obj}\}$. Of course, claimed subject matter is not intended to be limited to illustrative examples of implementations.

Here, nonetheless, "xObj" may comprise a random object of signal measurement vectors, e.g., pixel spectra. A random object may be rendered via associated pixel coordinates. Likewise, as an example, open source parsers are available, e.g., employing blob detection and/or connected component labeling techniques, as a few non-limiting examples. Random objects may also be rendered via a spatial coordinate transform, e.g., Fourier and/or wavelet type techniques, as examples. Yet another non-limiting example of a technique may parameterize a distance to a $k^{th}$-nearest neighbor via iteration on coordinate gaps over a FOV or over sub-regions with gap size as an input parameter. Thus, for example, a random spectral object $\hat{O}$ may substantially be in accordance with an intensity matrix, e.g., such as $\hat{O}=[(x, y); \hat{x}]$, comprising pixel-spectra with N sample rows and p-dimensional intensity spectra $\hat{x}=(\hat{x}_1, \ldots \hat{x}_p) \in V$ in a vector space š V. A random measurement vector $\hat{x}$ may have a random vector component $\hat{x}_j=\hat{I}(j)$ of a jth-channel intensity measurement signal sample value, and pixel-spectra may be located by a two-dimensional pixel coordinate key, for example.

A spectral object and/or a signal measurement vector may be referred to respectively as a random object and/or a random vector, such that the term random may be understood in context with respect to the fields of probability, random variables and/or stochastic processes. A random vector may be generated by having measurement signal components comprising one or more random variables. Random variables may comprise intensity value measurements, which may, for example, be specified in a space of outcomes. Thus, in some contexts, a probability (e.g., likelihood) may be assigned to outcomes, as often may be used in connection with approaches employing probability and/or statistics. In other contexts, a random variable may be substantially in accordance with a measurement comprising a deterministic measurement value or, perhaps, an average measurement component plus random variation about a measurement average. The terms measurement vector, random vector, and/or vector are used throughout this document interchangeably. In an embodiment, a random object, or portion thereof, comprising one or more measurement vectors may uniquely be associated with a distribution of scalar numerical values, such as random scalar numerical values (e.g., signal values and/or signal sample values), as illustrated below, for example. Thus, it is understood, of course, that a distribution of scalar numerical values, for example, without loss of generality, substantially in accordance with the foregoing description and/or later description, is related to physical measurements, and is likewise understood to exist as physical signals and/or physical signal samples.

The terms "correspond", "reference", "associate", and/or similar terms relate signals, signal samples and/or states, e.g., components of a signal measurement vector, which may be stored in memory and/or employed with operations to generate results, depending at least in part on the above-mentioned, signal samples and/or signal sample states. For example, a signal sample measurement vector may be stored in a memory location and further referenced to a training class, wherein such a reference may be embodied as a stored relationship. A stored relationship may be employed by associating (e.g., relating) one memory address to another memory address, for example, and may facilitate an operation, involving at least in part, a combination of signal samples and/or states stored in memory, such as for processing by a processor and/or similar device, for example. Thus, in a particular context, associating, referencing, and/or corresponding may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) memory.

A test population may be specified by a class and/or class type. For example, a blood cell may substantially correspond to a spectral object rendered from a spectral image, identified by a pathologist, evaluated by a particular test, and/or qualified by another and/or additional verification authority, as being of a particular or known cell type, such as a white blood cell. A test population may be associated with a class, e.g., as identified by, and/or known to, an expert, another verification authority, and/or an additional verification authority. Thus, in an example process embodiment, a test population, or a sample thereof, may be identified and/or associated with a known class. A training class sample may be associated with a test object population class, which may be sampled. Thus, a test object and other spectral object members of a test population, e.g., training class objects, may share a similar class characteristic, at least with regards to corresponding to a same class, as described herein. Likewise, an "unknown" random object may comprise random measurement vectors; such that, a random measurement vector, such as may be sampled from a population, may, at least not yet (e.g., until processed, such as in accordance with embodiments described herein), necessarily be associated with a test population class.

A test population may comprise spectral objects, which are "known" as a result of some identification, qualification, association, correspondence, etc. with a class (e.g., class type), such as previously described. However, a supervised machine learning method embodiment, such as for an embodiment of a spectral object ML classification system, may employ a random object and/or a test object, which may comprise "unknown" signal sample measurement vectors. A test sample object may be associated with a particular test population class, e.g., identified by an expert, another verification authority, and/or additional verification authority, for example, as previously described. Thus, a test sample object may comprise one or more measurement vectors, which may not yet be assigned to a class (e.g., class type). However, a test population may comprise test objects associated with a class and as shown in an example embodiment below, a process embodiment, such as for SMLC, for example, may be invoked such that a member measurement vector may be associated with a test object population class.

Referring again to illustrative embodiment 200, as shown in FIG. 2, and as was previously mentioned, one approach to implementing a possible method embodiment of SMLC is illustrated, such as via 203, 204 and 205, discussed in more detail below. Thus, as illustrated, for example, operations of an example process embodiment, such as operations shown by FIG. 2, may employ two training class samples, such as shown by 203a (e.g., may sample two or a pair of test populations). Of course, claimed subject matter is not limited to employing combinations of two (e.g., pairs). Rather, an embodiment may employ combinations of samples that comprise more than two in an embodiment; however, for purposes of discussion, pairs shall be employed as an illustrative example. For example, in an embodiment executing on a signal processor, these may comprise an argument, as may be executed by one or more machine (e.g., processor) instructions, for example. Thus, the term argument refers to one or more operands of one or more operations to be executed, such as by a signal processor. Likewise, examples of arguments may include one or more signal samples, vectors of signal samples, spectral objects, etc. A training sample may be associated with a test population class and may comprise one or more spectral objects. Training class spectral objects, and/or similar terms such as "training class sample", "training class object" and/or "training class sample object" refer to a sample of a test population, such that a training class sample object is associated with and/or is to be associated with a corresponding test population class.

Thus, in a method embodiment, instructions may be executed such that two (or more) training classes (e.g., a pair) may be sampled from respective test populations (e.g., two or more, as discussed in more detail later), such as shown by 203a, for example, and a class may be assigned to a training sample object, such that sample object member measurement vectors may correspond to a respective test population class, such as shown by 203b, for example. A2. Likewise, as shall be discussed, sample statistics for a test population may be generated in an embodiment, such as sample statistics comprising a mean and a variance. Thus, samples of two or more respective heterogeneous object populations may be respectively combined to generate sample statistics with regard to respective heterogenous object populations. For example, samples of two or more respective heterogenous object populations may be combined in a manner so as to form two respective object populations in an embodiment.

Likewise, in an embodiment, two test population samples (e.g., two or more) may be employed as a training class sample pair to generate a binary decision ensemble, such as shown by 203c. Furthermore, as shall be discussed later, a test population sample may be employed as part of an embodiment that may implement learning feedback to measure categorization accuracy, such as shown in 204, for example, and illustrated by an embodiment described later in more detail. For example, in an embodiment, learning feedback may be employed to correct ML classification errors that are detected, such as, for example, in an embodiment in which a categorization does not correspond to a qualification, such as for a selected sample object. Thus, in an embodiment, a sample test object may be employed as a training class to ML classify a random object, e.g., as shall be described in more detail infra.

As further shown by FIG. 2, in an embodiment, such as via executing machine (e.g., processor) instructions, a class may be assigned to a training sample object comprising member measurement vectors sampled from a test population, e.g., executable instructions may associate, combine, and/or otherwise reference a class with a measurement vector sampled from a test population, such that a training class sample object measurement vector results, as shown by 203$b$. Thus, in an embodiment, a class association with a training sample object measurement vector may be executed, resulting in a training class sample measurement vector. That is, sample measurement vectors may be associated substantially in accordance with a training class assignment which may be described and/or characterized via various statements, some of which include, but are not limited to: "a measurement vector is a member of a training class sample object", "a class is associated with a training sample object member measurement vector", "a training sample object member measurement vector is referenced to a class", "a known sample object member measurement vector is assigned a training class" and/or the like. For example, in an embodiment, instructions may be executed, for example, to at least in part, associate, index and/or otherwise reference a sample object member measurement vector "$\hat{s}$" with a training class "A", such that the following statements are also substantially in accordance with the forgoing: a reference may be written as a combination "$\hat{s}$:A", a sample object measurement vector may be referred as a member of a training class "$\hat{s} \in A$", a training class label "A" may be associated with a known object member measurement vector "$\hat{s}$", and/or the like.

As discussed in an illustrative example, a training class object may be sampled from a test population comprising unknown member measurement vectors. For example, a sample object set $\hat{O}=\{\hat{x}\}$ may contain unknown member random vectors $\hat{x}$. In an embodiment, such as shown by 203, for example, a training class may be assigned to sample objects, as shown by 203$b$, e.g., instructions may be executed to reference a training class "A" to a sample object "$\hat{O}$" and combination $\hat{O}:A=\hat{O}_A$ may result. A training class "A" may be associated with a sample object $\hat{O}$, comprising unknown member measurement vectors, e.g., $\hat{O}_A=\{\hat{x}\}_A$ may comprise a set of random member measurement vectors $\{\hat{x}\}$ associated with a training class sample object. Thus, a training class sample object class label "A" may be referenced to random measurement vectors, e.g., such as $\hat{O}_A=\{\hat{x}_A\}$. For an embodiment, as shown by 203, for example, then, a training class may be assigned to a member measurement vector, as shown by 203$b$. As a result, a member measurement vector class may substantially correspond with a training sample object, e.g., a training class with a sampled test population and/or a measurement vector training class with a sampled training object.

An embodiment, again, in this example illustrated by 203, may execute instructions to implement a binary decision with respect to a training class sample member measurement vector. In an embodiment, as in this example, for a binary decision, one of two outcomes may result, e.g., one of two binary decision labels may be assigned. In this illustrative example, a binary decision instruction may be executed with a measurement vector as an argument; however, in another embodiment, a binary ML classification may employ a spectral object as an argument.

Thus, for an embodiment, a binary decision may employ a conditional instruction, such as an if/then type statement. More specifically, in an embodiment, an argument, e.g., a training class member measurement vector, may be operated upon, such as by a transformation operation, as shall be illustrated, to produce a scalar score numerical signal value (e.g., score sample signal value). For example, an inner product of a training class sample member measurement vector and one or more linear and/or nonlinear transformation operations may generate a scalar score signal value. A comparison of a resulting scalar score signal value with a threshold-bias value may, therefore, in an embodiment produce a binary decision. For example, in an embodiment, a resulting scalar score signal value may be greater than or equal to a threshold or a scalar score signal value result may be less than a threshold. Likewise, terms, such as threshold, bias, and/or threshold-bias, are used interchangeably in this document, unless otherwise indicated expressly and/or from context. Thus, for an embodiment, a binary decision and a scalar score signal value may correspond to a training class sample member measurement vector. Likewise, a distribution of scalar score signal values and associated binary decisions may correspond to a set of training class sample member measurement vectors.

For example, as an illustration, a binary decision employing a linear transformation operation may be expressed as: evaluate an inner product between a weight vector w and a sample measurement vector $\hat{x}$ in a conditional inequality with a threshold bias scalar value "h", such that, if $f(\hat{x})=w \cdot \hat{x}-h \geq 0$, a sample measurement vector is to be labeled "a"; or, such that if $f(\hat{x})=w \cdot \hat{x}-h<0$, a binary decision result is to be labeled "b". Thus, in this illustrative embodiment, a binary decision label may be assigned to a sample member vector $\hat{x}$. For example, a sample member measurement vector may be referenced with a binary decision labeled "a" or "b", such that the combination is specified as "$\hat{x}$:a" or as "$\hat{x}$:b".

In an embodiment, a ML binary decision may employ a linear transformation operation and a successive iteration of adjustable parameters comprising a weight vector and threshold-bias scalar value. Thus, in an embodiment, a ML binary decision with respect to a test vector employing a parameterized weight vector wand threshold-bias h may be compared with binary decisions resulting for a training class, using parameter iteration to improve binary decision accuracy. In an embodiment, a weight and bias is sought via an iterative process to converge to a result that appropriately ML classifies sample test vectors, as illustrated in more detail below.

However, it is noted that, likewise, an embodiment may also involve a type of binary decision in which a nonlinear transformation operation is employed. Thus, scalar signal values may be computed via use of a kernel transformation operation $K(w, \hat{x})$. A nonlinear transformation operation may likewise employ a parameter w and a sample vector $\hat{x}$ in connection with various potential non-linear functions or operations. For example, a binary decision may use a conditional statement, such as: if $f(\hat{x})=K(w,\hat{x})-h \geq 0$, associate $\hat{x}$ with class A, else associate $\hat{x}$ with class B. Thus, heuristic kernel selection may guide ML classification. Heuristics refer to use of experience related approaches that reflect realized processes and/or realized results, e.g., such as in connection with use of historical measurements. For example, heuristics may be employed in situations where more analytical approaches may be overly complex and/or nearly intractable to implement computationally. An embodiment employing heuristics may be feasible and is intended to be included within claimed subject matter scope. Nonetheless, likewise, relatively greater complexity may be added to a ML classification process and determining a kernel-induced feature space may be relatively more challenging if heuristics are employed. An embodiment provided below, therefore, employs training class sample statistics to generate a linear transformation operation rather than heuristics, for purposes of illustration.

As mentioned, an embodiment, such as shown in 203, may employ operations to generate a binary decision ensemble, again, as shown in 203c, e.g., as also illustrated below. Convergence is known to occur if linear discriminants are employed, as shown for an illustrative embodiment below. Thus, linear discriminants may be employed in at least some embodiments so that convergence occurs with respect to parameter iteration, such as with respect a weight vector w and a sample measurement vector $\hat{x}$ in a conditional inequality, for example. Furthermore, a linear transformation operation may be generated for use as part of a binary decision based at least in part on sample statistics of a training class sample pair, as shall be illustrated. For example, for an embodiment, a linear discriminant scale vector may be generated by a ratio of mean separation to joint variance for two training class sample distributions, as shown in relation (3) below.

In an embodiment, a training class sample of measurement vectors may be used to generate a transformation operation, such as to be employed to make a binary decision. Consistency of binary decision about a training class sample argument may be evaluated for an embodiment and may be employed to achieve a binary ML classification, for example. Thus, a test vector may be evaluated by a logical equivalence relation in which a sample training class may be compared with a binary decision for the test vector. Consistent binary decisions may be desirable as a condition to be met with respect to some types of binary ML classifications employing a training class sample of measurement vectors.

A particular choice of logical equivalence instruction(s) may be determined as a matter of a priori expert knowledge. For example, in some fields of use, a particular equivalence relation may substantially be in accordance with what is a priori "known." Thus, in an embodiment, a logical equivalence relation may be qualified, e.g., determined substantially in accordance with an expert decision or another verification authority decision. However, it is generally not required that a particular logical equivalence relation be established in this manner, as shown in an illustrative implementation below.

However, likewise, an embodiment may involve spectral objects of unknown member measurement vectors. For example, spectral objects may be heterogeneous. Thus, one of a plurality of physically measurable characteristics of an object, in which, for a set of objects, the object attributes may vary across the objects. Accurate ML classification may, of course, be desired. For example, a distinct separation of objects for ML classification may be achieved in a statistical sense, e.g., a mean separation of two training class samples comprising spectral objects may be relatively greater than a joint variance of respective spectral object measurement vectors for a particular training class sample pair, such as further described with respect to relation (3) below. However, for some choices of a linear transformation operation, distinct ML classification of spectral objects, for example, may not necessarily be realized in some situations. In an embodiment, a sieve scheme or sieve process may be employed to produce a binary decision ensemble, which may be sufficient for accurate ML classification, for example, in many situations. The term sieve, more generally, refers to an approach seeking to distinguish spectral objects, such as training samples, with respect to one another. In one embodiment, for example, a sieve binary decision employs a process in which an error measure or error value and a threshold-bias value may be generated from sample statistics for training sample score distributions. Training sample score distributions, likewise, may be generated from a transformation operation employed with respect to measurement vectors for a training class sample spectral object. A binary decision series may be terminated or may converge at a point in a process, for example, in which disjoint or non-overlapping score distributions that correspond to measurement vectors for a training class sample spectral object are generated. Thus, for a training sample comprising a training class sample spectral object, for example, a sieve type process may be implemented until termination or convergence at which point partitioning of a training class sample spectral object may be achieved so that accurate ML classification is then possible. Details of illustrative embodiments for a sieve type process are further described below by example.

In an embodiment, again, as shown in 203, a binary decision ensemble may be generated, as shown by 203c, e.g., illustrated later with an example. For an embodiment employing a sieve-type process, relatively greater binary decision ensemble accuracy, such as in the form of a smaller error value. For example, for training class samples, which may, for example, comprise spectral objects, relatively less error may may be employed to provide a relatively more accurate spectral object ML classification. Likewise, it may be desirable for an embodiment to employ a sieve-type process to generate a binary decision ensemble in which, for example, binary decisions may involve use of a linear transformation operation substantially in accordance with two training class samples (e.g., a sample pair), as shall be illustrated by example.

In an embodiment employing a sieve-type process or approach, as previously described, for example, comparing a training class using a binary decision approach, a logical equivalence relation may be employed to generate a binary decision ensemble comprising a sequence of logical "1"/ logical "0" signal value results for a particular sample measurement vector. As shown by 203c, in an embodiment, a binary decision ensemble may be generated, such as from execution of instructions by a signal processor, which may, for example, include use of a training class sample pair as an argument. In an embodiment, two training class samples (e.g., a pair) may comprise an input argument for an embodiment in which instructions (e.g., processor instructions) are executed by a signal processor, for example, and execution of processor instructions may likewise produce (e.g., return) a binary decision ensemble as a result.

For an embodiment, a binary decision about a training class sample measurement vector may be evaluated by a logical operation. For example, an outcome or result of a logical operation may generate a Boolean signal value, such as a logical "1" or a logical "0". Thus, the term logical equivalence refers to a logical operation in which a Boolean signal value (and/or signal sample value) results. Stated otherwise, if comparing a training class using a binary decision approach, a logical equivalence relation may be employed to generate a true/false (e.g., logical "1"/logical "0") signal value result (which, for example, may likewise comprise a sequence of logical true/false signal values) for a particular sample measurement vector. Likewise, a logical operation, via implementation on a signal processor, may involve executing an instruction (or multiple instructions) referred to as logical equivalence instruction(s). For example, a sample measurement vector may be determined to be a member of training class "A" or a member of training class "B"; a binary decision about a training class sample measurement vector may be determined to produce a result "a" or it may be determined to produce a result "b". Thus, as evaluated by logical equivalence instruction(s), a result may be generated, such as "A=a is evaluated as true" and "A b is evaluated as false"; or, other logical equivalence instruction(s), as evaluated, may be generated, such as "A=a is evaluated as false" and "A=b is evaluated as true". Other examples comprise: a sample member vector "t" may be associated with a training class "A" and correspond to a binary decision result "a", with the combination noted "t̂:A:a" or "t̂$_A$:a", or "A=a", and, as evaluated, may be associated with a Boolean signal value, true; or alternatively, a combination "t̂:A:b" or "t̂$_A$:b", or "A=b", and as evaluated, may be associated with a false Boolean signal value.

Thus, as previously suggested, for an embodiment, a training class object may be sampled from a test population. Likewise, as described, for an embodiment, a test sample may be employed as an argument, such was as mentioned with respect to 203, to generate a binary decision ensemble, shown by 203c. However, in an alternative embodiment, for example, instead, a test population sample may likewise be employed to perform learning feedback, such as shown by 204, and/or to ML classify spectral objects, such as shown by 205 (which may include partitioning, as shown by 205a). Thus, as shown by 204, in an embodiment, a technique for resampling a test population may be initiated so that accuracy, for example, as measured by ML classification (e.g., categorization) of test objects, may be improved, for an embodiment, as described below.

Continuing, for an embodiment, for test spectral objects, for example, accuracy, such as shown in 204, may be measured substantially in accordance with the following: generating binary decision ensembles from training class sample objects; and comparing ML classification (e.g., categorization) of test objects and training class sample pairs. For example, as shall be illustrated below, a test object category and corresponding training class may be compared using relative proximity, substantially in accordance with a logical equivalence relation, for example, to measure accuracy in an embodiment. Thus, an embodiment may determine accuracy, shown in 204a, and may resample a test population comprising spectral objects, shown in 204b. Accuracy may be measured as a ratio of appropriately categorized test objects to test population size. Test objects that correspond with a "1" logical equivalence result obtained by comparing training class and test object category may be considered appropriately categorized, for example. Thus, in an embodiment, measuring accuracy and potentially updating one or more binary decision ensembles, as appropriate, may be employed, such as for an embodiment employing learning feedback.

In still another embodiment, a signal processor may execute instructions with respect to partitioning a random object via a binary decision ensemble, shown in 205a, for example, as alluded to previously. Thus, in an embodiment, a random object, for example, may be partitioned substantially in accordance with a binary decision ensemble comprising a sequence of binary decisions formed employing member measurement random vectors, as shall be illustrated by example below. A random object partition may be substantially in accordance with relative proximity to a training class sample partition pair, as shown by 205b, e.g., employing a chi-square or other goodness-of-fit statistical measure, illustrated below.

Thus, identification, recognition, and/or ML classification, such as for an embodiment, may comprise a variety of operations that may depend, at least in part, on a particular context and/or a particular embodiment. As an example, an expert may identify a test population, such as to establish a class type with a test population comprising one or more spectral objects. Instructions may be executed by a signal processor to generate a binary decision ensemble, as shown by 203c. A test sample may be recognized as corresponding to a known category. If tested as an unknown random spectral object, a logical equivalence relation may compare a known category with the test sample, and/or may employ learning feedback, such as shown 204, which may generate test object categorization accuracy, for example, as shown by 204a. Likewise, an embodiment may involve execution of instructions by a signal processor to partition a random object via a binary decision ensemble, such as shown by 205a, measuring a relative partition proximity to training class pairs, such as shown by 205b, and to thereby ML classify the random object by class occurrence frequency, such as shown by 205c and described below.

It is noted here, which is described in more detail later, a feature of ML classification involves distinguishing random objects, which may occur via increasing separation between scores associated with random objects in a dual space. In an embodiment, a sieve scheme or sieve process may produce a binary decision ensemble (203c), which may be employed in connection with implementation respectively as a signal processing background discrimination approach and/or as ML classification, for example. Thus, for example, in an embodiment, a sieve-type process may involve generating a binary decision ensemble from a sample pair, such as a training sample, with respect to other objects of a test population, after employing a transformation operation, such as linear transformation operation, for example. As a result, a binary decision ensemble, as shall be illustrated, may be employed in connection with discriminating background non-objects of interest, and/or ML classifying a random spectral object, such as for example embodiments described below.

Embodiments described below, for example, illustrate sieve scheme or sieve process type transformations, such as, for example, may be employed for background discrimination filtering and/or random object ML classification, in an embodiment, such as via use of a binary decision ensemble. Thus, in an embodiment, ML classification to discriminate spectral objects shall be shown by illustrative example e.g., sieve process embodiments below shall illustrate images of human blood cells discriminated (e.g., ML classified) as spectral objects using blood cell types (e.g., class types) sampled from test populations.

Illustrative embodiments are now described for ML classifying human blood and/or cancer cells. A first camera is employed to capture images of: normal white blood cell leukocytes (Wbc), shown in a dark field FIG. 3; an immortalized line of T lymphocyte cells, Jurkat (Jur), cancer cells, shown in a bright field FIG. 4; and red blood cell erythrocytes (Rbc), shown in a dark field FIG. 5. Camera image pixel size is 0.4 µm and total image area is 260.8 µm×196.8 µm. Frame size is $N_x$=653 by $N_y$=492 pixels in x- and y-axis directions respectively with a total number of pixels in a frame $N_x \times N_y$=321,276. A second camera is employed to capture images of non-small cell lung adenocarcinoma cancer type H1975 cells using an interline CCD sensor with 0.65 μm pixels, a frame size of $N_x=1392$ by $N_y=1040$ pixels and 1,447,680 pixels in a frame covering a 904.8 μm×676.0 μm field of view (FOV). Dark field (DF) and bright field (BF) spectral images correspond respectively to 14- and 11-dimensions. To be more specific, a dark field spectral image comprising vectors of measurements is made up of 14 component vector signal sample measurements; whereas a bright field image spectral image comprising vectors of measurements is made up of 11 component vector signal sample measurements.

Figure 6:
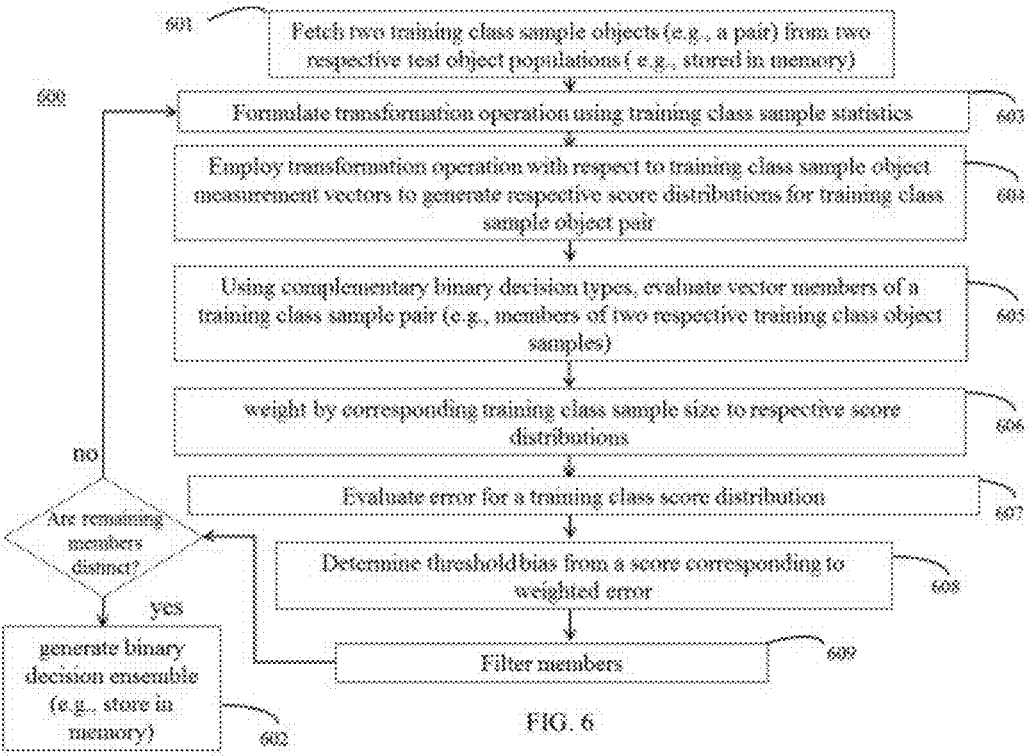
FIG. 6 is a flow diagram showing an embodiment of a sieve type process, such as may be of use in processing of spectral objects and/or spectral images.

FIG. 6 is a flow diagram showing an embodiment, such as 600, of a sieve or a sieve-type process. As mentioned previously, the term sieve, in general, refers to an approach seeking to distinguish spectral objects, such as training samples, with respect to one another. Thus, FIG. 6 illustrates an embodiment of a sieve-type process in which a training class sample pair comprising respective spectral objects, such as in 601, may be evaluated and may, as a result of a transformation operation, such as a linear transformation operation, produce a binary decision ensemble, such as in 602, as previously discussed in connection with FIG. 2, shown by 203c, for example.

Figure 7:
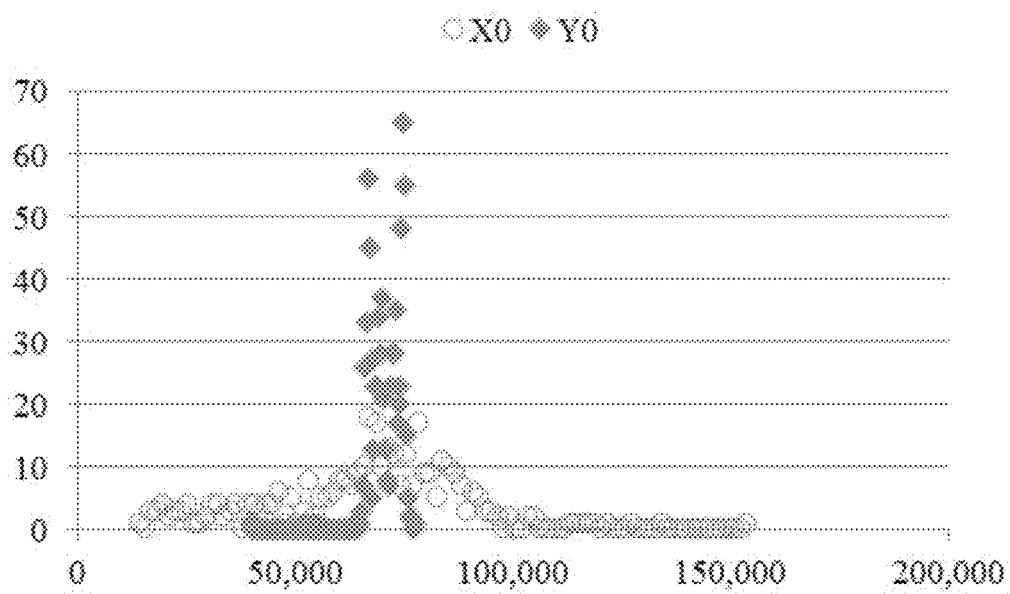
FIG. 7 is a histogram plot of input score values showing an embodiment of a Jurkat training cell bright field image.

A type of sieve process (e.g., sieve discrimination), as one example, as mentioned above, may be employed, to sample a pair of test populations comprising a training class object sample and a non-object background region sample comprising no spectral objects of interest. For example, shown in FIG. 4, a training class sample "A=X0" 409 (Jurkat cell A=X0 enclosed in box 417) and a training sample non-object B=Y0, comprising measurement vectors from four boxes 405-408, enclose background regions devoid of objects. Histograms showing scores of training class sample member measurement vectors for Jurkat cell object (A=X0) and non-object (B=Y0), for FIG. 4, corresponding to a bright field image, are shown in FIG. 7. A set "A" size is the number of members n(A), for example, for a training class sample "S(A)" that corresponds to an object "ÔA" comprising member measurement vectors "$\pi_i$", such that set $S(A)=\hat{O}A=\{\pi_i\}_A$ includes members $1 \le i \le n(A)$ whose member number is set size n(A). Thus, in FIG. 4, for the Jurkat cell in this example, mentioned above, n(X0)=357 and for the background sample in this example, mentioned above, n(Y0)=784.

In an embodiment, a scalar distribution, which may, in one embodiment be referred to as a score distribution, may be generated, such as from training class pair sample statistics, e.g., with respect to member measurement vectors. Likewise, in an embodiment, a transformation operation may be formulated from training sample statistics, substantially in accordance with relation (3) below, as shown, for example, by 603 of FIG. 6. Likewise, as shall be discussed, sample statistics for a test population may be generated in an embodiment, such as sample statistics comprising a mean and a variance.

Employing a transformation operation with respect to training sample measurement vectors may, as illustrated later, provide a mechanism to discriminate (e.g., ML classify) other measurement vectors, such as for spectral objects, including, in particular, spectral objects other than those used for training. As shall be illustrated, linear or nonlinear transformation operations may associate member measurement vectors, such as for a sample object (e.g., a spectral object), with a scalar distribution, such as, in an embodiment, to produce a binary decision ensemble, as shown below. The term transformation operation refers to transformation of a vector, e.g., a signal sample measurement vector, to a scalar signal value (e.g., signal sample value). However, similar terms may at times be employed without loss of generality, including terms such as functional, functional combination, functional operation and/or function transformation, as examples.

Thus, in an embodiment, a transformation operation may be employed for movement between duals, e.g., between a vector space and a scalar field or vice-versa that comprise a dual space "V", e.g., a transformation operation may comprise a mapping "f" from a space of random vectors "V" to a scalar field "F", such as may be symbolized by V*=f (V→F), for an embodiment. For example, a transformation operation (also called a transform operation herein) may comprise an inner product with respect to vectors, such as training sample measurement vectors. In an embodiment, a transformation operation to produce a scalar signal value may be referred to as a "score" produced with respect to or over a numerical field F, such as to designate a score distribution that may correspond to training sample measurement vectors, illustrated, for example, by 604 of FIG. 6. A variety of transformation operations may be employed in an embodiment. For example, as shall be shown, a linear transformation operation may be employed, such as with respect to embodiment 600. Likewise, in an embodiment, a linear transformation operation may be formulated using training class sample statistics, although other approaches are also possible and contemplated within claimed subject matter scope.

Figure 8:
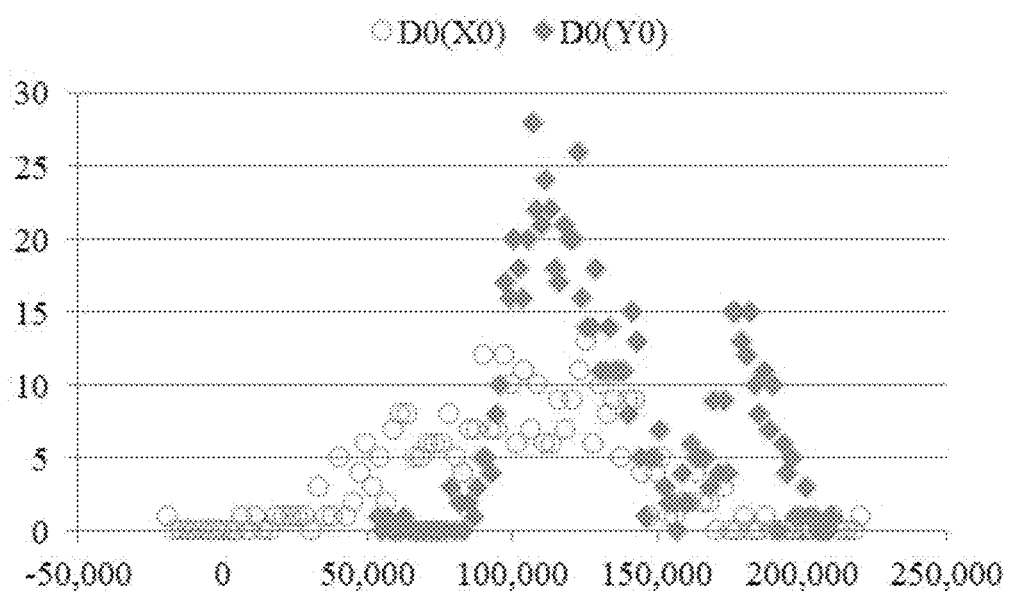
FIG. 8 is a histogram plot of score values showing an embodiment of a Jurkat training cell in a bright field image.

In an embodiment, a dual space may include a unity linear transform (e.g., transformation) operation, which may, for example, be used to characterize a score distribution substantially in accordance with the following relation:

$$D_1 = 1 \cdot \hat{x} = \sum_{j=1}^{p} \hat{I}(j), \quad (1)$$

where $\hat{x}_j = \hat{I}(j)$ comprises a measurement vector of components, e.g., shown in FIG. 7, as shall be described later in more detail. Likewise, in an embodiment, a linear scale vector $\lambda_{AB}$ may be generated from training class sample statistics, that is, in this example, for samples A and B, and via a transform (e.g., transformation) operation, such as a linear transform operation, a dual space score distribution (also referred to simply as "score distribution") may be generated substantially in accordance with the following relation:

$$D_{AB}(\hat{x}) = \lambda_{AB} \cdot \hat{x} = \sum_{j=1}^{p} \lambda_{(AB)j} \hat{x}_j, \quad (2)$$

e.g., an example is provided in FIG. 8, as shall be described later in more detail.

A quantifiable increase in a capability to discriminate between samples of a training class sample pair may be accomplished by employing a transformation operation of member measurement vectors, such as via a sieve type process, as shall be shown, for example, in an embodiment, such as 600. Embodiments may, for example, employ a technique to generate a linear scale vector $\lambda_{AB} = [\lambda_1, \ldots \lambda_p]_{AB}$, which may be used to discriminate or ML classify a set of training class sample vectors, for example, $\hat{x}_A = [\hat{x}_1, \ldots \hat{x}_p]_A$, such as from another training class sample set of training class sample vectors, for example, $\hat{x}_B = [\hat{x}_1, \ldots \hat{x}_p]_B$, as well as to ML classify other sample vectors. An embodiment, for example, may employ first and second order sample statistics produced for score distributions with respect to associated training class measurement vectors via use of a transformation operation.

For example, for an embodiment, a mean difference per component, substantially in accordance with the following relation: $<d_j> = <x_j>_A - <x_j>_B$, may comprise a first order sample statistic. Likewise, a covariance matrix $\mathbb{C} = [C_{jk}]$, that may be substantially in accordance with the following: matrix components $C_{jk}=(<\delta x_j \delta x_k>_A + <\delta x_j \delta x_k>_{BB})$, averaged over a pooled set of measurement vector members for a training class sample pair A and B in which variation may be substantially in accordance with $\widehat{\delta x}_j = \hat{x}_j - <x_j>_T$, for a given class T (A or B, for example), may comprise a second order statistic, for an embodiment. Thus, a mean difference in respective scores for two training class sample object sets A and B may be expressed as substantially in accordance with the following, for an embodiment:

$$\Delta_{AB} = \lambda_{AB} \cdot <d> \times \lambda_{AB} \cdot <\hat{x}_A - \hat{x}_B> = <D_{AB}(\hat{x}_A)> - <D_{AB}(\hat{x}_B)>.$$

For an embodiment, a scale vector $\lambda_{AB}$ may be found, or at least approximated, via computation of separation or relative proximity between two score distributions, that respectively correspond to two training class sample objects, such as for this illustrative example. A Fisher distance, see R. Fisher "The use of multiple measurements in taxonomic problems" Annals of Eugenics 7, 179-188, (1936), may, for an embodiment, be chosen as a separation measure (e.g., measure of relative proximity). It may be computed by forming a ratio using sample statistics previously discussed as first and second order. Thus, a Fisher distance, $F_{AB} \equiv \Delta_{AB}/2Q_{AB}^{1/2}$ with covariance matrix $\mathbb{C}(\lambda_{AB}) = [\lambda_j \lambda_k C_{jk}]$ of measurement vectors $\widehat{\lambda x} = [\widehat{\lambda_1 x_1}, \ldots \widehat{\lambda_p x_p}]$ that have been scaled appropriately, as shown, and $Q_{AB} = \Sigma_{j,k=1}^{P} C(\lambda_{AB})_{jk} = \Sigma_{j,k=1}^{P} \lambda_j \lambda_k C_{jk}$, comprising a sum over covariance matrix components.

Relative statistical proximity between two score distributions may potentially be increased via use of a derivative operation. Thus, as follows, a condition $\partial F_{AB}/\partial \lambda_j = 0$ may be employed, such that a nonlinear relation may result between a scale vector and first and second order statistics for a training class sample pair, substantially in accordance with: $\partial \ln Q_{AB}/\partial \lambda_j = \partial \ln \Delta_{AB}^2/\partial \lambda_j$.

Thus, in an embodiment, a nonlinear relation, for example, may be addressed via a linear approximation to be made between a scale vector and first and second order statistics of a training class sample object set pair. An embodiment of a sieve type process may employ such a relation, e.g., as a linear approximation embodiment, such that distinct and/or disjoint training subsets result e.g., as described below regarding distinct and/or disjoint scores or score distributions. Likewise, an embodiment of a sieve type process may be iterative, such as employing iterative filtering of sample subsets of measurement vectors to further characterize a training class pair and potentially result in performance improvement. In an embodiment, characterization of a training class pair, for example, may be generated by use of a binary decision ensemble. A linear approximation may be obtained, for an embodiment, by setting Q/$\Delta$ =constant. Thus, a scale vector e.g., abbreviated $\lambda_{AB}$, may be computed substantially in accordance with the following relation:

$$\lambda_{AB} = \mathbb{C}^{-1} <d> \quad (3)$$

using a pooled covariance inverse matrix and a mean separation of two score distributions corresponding to respective training sample objects, as previously suggested. In implementation, scale vector components $\lambda_j$ comprise linear discriminants formed with respect to a covariance matrix inverse. A covariance matrix condition test may, for an embodiment, be used to determine if a covariance matrix inverse in relation (3) exists and is well-conditioned. LU ('lower upper') decomposition comprises a possible technique to determine existence of a matrix inverse for an embodiment, see *Numerical Recipes* pp. 48-54. If an inverse exists, it is nonsingular and has a nonzero determinant, as desired. Operations may further comprise, for a processor implementation, computer instructions to test a covariance matrix condition to determine if signal measurement vector component dimension reduction is to be employed. Relatively more accurate results may potentially be achieved, for example, if a dimensional reduction process is implemented. A dimensional reduction process may include a covariance matrix condition test, mentioned in "A System for Image Rendering or Spectral Recognition" M. Gesley U.S. Pat. No. 8,913,121 B2 (Dec. 16, 2014). If passed, measurement vector dimensionality is sufficient for random object ML classification, as previously described. If failed, a dimensional reduction approach may be applied until passed, for example. A covariance matrix condition test may generate a well-conditioned covariance matrix such that linear discriminants, in general, may be employed to yield reasonably accurate scores (e.g., at least sufficient for ML classification to be reasonably accurate on a reasonably consistent basis). Dimensional reduction may be employed if a covariance matrix is ill-conditioned. One approach to resolve an ill-conditioned covariance matrix may be to randomly omit a vector component, test the covariance matrix condition and repeat the process. Other techniques are also possible, e.g., filtering. Raman spectroscopy example provides a case where sample number is less than channel dimensionality and dimensional reduction is employed. However, for embodiments described herein, using described measurement sample sizes with bright-field intensity vectors comprising 11 components (e.g., '11-dimensional' vectors) and/or dark-field intensity vectors comprising 14 components (e.g., '14-dimensional' vectors), measured with a visible light scattering detector, are able to achieve a covariance matrix condition without dimensional reduction, e.g., as given by relation (3).

Of course, relative proximity may be formulated via approaches other than use of Fisher distance, including other than use of associated first and second order sample statistics generated from score distributions, which was described for an illustrative embodiment. Thus, claimed subject matter is not intended to be limited in scope to illustrations, such as the foregoing. As an example, scatter between training samples may be normalized with respect to scatter within training samples, e.g. see *Introduction to Statistical Pattern Recognition* pp. 131-137 and 445-451; however, experience indicates that Fisher distance provides an appropriate measure (e.g., at least sufficient for ML classification to be reasonably accurate on a reasonably consistent basis). Thus, for an embodiment, a transform operation, such as a linear transform operation, may be formulated substantially in accordance with training class sample statistics, e.g., as previously discussed, for an embodiment, a ratio of mean differences to a joint covariance, such as may result in relation (3), which may be employed in conjunction with relation (2), for example, to process sample object measurement vectors. Likewise, score distributions (e.g., scalar signal value distributions) corresponding to processed measurement vectors, for an embodiment, for example, may be generated. Again, as indicated, claimed subject matter is not intended to be limited to a particular form of a transform operation. Thus, for example, in alternate embodiments, other transform operators (e.g., to perform transformation operations) may comprise nonlinear operations and/or different linear operations. Likewise, measurement vectors of sample objects, for example, in an alternative embodiment may be processed and generate associated score distributions. Continuing, however, with an embodiment, such as 600, shown in FIG. 6, a training class sample pair A=X0 and B=Y0 may generate a scale vector $\lambda_0$ from first- and second-order training class statistics and respective score distributions, e.g., D0 $(\hat{x}_A)=\lambda_0(X_0, Y_0) \cdot \hat{x}_A$ and D0 $(\hat{x}_B)=\lambda_0(X_0, Y_0) \cdot \hat{x}_B$. A scale vector relabeled $\lambda_0=\lambda_{AB}$ may be employed to more explicitly indicate operations that may be iterated, for an embodiment, as further described below.

Referring, again, to FIG. 6, an embodiment of a sieve type process, such as 600, may employ two binary decision types, substantially in accordance with operation 605, for example. A first binary decision type may employ a particular inequality assignment, e.g., an inequality relation D0 $(\hat{x}) \leq b$ between a score (e.g., generated as a "dual" of a member measurement vector after a transform operation, as previously discussed) and a threshold-bias; likewise, a second binary decision type may employ an inequality assignment as a complement to a first binary decision type, e.g., a relation D0 $(\hat{x}) \geq b$ may comprise a complementary inequality with respect to D0 $(\hat{x}) \leq b$, above. More about a second binary decision type for an embodiment is discussed below after discussion regarding a first binary decision type for an embodiment. However, an outcome of a process, such as illustrated below, in an embodiment, may, in effect, determine a set of conditions that produces less error than a complementary set of conditions, with respect to training class sample measurement vectors, for example. Those conditions that produce less error may in an embodiment be employed to generate sample statistics, as previously described and as illustrated in more detail below. Likewise, sample statistics, as shall be illustrated, may be employed to generate a linear transformation operation, which may then be employed for ML classification, in an embodiment.

For an embodiment, therefore, a first binary decision type may be executed substantially in accordance with an operation, such as shown by 605, in FIG. 6. As an example, consider an inequality, such as a first type shown above, to be evaluated for a training class sample measurement vector $\hat{x}$, in which vector $\hat{x}$ has an associated score D0($\hat{x}$), such as may be determined via use of an appropriately formulated linear transformation operation, in this illustration. Likewise, for this illustration, assume score D0($\hat{x}$)$\leq b_{0+}$ for a threshold-bias $b_{0+}$. If so, then, assign $\hat{x}$ a binary decision result "a"; however, if D0($\hat{x}$)$>b_{0+}$, for this illustration, assign $\hat{x}$ a binary decision result "b".

In an embodiment, such as the foregoing, for example, a binary decision result "a" or "b" with a training class "Y" for a training class member measurement vector produces a true/false (Boolean value) result, e.g., a first binary decision type may provide Y≅a or Y≅b. Thus, in this example, binary decision type conditions may be expressed as complementary logical (e.g., Boolean) signal value results for a training class pair as shown in the following four examples.

In a first example, if a training class "A" sample measurement vector $\hat{x}_A \in X0=A$ is transformed to a score less than or equal to threshold-bias $b_{0+}$, e.g., for an inequality D0($\hat{x}_A$)$\leq b_{0+}$, assign $\hat{x}_A$ a binary decision result "a", such as assign $\hat{x}_A$ a result "$\hat{x}_A$:a". Thus, in this example, A≅a, and a Boolean (signal) value of true, which may be denoted as "1," for example, is a result. Such a condition for a training class "A" member measurement vector $\hat{x}_A$ distribution may also be abbreviated as "True-A". Thus, sample measurement vector membership in training class "A" and a first binary decision type result "a" implies a true (e.g., logical "1") Boolean (signal) value, e.g., "A:a⇒True". Thus, a first binary decision type assigns a result "a" to a measurement vector $\hat{x}_A$ in training class A, if D0 $(\hat{x}_A) \leq b_{0+}$. A corresponding conditional statement may be expressed as (A:a⇒True or True-A); such that a training class "A" sample object member measurement vector may be referenced as a true (e.g., logical "1") Boolean (signal) value, e.g., a "True-A" or "A is true" is a result, in this specific illustrative example.

In a second example, if a training class "B" sample measurement vector $\hat{x}_B \in Y0=B$, is transformed to a score less than or equal to threshold-bias $b_{0+}$, e.g., for an inequality D0($\hat{x}_B$)$\leq b_{0+}$, assign $\hat{x}_B$ a binary decision result "a", such as assign $\hat{x}_B$ a result "$\hat{x}_B$:a". Thus, in this example, B≅a, and a false Boolean (signal) value (e.g., logical "0") is a result. Similar to previously, but also complementary thereto, a false condition for a training class "B" member measurement vector $\hat{x}_B$ may be abbreviated as "False-B". Again, sample measurement vector membership in training class "B" and a first binary decision type result "a" implies a false Boolean (signal) value (e.g., logical "0"), e.g., "B:a⇒False". Thus, a first binary decision type assigns a result "a" to a measurement vector $\hat{x}_B$ in training class B, if D0 $(\hat{x}_B) \leq b_{0+}$. A conditional statement may be expressed as (B:a⇒False or False-B); such that a training class B sample object member measurement vector may be referenced as a false Boolean (signal) value (e.g., logical "0"), e.g., a "False-B" or "B is false" is a result, for this specific illustrative example.

As one may expect, the complements of the foregoing may also be possible. Thus, in a third example, if D0($\hat{x}_B$)$\geq b_{0+}$, assign $\hat{x}_B$ a binary decision result "b", e.g., assign $\hat{x}_B$ a result "$\hat{x}_B$:b". Thus, a first binary decision type assigns a result "b" to a measurement vector in training class B, e.g., sample member $\hat{x} \in Y0=B$ abbreviated $\hat{x}_B$ and a binary decision of true, e.g., "B" corresponds to "b", or B=b, results in a true (e.g., logical "1") value. A first binary decision type (True-B) assigns a true (e.g., logical "1") value if a training class "B" member measurement vector is assigned a binary decision "b" result by evaluating a conditional relation D0($\hat{x}_B$)$>b_{0+}$, such as also may be expressed: if $\hat{x}_B \in Y0=B$ and D0 $(\hat{x}_B)>b_{0+}$, assign $\hat{x}_B$ a result "b" ($\hat{x}$:b) and B:b⇒True.

In a fourth and final example of a first binary decision type, if D0($\hat{x}_A$)$>b_{0+}$, assign $\hat{x}_A$ a binary decision result "b", e.g., assign $\hat{x}_A$ a result "$\hat{x}_A$:b". Thus, a first binary decision type assigns a result "b" to a measurement vector in training class "A", e.g., sample member $\hat{x} \in X0=A$ abbreviated $\hat{x}_A$ and a binary decision of false, e.g., "A" corresponds to "b", or A≅b, results in a false (e.g., logical "0") value. A false first binary decision type (False-A), thus, for this example, assigns a false (e.g., logical "0") value if a training class "A" member measurement vector is assigned a binary decision "b" result, by evaluating a conditional relation D0($\hat{x}_A$)$>b_{0+}$, such as may be expressed: if $\hat{x}_A \in X0=A$ and D0($\hat{x}_A$)$>b_{0+}$ assign $\hat{x}_A$ a result "b" ($\hat{x}_A$:b) and A:b⇒False.

Training class sample object member measurement vectors evaluated by a first binary decision type generate member score distributions, e.g., a training class sample A distribution of True-A (e.g., logical signal value of "1") or a training class sample A distribution of False-A (e.g., logical signal value of "0") substantially in accordance with a first binary decision type inequality. A distribution with respect to training class sample object member measurement vectors may be calculated by summing over a range of corresponding scores that resulted in respective logical signal values, e.g., logical "0" or logical "1," respectively, as described above, for an embodiment. For example, summation ranges for a first binary decision type may comprise:

(i) for a training class sample A score distribution: a True-A (A:a) distribution, from a low score to, and including, a threshold-bias score; and for a False-A (A:b) distribution, from, but excluding, a threshold-bias score to a high score;
(ii) for training class sample B score distribution: a False-B (B:a) distribution from a low score to, and including, a threshold-bias score; and for a True-B (B:b) distribution, from, but excluding, a threshold-bias score to a high score.

Figure 9:
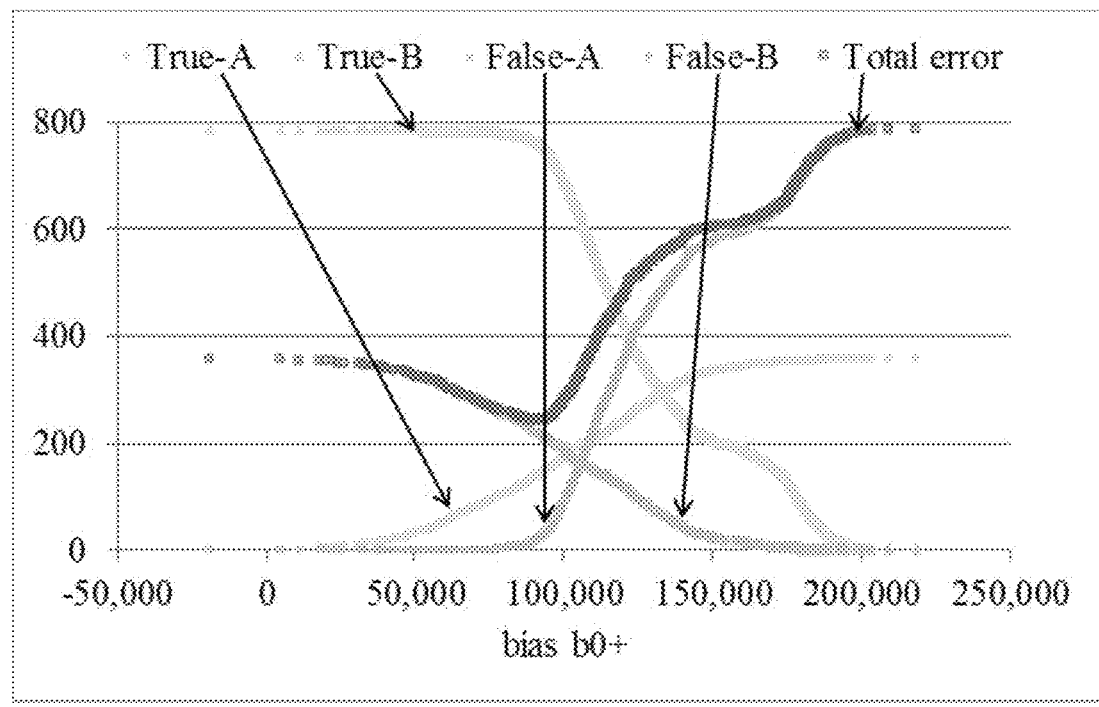
FIG. 9 is a plot of Jurkat bright field score distributions for an embodiment.

An unweighted error distribution and member distributions (e.g., samples A and B, in this example) may be related substantially as follows:

$$\in(b_{0+})=n(\text{False-}A(b_{0+}))+n(\text{False-}B(b_{0+}))=n(A{:}b)+n(B{:}a),$$

e.g., FIG. 9 includes a plot of Jurkat bright field distributions in which, for an embodiment employing a first binary decision type, n(A: b) corresponds to a computed number of "false" member measurement vectors of training sample class A, substantially in accordance with the example approach previously described, and n(B:a) corresponds to a computed number of "false" member measurement vectors of training sample class B, also substantially in accordance with the example approach previously described.

A training class sample size may be calculated as a sum taken over a corresponding score distribution, if score occurrences are respectively given a value of one. Alternatively, a score occurrence may be assigned other values, e.g., if occurrences are uniformly assigned a weight corresponding to the inverse of a training set size, the sum over a sample is equal to one, as described further in connection with computation of class sample size, and shown by 606 of FIG. 6; or an occurrence may be associated with a pre-assigned probability density or with another function, such as an example, having values to reflect associated, computed costs, for example.

Set size may in some cases bias a decision, such as if a training class sample pair is being evaluated, particularly if respective sizes differ by a relatively large amount, e.g., in a Jurkat bright field embodiment, cell object size is smaller relative to a background sample, respectively $n(X_0)=357<<n(Y_0)=784$. If there is no prior knowledge on set size, a known preference may not exist as between respective large or small sets. Thus, a set size adjustment may be made, as shown for 606 of FIG. 6. For example, a score for a member of set A may be assigned a value 1/n(A). Score histograms shown thus far have an assigned value of one per score "event" (e.g., measurement vector) so that a sum of events corresponds to set size. By normalizing values to 1/n(A), a sum over a training set corresponds to one (such as suggested previously). However, adjustment may not necessarily be appropriate in some cases, such as based on prior knowledge, for example. Likewise, however, an error estimate may be adjusted with a probability or cost function, as appropriate, in some situations, also mentioned previously.

Figure 10:
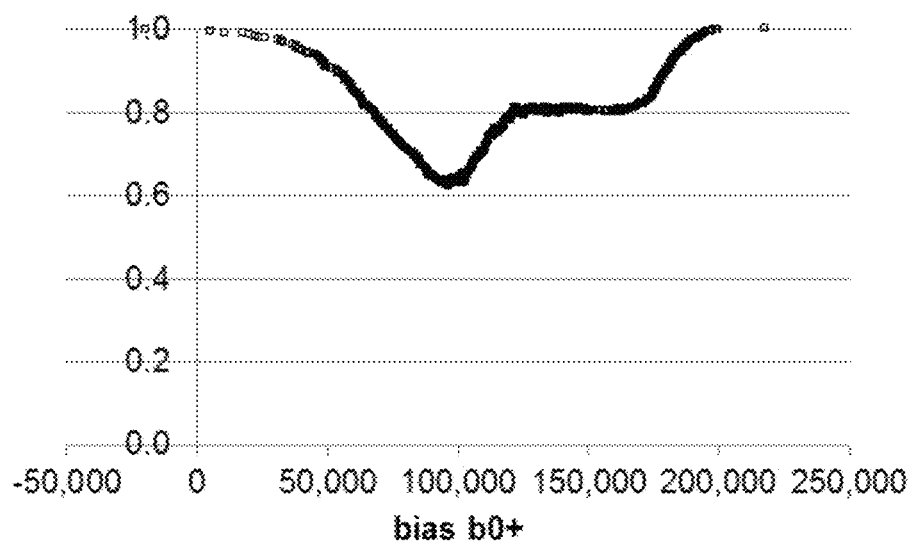
FIG. 10 is a plot of an example weighted error score distribution for an embodiment.

In embodiments below, a training class sample size bias, again, may be taken into account via adjustment, such as shown for 606 in FIG. 6. For example, an embodiment employing a set size adjustment is, as shown in FIG. 10, illustrating a plot in which a Jurkat bright field (JurBF) weighted (normalized) error score distribution from a first binary decision produces a weighted error that may be expressed as:

$$\in'(b_{0+}=96,370)=n(\text{False-}A)/n(X0)+n(\text{False-}B)/n(Y_0)=198/357+51/784=0.62.$$

For an embodiment, a second binary decision type may also be executed substantially in accordance with an operation, such as shown by 605, in FIG. 6. Similar to previously, consider a conditional inequality evaluated for a training class sample measurement vector $\hat{x}$, in which an Associated Score May be Determined Via Use of an appropriately formulated linear transformation operation, for example. Thus, in an embodiment, if score $D0(\bar{x}){\geq}b_{0+}$ for threshold-bias $b_{0+}$, assign $\hat{x}$ a binary decision result "a"; otherwise, if $D0(\hat{x})<b_{0+}$, assign $\hat{x}$ a binary decision result "b". Likewise, as discussed previously, a binary decision result "a" or "b" with a training class "Y" for a training class member measurement vector produces a true/false (Boolean signal value) result, e.g., a second binary decision type may provide $Y{\cong}a$ or $Y{\cong}b$. Thus, again, as in the previous example, binary decision type conditions may be expressed as complementary logical (e.g., Boolean) signal value results for a training class pair as shown in the following four examples.

In a first example, if a training class "A" sample measurement vector $\hat{x}_A{\in}X0{=}A$ is transformed to a score less than or equal to threshold-bias $b_{0+}$, e.g., for an inequality $D0(\hat{x}_A){\geq}b_{0+}$, assign $\hat{x}_A$ a binary decision result "a", such as assign $\hat{x}_A$ a result "$\hat{x}_A$:a". Thus, in this example, $A{\cong}a$, and a Boolean signal value of true, which may be denoted as "1," for example, is a result. Such a condition for a training class "A" member measurement vector $\hat{x}_A$ may also be abbreviated as "True-A". Thus, sample measurement vector membership in training class "A" and a second binary decision type result "a" implies a true (e.g., logical "1") Boolean signal value, e.g., "A:a$\Rightarrow$True". Thus, a first binary decision type assigns a result "a" to a measurement vector $\hat{x}_A$ in training class A, if $D0(\hat{x}_A){\geq}b_{0+}$. A corresponding conditional statement may be expressed as (A:a$\Rightarrow$True or True-A); such that a training class "A" sample object member measurement vector may be referenced as a true (e.g., logical "1") Boolean signal value, e.g., a "True-A" or "A is true" is a result, in this specific illustrative example.

In a second example, if a training class "B" sample measurement vector $\hat{x}_B{\in}Y_0{=}B$, is transformed to a score greater than or equal to threshold-bias $b_{0+}$, e.g., for an inequality $D0(\hat{x}_B){\geq}b_{0+}$, assign $\hat{x}_B$ a binary decision result "a", such as assign $\hat{x}_B$ a result "$\hat{x}_B$:a". Thus, in this example, $B{\cong}a$, and a false Boolean signal value (e.g., logical "0") is a result. Similar to previously, but also complementary thereto, a false condition for a training class "B" member measurement vector may be abbreviated as "False-B". Again, sample measurement vector membership in training class "B" and a second binary decision type result "a" implies a false Boolean signal value (e.g., logical "0"), e.g., "B:a$\Rightarrow$False". Thus, a second binary decision type assigns a result "a" to a measurement vector $\hat{x}_B$ in training class B, if $D0(\hat{x}_B){\geq}b_{0+}$. A conditional statement may be expressed as (B:a$\Rightarrow$False or False-B); such that a training class B sample object member measurement vector may be referenced as a false Boolean signal value (e.g., logical "0"), e.g., a "False-B" or "B is false" is a result, for this specific illustrative example.

As one may expect, the complements of the foregoing may also be possible. Thus, in a third example, if $D0(\hat{x}_B)<b_{0+}$, assign $\hat{x}_B$ a binary decision result "b", e.g., assign $\hat{x}$ a result "$\hat{x}_B$:b". Thus, a second binary decision type assigns a result "b" to a measurement vector in training class B, e.g., sample member $\hat{x}{\in}Y_0{=}B$ abbreviated $\bar{x}_B$ and a binary decision of true, e.g., "B" corresponds to "b", or $B{\cong}b$, results in a true signal value (e.g., logical "1"). A second binary decision type (True-B) assigns a true signal value (e.g., logical "1") if a training class "B" member measurement vector is assigned a binary decision "b" result by evaluating a conditional relation $D0(\hat{x}_B)<b_{0+}$, such as also may be expressed: if $\hat{x}_B \in Y0=B$ and $D0(\hat{x}_B)<b_{0+}$, assign $\hat{x}_B$ a result "b" (b) and B:b⇒True.

In a fourth and final example of a second binary decision type, if $D0(\hat{x}_A)<b_{0+}$, assign $\hat{x}_A$ a binary decision result "b", e.g., assign $\hat{x}_A$ a result "$\hat{x}_A$:b". Thus, a second binary decision type assigns a result "b" to a measurement vector in training class "A", e.g., sample member $\hat{x} \in X0=A$ abbreviated $\hat{x}_A$ and a binary decision of false, e.g., "A" corresponds to "b", or A≐b, results in a false signal value (e.g., logical "0"). A false second binary decision type (False-A), thus, for this example, assigns a false signal value (e.g., logical "0") to a training class "A" member measurement vector assigned a binary decision "b" result, by evaluating a conditional relation $D0((\hat{x}_A)<b_{0+}$, such as may be expressed: if $\hat{x}_A \in X0=A$ and $D0(\hat{x}_A)<b_{0+}$ assign $\hat{x}_A$ a result "b" ($\hat{x}_A$:b) and A:b⇒False.

Training class sample object member measurement vectors evaluated by a second binary decision type generate member score distributions, e.g., a training class sample A distribution of True-A (e.g., logical signal value of "1") or a training class sample A distribution of False-A (e.g., logical signal value of "0") substantially in accordance with a second binary decision type inequality. A distribution with respect to training class sample object member measurement vectors may be calculated by summing over a range of corresponding scores that resulted in respective logical signal values, e.g., logical "0" or logical "1," respectively, as described above, for an embodiment. For example, summation ranges for a second binary decision type may comprise:
(i) for a training class sample A score distribution: a True-A (A:a) distribution from, and including, a threshold-bias score, to a high score; and for a False-A (A:b) distribution, from a low score to, but excluding, a threshold-bias score;
(ii) for training class sample B score distribution: a False-B (B:a) distribution from, and including, a threshold-bias score, to a high score; and for a True-B (B:b) distribution from, a low score to, but excluding, a threshold-bias score.

Generally, there is no prior knowledge that a first or second binary decision type inequality properly associates a training class sample member measurement vector with a particular score distribution. A binary decision inequality threshold-bias segmentation of a score distribution and true/false membership of a measurement vector may, therefore, employ an additional condition, in an embodiment, to select one of two binary decision types. For example, a selection may be made by choosing a binary decision type to reduce weighted error, such as for 607 of FIG. 6, in an embodiment.

Figure 11:
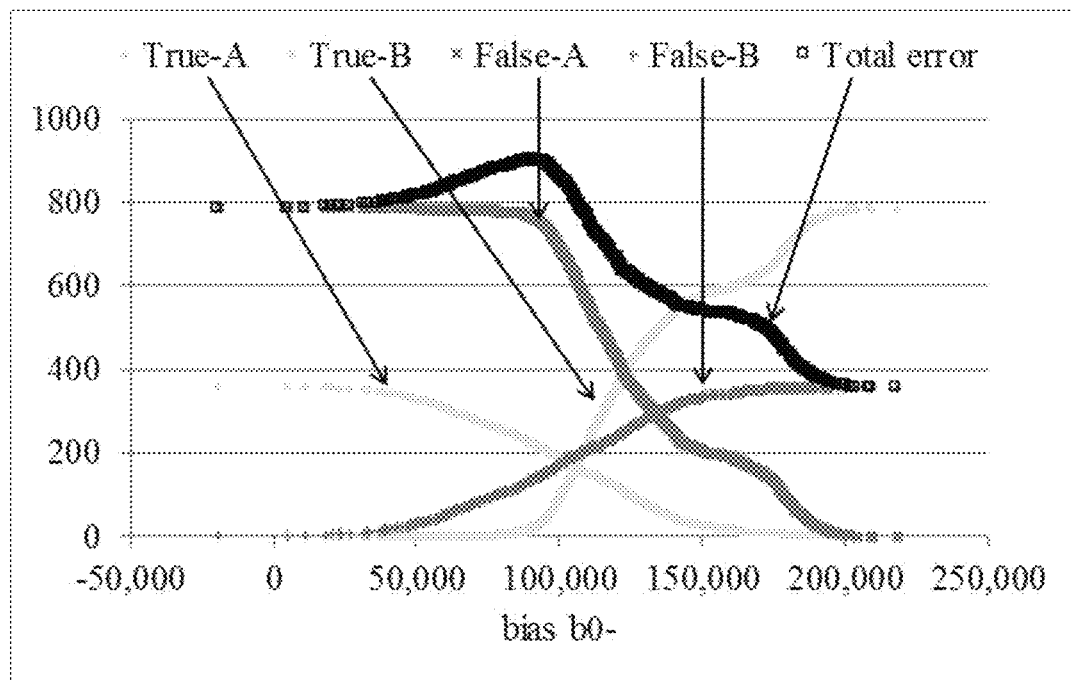
FIG. 11 is a plot of Jurkat bright field score distributions for an embodiment.

For example, a relative comparison of unweighted JurBF member distributions provided by a second binary decision type (FIG. 11) and an unweighted first binary decision type (FIG. 9) may be made. In embodiments, however, corresponding weighted distributions may also be employed, as described below. For example, FIG. 9 shows a first binary decision type corresponding to a weighted error threshold-bias for Jurkat bright field case as shown in FIG. 10. If a range of threshold-biases correspond to a weighted error, a lower bound may be chosen without loss of generality. Thus, in an embodiment, linear discriminant transformation operation and a weighted error threshold-bias may be derived from training class sample statistics with a convergent result. Training class sample statistics and an error threshold-bias may result in a linear transformation operation, such as shown by 608 of FIG. 6, e.g., as employed in embodiments below, provided as illustrations.

A sieve type process embodiment, such as 600, illustrated in FIG. 6, may be employed to generate a transformation operation, such as a linear transformation operation in this example, using training class sample pair statistics, illustrated, for example, by 603. For example, a scale vector and a weighted error threshold-bias, e.g., respectively $\lambda_0(X_0, Y_0)$ and $b_{0\pm}$, may be determined, such as via evaluation and comparison of binary decision types, as discussed previously, by example. Thus, using a conditional inequality, for implementation on a processor, in an illustrative embodiment, computer instructions may be executed, for example, to generate a weighted error binary decision. A weighted error binary decision may be generated, as previously shown, for example, by training class sample score distributions. Likewise, measurement vectors may be filtered, shown, for example, by 609. Doing so, may, for example, provide an improved capability for ML classification, as shall be illustrated. Thus, in an embodiment, remaining training class member measurement vectors may be collected in a set for further sieve type processing, a statement which may be expressed as: $\{\hat{x} \in A:a\}=A_1 \subseteq A_0$ and $\{\hat{x} \in B:b\}=B_1 \subseteq B_0$.

As shown, a binary decision technique may use relation (3) and provide an approximate linear result. However, if a single binary decision comprising a weight vector and scalar threshold-bias is employed, results may not perform as well as desired. That is, errors may result in making decisions. For example, training class pair sample object member measurement vectors may not be sufficiently separated and relatively more errors may occur on a so-called statistical basis. To be more specific, in an embodiment, score distributions may overlap to an extent that it may be challenging to resolve ML classification for a given independent random measurement vector, such as, with respect a training class sample pair, using a training class sample vector of the pair, the independent random measurement vector is to be ML classified.

Sufficiently distinct training class samples may include those corresponding to disjoint member score distributions. However, a training class sample pair ($A=X0$ and $B=Y_0$) may not necessarily yield disjoint scores ($D(X0) \cap D(Y0) = 0$), e.g., Jurkat cell brightfield histogram shown in FIG. 8 is not disjoint. It is noted, however, a set may not necessarily be disjoint, but may nonetheless be sufficiently distinct. In an embodiment, to continue to improve separation so as to provide adequate resolution (e.g., adequate distinguishing) of score distributions, which is desirable, a sieve-type process may begin with a set of measurement vectors and=may be iterated to reduce the set of measurement vectors, e.g., after measurement vectors are removed via filtering, in an embodiment.

In an embodiment, a binary decision approach, as previously illustrated, for example, may, with respect to training class sample measurement vectors, separate, and filter selected ones from a set thereof, as shown in 609. A binary decision may be employed to compare a training class sample object member measurement vector with a weighted decision error scalar-valued threshold $b_{j\pm}$. If training class sample space distributions are not sufficiently distinct, as previously described, for example, for sufficient resolution, statistics of training class sample measurement vectors may be calculated, and a transformation operation, such as a linear transformation operation, may be generated using training class sample pair statistics. This may permit filtering of measurement vectors, as just mentioned. Thus, in an embodiment, for example, a sieve-type process may be iterated, such as in this fashion, so that sufficiently distinct score distributions result. A binary decision ensemble, such as in 602 of FIG. 6, for example, refers to a sequence of successive binary decisions in a sieve-type process.

Likewise, sample measurement vectors via respective training class score distributions may be sufficiently distinct to be separately resolvable from one another. As indicated, disjoint score distributions of respective training class sample pair object member measurement vectors are distinct, e.g., $\{D(\hat{x} \in A:a)\} \cap \{D(\hat{x} \in B:b)\} \neq 0$. However, a distinct set may not necessarily be disjoint, as mentioned previously. Thus, in some cases, it is possible that training class sample object measurement vector score distributions may not result in disjoint sets, but may nonetheless be sufficiently distinct to be resolvable from one another, as is desirable. In this context, sufficiently distinct refers to a sufficient separation between score distributions is a dual space so that using an appropriate statistic measure, such as a chi square and/or other goodness-of fit test, as an example, as previously described, respective scope distributions may be adequately resolved. Likewise, heterogeneous object populations are sufficiently distinct at least with respect to a particular transform operation if a particular transform operation results in a sufficient separation between score distributions so that the score distributions are sufficiently distinct. In embodiments below, a binary decision ensemble, as shown in 602, for example, comprises filtered distinct (and potentially disjoint) measurement vectors associated with training class sample member measurement vector distributions.

Figure 12:
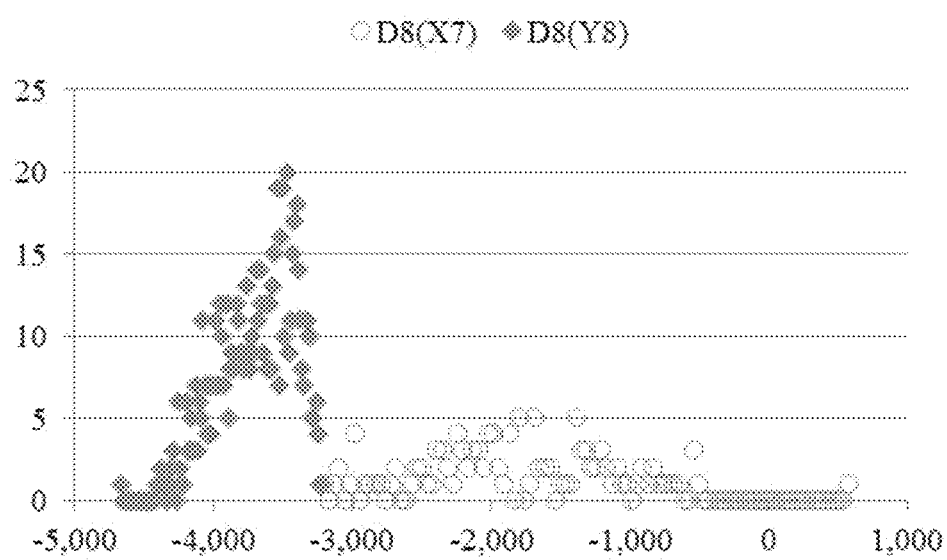
FIG. 12 is a histogram plot showing an example in which for an embodiment a disjoint score distribution has been produced for a Jurkat bright field image.

Thus, as illustrated by example, a binary decision may be employed to filter training class sample object member measurement vectors $\hat{x}$, such has shown in 609 by, for example, executing instructions to compare a scaled score $D_j(\hat{x}) = \lambda_j(A_j, B_j) \cdot \hat{x}$ to a weighted error threshold-bias $b_{j\pm}$, for a jth decision iteration, for example, via a conditional inequality $D_j(\hat{x}) \leq b_{j\pm}$, and producing a Boolean signal value corresponding to a result of the comparison. Likewise, members may be filtered from the set and remaining training class sample object member measurement vectors may be employed in a subsequent iteration of a sieve type process, such as a further iteration via embodiment 600. For example, if t iterations occur, a successive sequence of decisions, (e.g., chain of binary decisions) initiated with a set of training class sample object member measurement vectors, e.g., $X0 \supseteq X1 \ldots \supseteq Xt-1$, may result with a filtered training class sample subset Xt−1 having sufficiently distinct scores, as desired. As indicated previously, for an embodiment, a sequence of successive binary decisions producing a reduced or filtered set of training class sample object member measurement vectors may be referred to as a binary decision ensemble, as shown by 602.

weighted error biases and linear transform operations, e.g., scale vectors, may be stored in memory, such as for later retrieval. TABLE I displays a discriminated binary decision ensemble from exaction of an embodiment of a sieve-type process, generated by a training class sample pair comprising Jurkat cell5 (item 415 in FIG. 4) and background regions 405-408 processed from a corresponding dark field spectral image. In this illustrative example, disjoint (and, thus, sufficiently distinct) score distributions result after nine iterations with training class sample subset sizes n(X7)=125 and n(Y8)=681, (e.g., FIG. 12).

Thus, for a sieve-type process embodiment, such as 600, for example, iterative operations, involving a set of training class sample object member measurement vectors set, may be employed to evaluate members thereof via a dual space domain so as to generate and use a transformation operation which may also be employed to perform ML classification, as described below. As mentioned, the foregoing example is merely provided as one illustration; rather, within subject matter being claims other sieve scheme embodiments may use different linear scale vectors and/or nonlinear operations to generate score distributions, for example.

Figure 13:
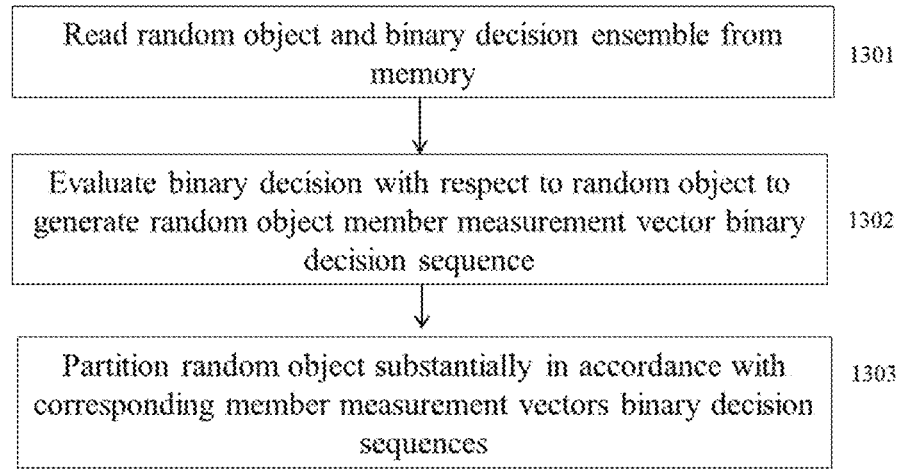
FIG. 13 is a schematic flow diagram showing an embodiment in which a random object is partitioned.

In an embodiment, therefore, a binary decision ensemble may be employed to ML classify one or more random spectral objects, as an illustrative example. FIG. 13 is a schematic flow diagram showing an embodiment 1300 of a method in which a random object may be partitioned. A random object, such as a random spectral object, for example, may be read from memory, in an embodiment. Likewise, a binary decision ensemble, in an embodiment, that may have been generated and stored in memory, such as previously described with respect to the embodiment of FIG. 6, may likewise be retrieved, as shown, for example, by 1301 of FIG. 13.

In an embodiment, a binary decision ensemble corresponding to a random object comprises a sequence of successive binary decisions for a member measurement vector captured via a character string, such as shown in 1302. Thus, t-iterated binary decisions, e.g., a character string comprising a "t-string" sequence of t binary labels, respectively, a(b) . . . a(b). In the foregoing character string representation, "a(b)" signifies "a" or "b" but not both, for successive binary decisions for a random object corresponding to the particular binary decision ensemble in this illustration.

Thus, in an embodiment, a random object member measurement vector t-string, e.g., xObj={$\pi_i$; t-string}, may be ML classified via a corresponding binary decision sequence (e.g., here, a binary decision ensemble), such as shown in 1303. As an example, a binary decision sequence may be

TABLE I

| | p1 | p2 | p3 | p4 | p5 | p6 | p7 | p8 | p9 | p10 | p11 | p12 | p13 | p14 | Binary decisions |
|---|---|---|---|---|---|---|---|---|---|---|---|---|---|---|---|
| λ0 | 1.00 | −7.88 | 11.7 | −42.9 | 0.54 | 11.0 | 6.51 | −47.1 | 59.6 | 10.8 | 19.1 | −24.3 | −7.28 | 31.2 | b0+ = 96,370 > D0(x) |
| λ1 | 1.00 | 0.39 | −0.88 | 3.00 | −0.45 | −2.61 | −0.37 | 5.05 | −3.14 | −2.12 | −0.36 | 0.07 | −0.02 | −1.95 | b1−= −12,966 < D1(x) |
| λ2 | 1.00 | −0.46 | −0.34 | 0.99 | −0.61 | −0.75 | −0.35 | 1.81 | −0.46 | −0.58 | −0.07 | −0.32 | −0.38 | −0.30 | b2− = −4,929 < D2(x) |
| λ3 | 1.00 | −0.58 | −0.34 | 0.72 | −0.70 | −0.48 | −0.30 | 1.29 | −0.11 | −0.25 | −0.01 | −0.24 | −0.52 | −0.06 | b3− = −3,730 < D3(x) |
| λ4 | 1.00 | −0.61 | −0.29 | 0.59 | −0.72 | −0.39 | −0.24 | 1.03 | 0.02 | −0.10 | −0.06 | −0.14 | −0.56 | 0.02 | b4−= −3,105 < D4(x) |
| λ5 | 1.00 | −0.61 | −0.26 | 0.56 | −0.82 | −0.38 | −0.24 | 0.93 | 0.05 | 0.02 | −0.04 | −0.10 | −0.63 | 0.07 | b5− = −2,928 < D5(x) |
| λ6 | 1.00 | −0.60 | −0.24 | 0.53 | −0.90 | −0.39 | −0.31 | 0.97 | 0.11 | 0.08 | −0.02 | −0.13 | −0.66 | 0.09 | b6−= −2,991 < D6(x) |
| λ7 | 1.00 | −0.57 | −0.25 | 0.55 | −1.00 | −0.46 | −0.30 | 1.02 | 0.14 | 0.06 | −0.01 | −0.14 | −0.66 | 0.09 | b7− = −3,235 < D7(x) |
| λ8 | 1.00 | −0.57 | −0.25 | 0.55 | −1.00 | −0.46 | −0.30 | 1.01 | 0.14 | 0.06 | 0.00 | −0.14 | −0.66 | 0.09 | b8− = −3,277 < D8(x) |

Thus, for an embodiment, after such a sequence, a binary decision ensemble comprising an ordered sequence of parsed to produce a result using character string composition, for example, although claimed subject matter is not limited to this illustration. Likewise, as explained below, for an embodiment, a unanimous binary decision rule, for example, may be employed:

i. if binary decisions in a t-string are unanimous character "a", e.g., t-string=a . . . a, set member $\pi_i$; a . . . a is classified as "xObj, a".
ii. if binary decisions in the t-string are unanimous character "b", e.g., t-string=b . . . b, set member $\pi_i$; b . . . b is classified as "xObj, b".
iii. otherwise if binary decisions are mixed, set member $\pi_i$; mixed is classified "xObj, x", which indicates "(not unanimous a) and (not unanimous b)".

The foregoing approach is referred to, here, as a tri-bin approach. Thus, in an embodiment, for example, such as this illustration, a binary decision ensemble with respect to a random object comprises a union of three subsets, e.g., a random object, xObj={$\pi_i$; t-string}, ML classified as, Obj=xObj, a∪xObj, b∪xObj, x.

TABLE II

| pix coord | | Binary decision sequence | | | | | |
|---|---|---|---|---|---|---|---|
| 273 | 521 | wbc | wbc | wbc | wbc | wbc | wbc |
| 274 | 512 | jur | jur | wbc | wbc | wbc | wbc |
| 274 | 513 | jur | jur | jur | jur | jur | jur |

As further illustration of a tri-bin approach with a binary decision sequence t-string, such as may be employed with respect to 1302, for an embodiment, for example, a binary decision ensemble "S(J1e)^S(W1c)" may be generated in the manner previously described in a sieve-type process to produce a result of (t=6) binary decisions. In this example, a corresponding training class sample pair of background discriminated spectral objects comprises: Jurkat cell 5 (item 415 in FIG. 4) noted as S(A)=S(J1e) and normal leukocyte white blood cell (Wbc) (item 301—cell 237 in FIG. 3) noted as S(B)=S(W1c). Training class set sizes comprise n(J1e)= 194 and n(W1c)=238, respectively. Binary decision sequence results of three Jurkat training class sample object member measurement vectors are shown in TABLE II, as an example. A binary decision for a training class sample object member measurement vector here is labeled "a=jur" if true, else labeled "b=wbc", if false.

TABLE III shows, in a specific example, a tri-bin approach with relative bin sizes displayed as a column percentage of training class sample object pair S(J1e) and S(W1c) generated by binary decision ensemble "S(J1e)^S (W1c)". Size comprises the number of assigned members in a subset and a relative bin size is normalized by training class sample size, which, as previously mentioned, may be employed, in some embodiments, as a technique to adjust for set size bias. A training class sample tri-bin, for example, quantifies the number of member measurement vectors associated with unanimous or mixed binary decisions. More refined approaches to binning is possible with a greater number of subsets specified, e.g., with more complex binary decision combinations corresponding to N>3, as discussed below; however, a tri-bin embodiment shown below achieves sufficient classification accuracy for purposes of illustration.

TABLE III

| Jurkat Training cell sample (J1e) | | | Wbc Training cell sample (W1c) | | |
|---|---|---|---|---|---|
| $A_1$ = J1e, jur | 129 | 66% | $B_1$ = W1c, jur | 55 | 23% |
| $A_2$ = J1e, wbc | 32 | 16% | $B_2$ = W1c, wbc | 149 | 63% |
| $A_3$ = J1e, x1 | 33 | 17% | $B_3$ = W1c, x1 | 34 | 14% |
| $\Sigma A_j$ = n(J1e) | 194 | 100% | $\Sigma B_j$ = n(W1c) | 238 | 100% |

In an embodiment, a difference measure may quantitatively distinguish two spectral object partitions. A χ2 (chi-square) statistic measures relative differences between distributions, e.g., where two sets A and B having k bins differ by $$\chi^2(A-B) = \sum_{i=1}^{k} \frac{\left(\sqrt{\frac{B}{A}} A_i - \sqrt{\frac{A}{B}} B_i\right)^2}{A_i + B_i} \quad (4)$$

and $A_i$ and $B_i$ are sizes of their respective ith class [pp. 730-735 *Numerical Recipes*]. For example, TABLE III tri-class training sample pair sizes comprise: $A=A_1+A_2+A_3=194$ and $B=B_1+B_2+B_3=238$. Relation (4) provides a difference measure between two sets, as a systematic way to quantify a set pair difference. A measure substantially in accordance with relation (4) to quantify set pair differences, such as in this example, between sets A and B, is referred as a class difference, relative proximity or simply "distance."

Various approximations also exist if a χ2 statistic does not appropriately capture the quantification sought regarding distributions, e.g., if class sizes are relatively small. Other goodness-of-fit statistics for discrete multivariate values may be employed, which may, depending on specifics, potentially yield relatively better results, e.g., see *Goodness-of-Fit Statistics for Discrete Multivariate Data*. Reed, T. R. C. and Cressie, N.A.C. New York: Springer (1998) pp. 1-4. However, relation (4) is sufficient to demonstrate spectral object classification for embodiments discussed below.

If a difference measure between two object partitions specified by relation (4) satisfies the three conditions that follow, it is referred to as semi-metric, in this context:

$$\chi^2(A-A)=0 \quad \text{(i)}$$

$$\chi^2(A-B) \geq 0 \text{ (non-negativity)} \quad \text{(ii)}$$

$$\chi^2(A-B)=\chi^2(B-A) \text{ (symmetry).} \quad \text{(iii)}$$

If a following fourth relation, referred to as triangle inequality, is also satisfied, along with the prior three conditions above:

$$\chi^2(A-C) \leq \chi^2(A-B)+\chi^2(B-C), \quad \text{(iv)}$$

then a difference measure is referred to as metric, rather than semi-metric, in this context. These conditions find use in some situations as quantification measures among training class sample objects. Likewise, consistent with the foregoing, these conditions may also be useful in connection with a graphical view, such as for evaluation purposes, for example.

TABLE IV

| | |
|---|---|
| J1e, jur – W1c, jur | 47 |
| J1e, wbc – W1c, wbc | 54 |
| J1e, x1 – W1c, x1 | 1 |
| $\chi^2$ [S(J1e) – S(W1c)] | 102 |

It is worth a mention that training class samples S(A) and S(B) partitioned by a corresponding binary decision ensemble "S(A)^S(B)," as an illustrative example of use of a difference measure to quantify results comprises a special type of example, here, since these samples were previously employed to perform training, as described above. Thus, TABLE III, shown above previously, provides tri-bin partitions for Jurkat and Wbc training class samples. Likewise, TABLE IV, shown immediately above, provides computations for an □2-measure and bin component differences.

Figure 14:
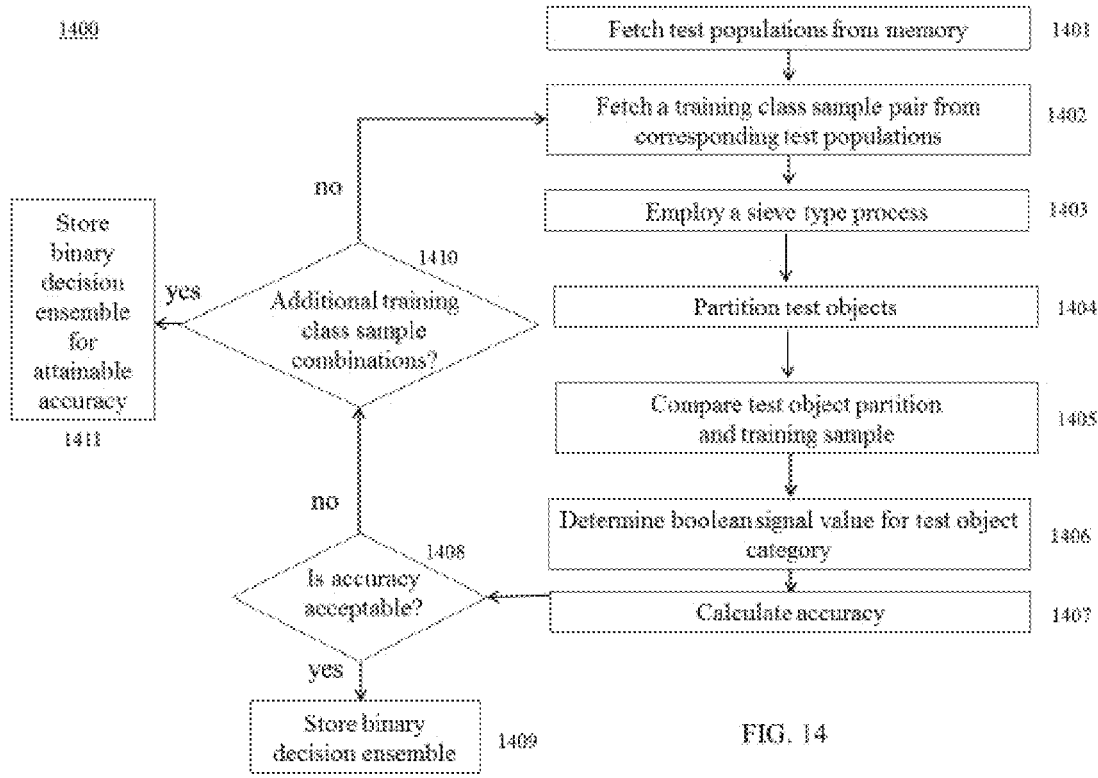
FIG. 14 is a schematic flow diagram showing an embodiment of learning feedback.

FIG. 14 is a flow diagram illustrating an embodiment 1400 in which, in connection with an embodiment of a process to implement a supervised learning machine (SLM), learning feedback may be employed, as previously discussed and shown by 204 of FIG. 2, for example, in an embodiment. As previously suggested, feedback may, for example, be used in an embodiment to potentially improve ML classification accuracy. Thus, for example, in an embodiment, as shown by 1401, two or more test populations may be located or fetched from memory, such that a training class sample pair may be read from two of the test populations, as shown by 1402. A sieve-type process, as previously discussed in 600, for example, may generate a binary decision ensemble, such as shown by 1403, for an embodiment, which may be employed to partition (shown by 1404) and/or otherwise additionally process test objects in a manner to facilitate ML classification thereof.

As was previously mentioned, categorization, in this context refers to processing that involves comparisons made between measurable characteristics, such as between characteristics of a training class and characteristics of a test object, as an illustrative example. Thus, to facilitate ML classification, for example, a category may be specified substantially in accordance with relation (4), such as, in an embodiment. Thus, a difference measurement, such as between a test object and a training class sample pair may be employed in an embodiment to perform categorization, such as shown by 1405. Thus, for example, a test object may be categorized substantially in accordance with a binary decision, such as may result from a relatively closer, more proximate training class, based at least in part on use of relation (4).

For example, for training class sample pair S(A) and S(B), if a test object "tObj" is relatively closer to training class sample "S(A)" than to "S(B)", test object "tObj" may be categorized with respect to training class S(A) (e.g., to facilitate ML classification). Thus, a test object may ultimately be ML classified substantially according to a relatively more proximate training class sample, e.g., a test object "tObj", in relatively closer proximity to training class "A", may be associated with category":cA", and may be categorized "tObj:cA". Likewise, if a test object tObj is relatively closer to training class sample "S(B)" than to "S(A)", test object "tObj" may be categorized substantially according to a relatively more proximate training class sample ":cB", for example. Thus, relation (4) may be employed to categorize test object tObj to facilitate ML classification of test object tObj. In particular, an object, such as a test object, may be associated with a particular category substantially in accordance with relative proximity, which, in an embodiment, may be expressed as a conditional statement:

if $\chi^2(tObj-S(A))<\chi^2(tObj-S(B))$ then $tObj:cA$, else $tObj:cB$.

An object category conditional if/then inequality statement may be restated in an embodiment as:

if $\Delta\chi^2[tObj|S(A)-S(B)]>0$, then $tObj:cB$, else $tObj:cA$, by using a relation $$\Delta\chi^2[tObj|S(A)-S(B)]\equiv\chi^2(tObj-S(A))-\chi^2(tObj-S(B)).$$

As indicated above, a test object employed as a training class sample comprises a situation deserving special mention, e.g.

if $tObj=S(A),\Delta\chi^2[(S(A)|S(A)-S(B)]=-\chi^2(S(A)-S(B))<0 \Rightarrow S(A):cA$.

Likewise, if $tObj=S(B),\Delta\chi^2[(S(B)|S(A)-S(B)]=\chi^2(S(A)-S(B))>0 \Rightarrow S(B):cB$.

Thus, a training class sample object appropriately may result in a categorization associating the sample object with the class of a training class pair of which it is known to be a member. A test object may, as suggested, be categorized with one class of a training class pair by a relative proximity measure. A test object class and category results in a Boolean signal value, e.g., a true/false signal, such as shown by 1406 in FIG. 14. For example, a test object class substantially in accordance with a test object category may result in a 'true' signal value (e.g., '1' signal value); otherwise a result may provide a 'false' signal value (e.g., a '0' signal value). For example, if a test object "tO" and training class sample "S(A)" are sampled from a test population associated with class "A", and test object "tO" is in closer relative proximity to training class sample S(A) than another training class S(B) not associated with class "A" test population, for an embodiment, test object "tO" may be categorized as category ":cA." Likewise, as category "cA" is logically equivalent to training class "A", a result noted as ":cA=A", may be evaluated as a 'true' signal value (e.g., '1' signal value). Otherwise, if test object "tO" is in closer relative proximity to training class sample "S(B)" sampled from test population "B", and, thus, categorized as category "cB", a logical equivalence category ":cB" associated with training class "A", noted as":cB=A", may therefore in an embodiment be evaluated as a 'false' signal value (e.g., '0' signal value). In other words, in this latter case, test object "tO" though sampled from a test population associated with class "A", might be categorized according to training class "B", which is sampled from another test population "B" not associated with test population class "A". In which case, test object "tO" and training class "B", are not substantially equivalent, e.g., are indicated to be not sampled from the same test population. Another similar statement is: if a class A test object tO is in closer proximity to training sample A than B, its category assignment to category:cA is evaluated as signal value 'true' or signal value '1', e.g., "tO:cA" is signal value 'true', if tO∈A; else "tO:cA" is signal value 'false', if tO∈B.

In an embodiment, accuracy may be determined by a ratio of signal values for objects appropriately categorized to a total test population, shown for example by 1407 in FIG. 14. Likewise, in an embodiment, accuracy may be measured and possibly improved, such as by using learning feedback, as illustrated via an embodiment shown in FIG. 14. A desired accuracy level may, for example, be selected and compared with a measured accuracy to determine if further accuracy improvement attempts may be appropriate, as shown by 1408, for example. If accuracy is acceptable (e.g., complies with a desired accuracy level), a corresponding binary decision ensemble, in an embodiment, such as shown by 1403, may be stored in memory, such as shown by 1409, in order to, for example, categorize (and, thus, facilitate ML classification of) random objects, such as shown by 205 of the embodiment shown by FIG. 2.

If accuracy is not acceptable (e.g., does not comply with a desired accuracy level), whether or not additionally available training class sample pair combinations have been utilized in a sieve type process may be evaluated, as shown by 1410. If not, another unsieved pair may be selected, as shown by 1402. If so, a binary decision ensemble providing an attainable accuracy, but unable to be improved via sieve-type processing of additional pairs for a corresponding test population, may be stored, such as shown by 1411.

Figure 3:
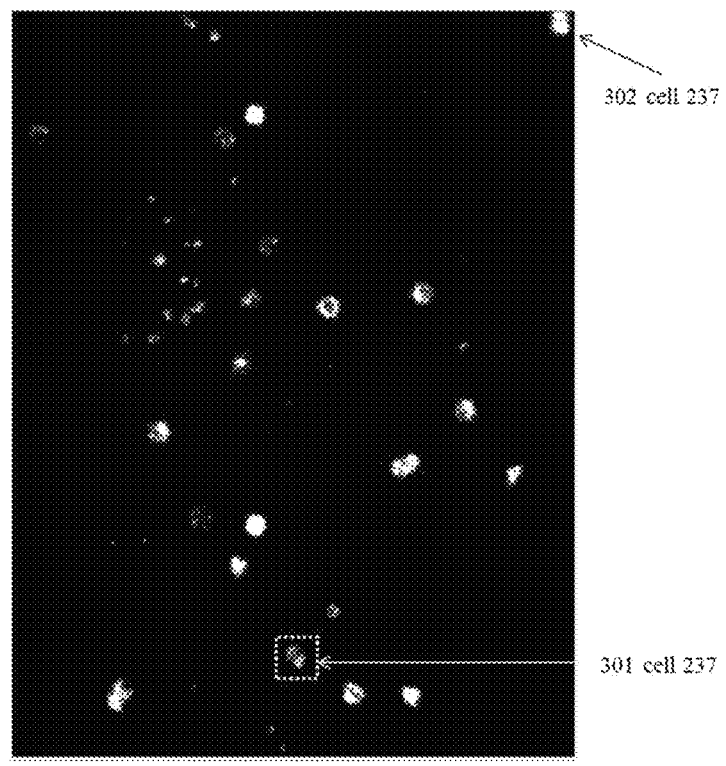
FIG. 3 is a dark field spectral image, at about a wavelength of 440 nm, which includes white blood cells.
Figure 4:
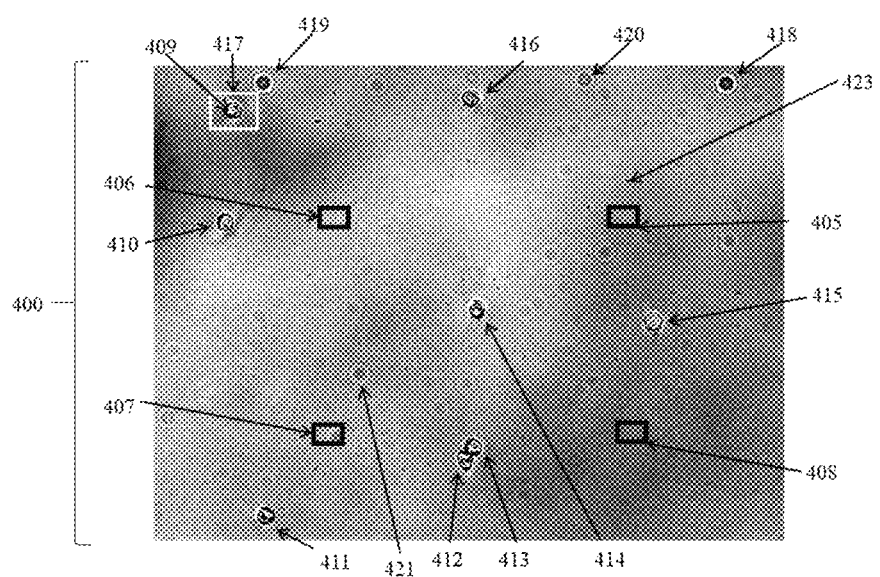
FIG. 4 is a bright field spectral image, at about a wavelength of 440 nm, which includes Jurkat cancer cells.
Figure 5:
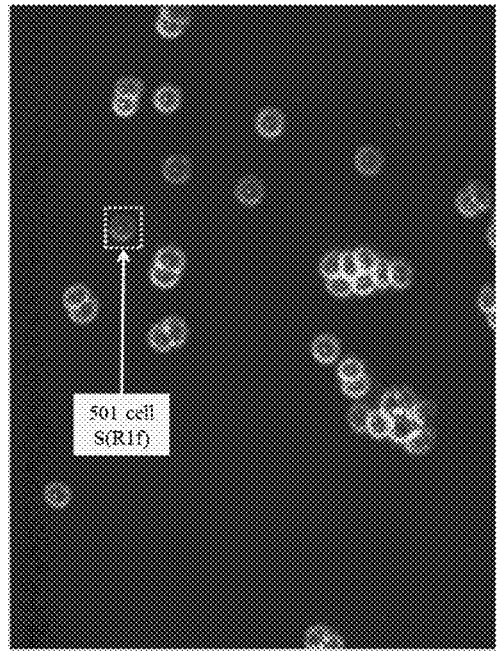
FIG. 5 is a dark field spectral image, at about a wavelength of 440 nm, which includes red blood cells.
Figure 15:
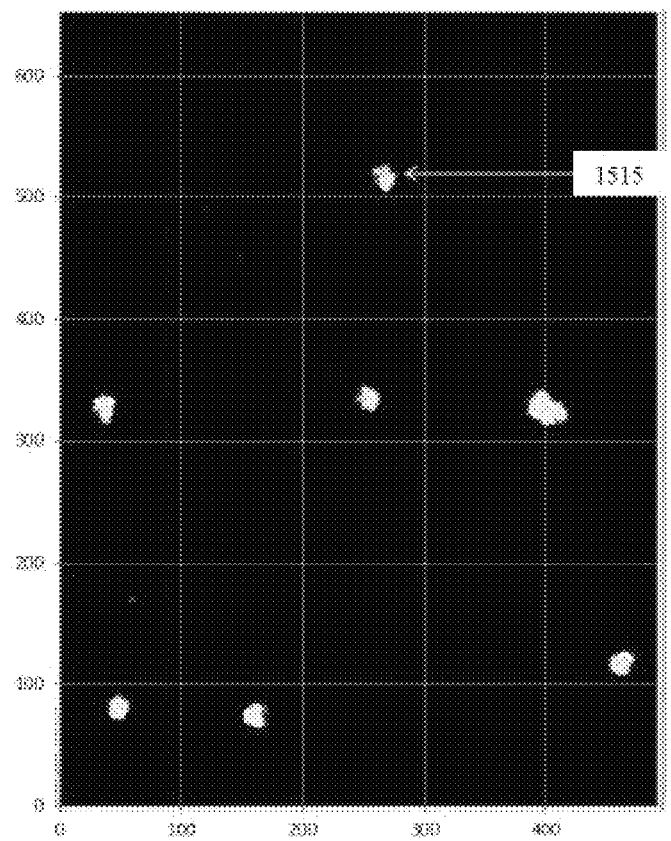
FIG. 15 is a Jurkat dark field image for use to illustrate an embodiment of background discrimination.

Embodiment 1400, shown in FIG. 14, provides an example in which learning feedback may be employed. Known test object populations may be rendered from background discriminated dark field spectral images, such as corresponding to images shown in FIG. 15 (Jur), FIG. 3 (Wbc), and FIG. 5 (Rbc). Test populations contain training class sample cell objects as follows: Jurkat cell S(J1e); cell 5Jur, shown as item 415 in FIG. 4 and as item 1515 in FIG. 15; and Wbc cell S(W1c); cell 237, shown as item 301 in FIG. 3. In FIG. 4, eight Jurkat cells are visible with associated spectral object numerals: 409 (object 1), 410 (object 3), 411 (object 7), 412-413 (object 6—a two-cell cluster), 414 (object 4), 415 (object 5), 416 (object 2). Jurkat cell object 6 (6Jur) appears to comprise a two-cell cluster. Partitioning of Jurkat and Wbc training class sample objects, with appropriate size computations, is provided in Table III, above. A binary decision ensemble is employed for partitioning with results as described below.

Figure 16:
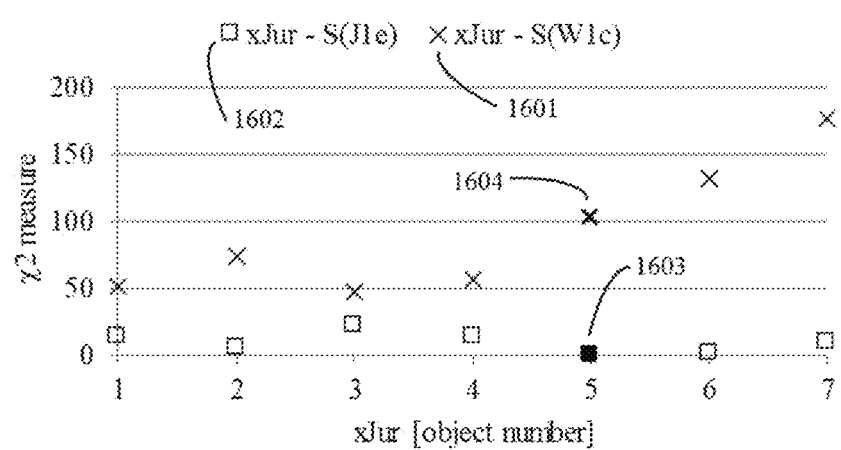
FIG. 16 is a plot illustrating relative proximity for Jurkat test cells with respect to training class samples.

Relative proximity between Jurkat test cells and training class sample pair S(J1e) and S(W1c) are plotted in FIG. 16. Relative proximity of a Jurkat test cell (xJur) to a training class sample may be expressed as $$\Delta\chi^2(xJur|S(W1c)-S(J1e)) = \chi^2(xJur-S(W1c)) - \chi^2(xJur-S(J1e)).$$

Crosses 1601 mark relative proximity of a Jurkat test cell (xJur) to Wbc cell training class S(W1c): $\chi^2$ (xJur–S(W1c)) and boxes 1602 mark relative proximity of Jurkat test cell (xJur) to Jurkat cell training class S(J1e): $\chi^2$ (xJur–S(J1e)). Solid box 1603 identifies training class sample object S(J1e, cell5), in zero relative proximity to itself. Likewise, cross item 1604 identifies training class sample object S(J1e, cell5) in a relative proximity, with value 102, to training class sample S(W1c). TABLE IV provides computations corresponding to measured differences, such as $\chi^2$[S(J1e)–S(W1c)]=102. Thus, a Jurkat test cell population is appropriately categorized as Jurkat test cells from a computation showing test cells closer to Jurkat training class sample signal S(J1e) than to Wbc training class sample signal S(W1c), e.g., a result summarized as $\Delta\chi^2 > 0$.

Figure 17:
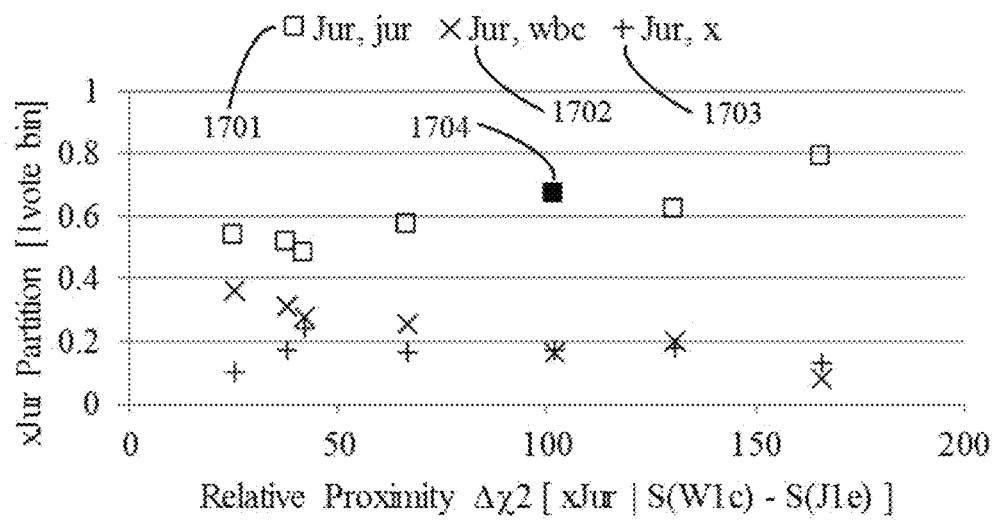
FIG. 17 is a plot illustrating a Wbc test population categorized by training class samples S(J1e) and S(W1c).

FIG. 17 illustrates a Jurkat test cell population (xJur) in which relative (e.g., percentage) breakdown by (bins y-axis) is plotted with respect to proximity to training class samples (category x-axis). Jurkat training class sample S(J1e) has a relative difference value of 102 compared to training class sample S(W1c), which may be summarized: $\Delta\chi^2$[S(J1e)|S(J1e)–S(W1c)]=102, and whose proximity decomposition is shown in TABLE IV. It is noted the term bin refers to a count of items with respect to a particular characteristic and/or quality, which may, as illustrative examples, comprise binary decision sequence, class type, population type, a particular range of values, etc. Thus, in FIG. 17, a relative size decomposition is shown by number of member measurement vectors corresponding to jurkat bin (item 1701 squares) and wbc bin (item 1702 x-cross), respectively, for unanimous binary decisions or mixed binary decisions (items 1703). Relative Jurkat-bin size for Jurkat training class sample S(J1e) is shown as a solid square 1704.

Learning feedback operations may potentially be employed in an embodiment to beneficially address possible categorization errors. For example, in connection with FIG. 2, a Wbc test cell population with test objects (xWbc) are shown in FIG. 3 to be appropriately categorized using an embodiment employing a sieve type process, as previously described, except for item 302 (Wbc cell 468) located on the boundary, whose relative proximity value $\Delta\chi^2$(468Wbc|S(W1c)–S(J1e)]=67, as shown on the FIG. 18 x-axis abscissa and relative partition size (item 1804), as shown on the y-axis ordinate. An appropriate categorization condition may be:

$$\Delta\chi^2[xWbc|S(W1c)-S(J1e)] = \chi^2(xWbc-S(W1c)) - \chi^2(xWbc-S(J1e)) < 0,$$

for example. Thus, as with FIG. 2, in this example, a percentage breakdown of member measurement vectors is shown along the FIG. 18 y-axis ordinate for the following, respectively: jurkat-bin 1801, wbc-bin 1802, and "mixed binary decision" x-bin 1803.

Figure 18:
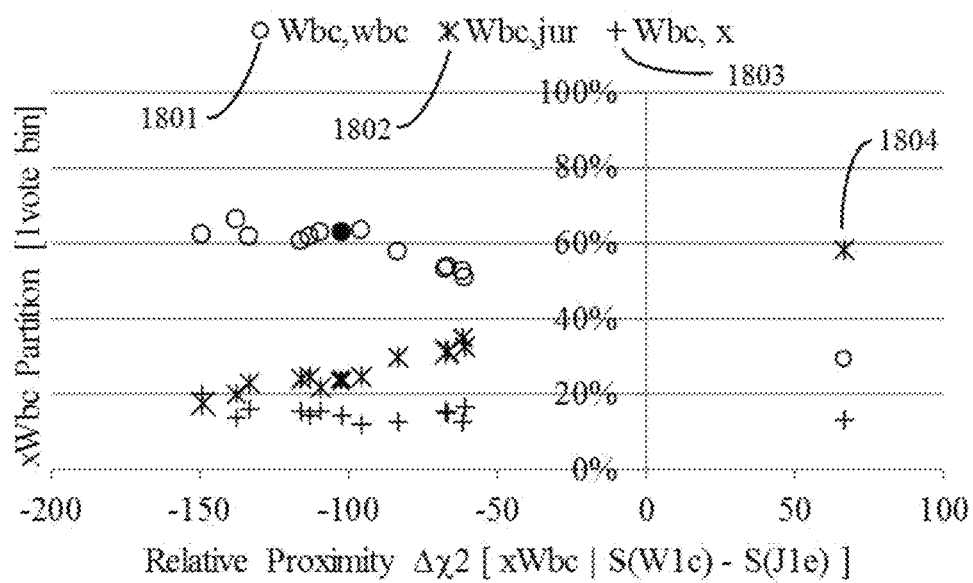
FIG. 18 is a plot illustrating Jurkat test cells categorized by training class samples S(J1e) and S(W1c).

As shown in FIG. 18 (item 1804), boundary cell (item 302, Wbc cell 468) is closer to Jurkat signal S(J1e) than to Wbc signal S(W1c) and, thus, is ML classified (e.g., categorized), but not appropriately, as a Jurkat test cell. Boundary objects may be excluded in accordance with typical approaches to signal processing, e.g. boundary occlusion of measurement vectors may be excluded for an embodiment; however, alternatively, accurate supervised machine learning test population categorization is capable of being achieved for embodiments that may employ feedback learning, as shown below. One potential benefit may be improved accuracy for an embodiment of a system to perform ML classification.

In particular, another training sample pair may be selected as part of a learning feedback operation, such as shown by 1410 of FIG. 14. Likewise, a variety of approaches to doing so are possible. For example, one may select a test object that has not been appropriately classified and it may be used as a training sample. While doing so might work as desired in some cases, some risk also exists that it may lead to a non-terminating process from use of a boundary object that may comprise a fragment, which might be undesirable if ill-behaved. Likewise, however, if there are (N) A-class test objects and (M) B-class test objects, another approach may be to evaluate other signal pairs from a set of (N)*(M) signal pairs. For example, it is possible that one or more (other) training class sample pairs may result in appropriately categorized test populations, e.g., another sample pair may correspond to a sufficient separation between two test populations so as to result in acceptably accurate discrimination. For an embodiment, therefore, a training class sample pair may potentially be found to address potential errors but without necessarily employing exhaustive searching in order to locate training class samples.

For example, in an embodiment, a training class object may be resampled. Likewise, a training class sample to be selected may comprise a sample having been categorized appropriately with a previously utilized training class sample, while also being in closer proximity to the alternate category than the initial or previous training class sample. Here, for example, 3Jur test sample cell (located on the FIG. 17 abscissa at $\Delta\chi^2[3Jur|S(W1c)-S(J1e)]=25$) is selected as a training class sample S(J1c), such that pair S(J1c) and S(W1c) generate a binary decision ensemble "S(J1c) ⋀ S(W1c)".

Figure 19:
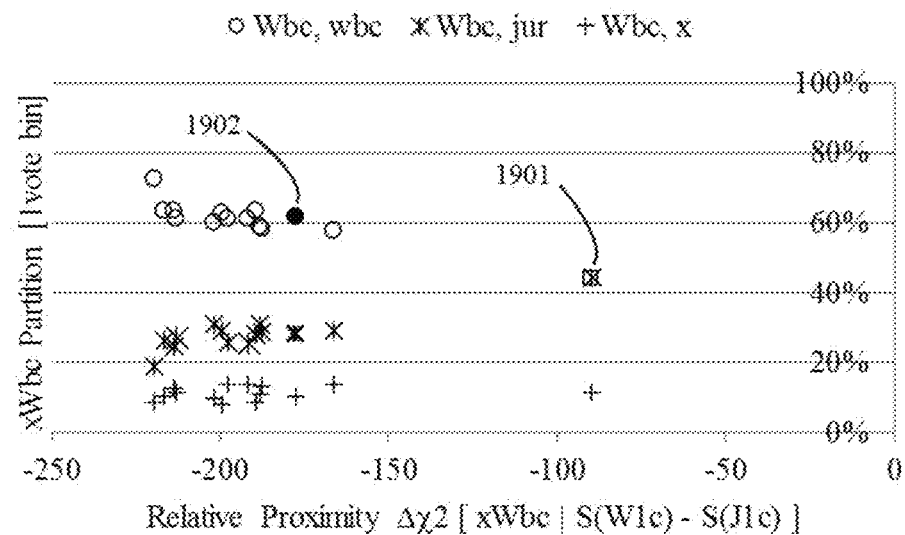
FIG. 19 is a plot illustrating a Wbc test population categorized by training class samples S(J1c) and S(W1c).
Figure 20:
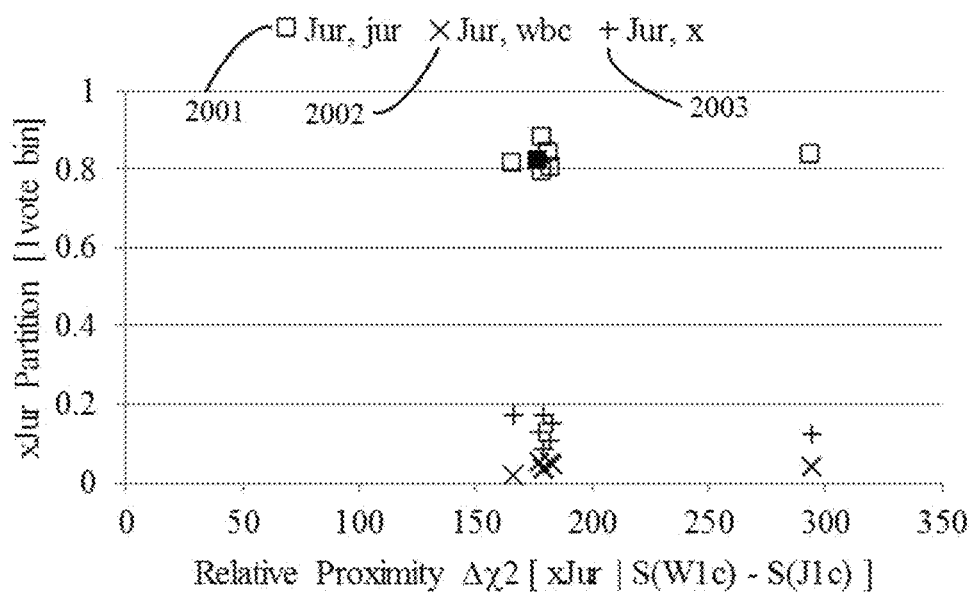
FIG. 20 is a plot illustrating a Jurkat test population categorized by training class samples S(J1c) and S(W1c).

Execution of binary decision ensemble "S(J1c)^S(W1c)" with Wbc test object arguments is shown in FIG. 19, where Wbc test cells are shown as now being appropriately categorized. Square 1901 marks wbc-bin for boundary Wbc cell 468 (item 302). Dark circle 1902 corresponds to wbc-bin for training cell S(W1c=cell 237, item 2101) located on the abscissa at $\Delta\chi2[xW1c|S(W1c)-S(J1c)]=-177$. Further, a Jurkat test cell population also remains appropriately categorized, as shown in FIG. 20. Here, a Jurkat test object cell is partitioned into member measurement vectors as, for respective unanimous binary decisions, jurkat-bin 2001 or wbc-bin 2002, or as, for a mixed decision, x-bin 2003.

While an accuracy measure may be used for known test populations and associated training class samples, random spectral objects may be members of an unknown population, e.g., not members of a test population having an associated class. If this is the case, no comparison of class and category could be made. Likewise, an accuracy measure would not be able to be evaluated. While categorization may not be appropriately made to characterize unknown samples, a random object may be partitioned by a binary decision ensemble. Likewise, proximity to corresponding training class samples may be measured. In a class region embodiment, random object ML classification may be determined by including bins corresponding to member measurement vectors associated with unanimous binary decisions for respective test class sample objects, e.g., (xJur, jur) and (xWbc, wbc). A more complex criteria may also be developed, such that measurement vector membership may correspond to two or more tri-block regions, e.g., a Wbc test population {xObj:Wbc} may specify a class (e.g., class type) as a combination of multiple corresponding bins (Wbc, wbc), (Wbc, jur) and (Wbc, x), rather than as single bins.

Thus, an object classification technique may, in an embodiment, be extended as a categorization measure to permit random object classification even with respect to unknown populations, such as by employing test and/or training class samples from known populations, measuring proximity to training class samples and measuring relative sample sizes for associations made as a result of proximity, as shall be made more clear by an example below. A tri-class region applicable to both unknown and known objects may be specified by combining measures for a spectral object relative proximity to a training class sample pair (e.g. categorization) and comparing relative sample sizes for respective proximity associations. As one illustration, a random object may be classified by location with respect to a binary class region, e.g., a random object may be classified relative to regions determined by known test populations or classified as outside those regions, as shown in embodiments below. Further, a tri-classification technique may be generalized to multiple training classes.

To illustrate a random spectral object ML classification that includes classification of unknown objects, tri-classification examples are given. Three independent examples of tri-classification provide results from test populations corresponding to a respective pair of training class samples and unknown random spectral objects located in associated regions or a third region external to the others. Results are combined in an embodiment below as part of training K=3 classes and classifying test and unknown random spectral objects.

In a first example, training class samples comprise S(J1c) (Jurkat object 410. FIG. 4) and S(W1c) (Wbc object 301, FIG. 3), corresponding to Jurkat and Wbc test populations, and a population of Rbc cells comprise unknown random objects, e.g., a set of objects labeled {xRbc} in FIG. 5. A binary decision ensemble "S(J1c)^S(W1c)" is evaluated with example unknown Rbc population {xRbc} and using a test object proximity measure, such as previously described, for Wbc and Jur populations, shown respectively in FIGS. 19 and 20. Partitioning of an unknown population follows operations as shown in FIG. 13 for an embodiment. A random object member measurement vector binary decision sequence generates a cell object partition, e.g., a partitioning into three portions (e.g., three bins) for this example.

Figure 21:
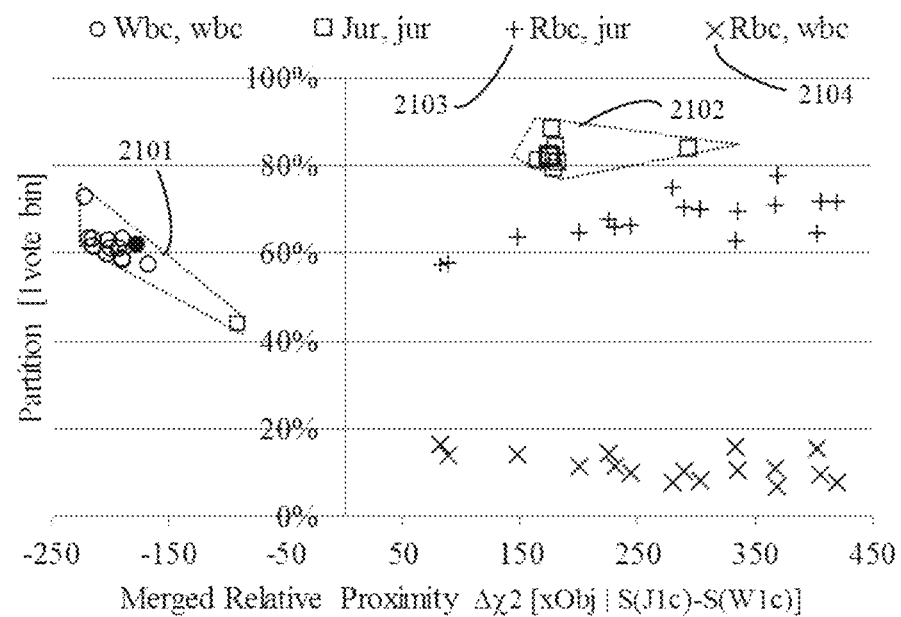
FIG. 21 is a plot illustrating Jurkat and Wbc class regions.

A merged relative proximity view conveniently displays test populations plotted on a corresponding graph, e.g., FIG. 21 combines FIGS. 19 and 20 results. In a merged relative proximity plot, a difference measure is referenced to an abscissa origin. Class regions Wbc, designated as 2101, and Jur, designated as 2102, correspond to respective test sample populations bounded by convex hulls (shown as dashed lines in FIG. 21). In this embodiment, training class inter-sample distance is 177, and training class samples are displayed at x=+177 for S(J1c) and x=−177 for S(W1c). Unknown Rbc objects located in a Jurkat category are distinguished using relative bin size, which provides a random object ML classification example. ML classification of a Rbc population {xObj}Rbc, distinguished by relative bin size (xRbc: jur), designated as 2103, or (xRbc: wbc), designated as 2104, is illustrated as falling outside of FIG. 21 binary classification regions 2101 and 2102. A conclusion, illustrated with this example, is Rbc objects are not of a Wbc class (:Wbc) nor of a Jur class (:Jur) and so are classified, e.g., labeled as "Rbc:X", as another, but unknown, class, such that ":X" corresponds to "Not Wbc" and "Not Jurkat". In this example, class knowledge of an Rbc population is not used. However, it may be concluded a posteriori that a "xRbc" object cell is appropriately classified, at least as a class corresponding to neither one of two known test populations, here Wbc and Jurkat.

Figure 22:
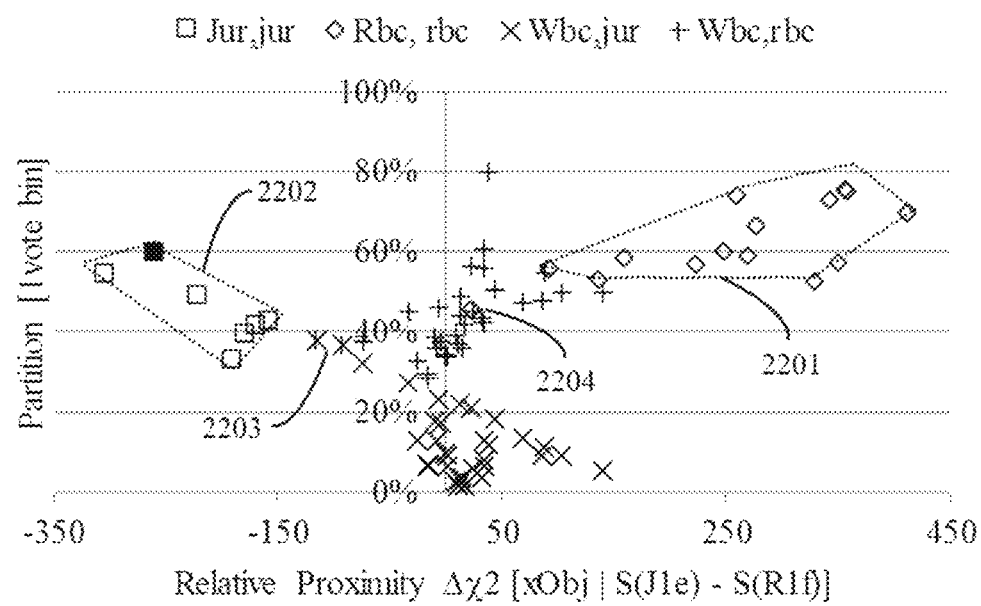
FIG. 22 is a plot illustrating Jur and Rbc class regions.

Two more illustrative examples employing embodiments of random object ML classification are described below. For example, below, a training class example is provided as an illustration using Rbc and Jur training class samples, respectively S(R1f) (item 501, FIG. 5) and S(J1e), and using a Wbc cell population as unknown objects. Thus, in FIG. 22, for example, class regions enclosed by dashed lines are determined to comprise Rbc, designated as 2201, and Jur, designated as 2202, test populations. Jurkat class region 2202 contains a Jurkat test population. Rbc class region 2201 has a convex hull, which excludes Rbc edge cells (two asterisks designated as 2203) and an Rbc cluster, designated as 2204. In this example, an unknown {xWbc} object population is ML classified as not associated with Rbc nor with Jurkat regions, abbreviated as xWbc:X, where X=not:Rbc and not:Jurkat, which is a posteriori deemed an appropriate classification, as previously.

Figure 23:
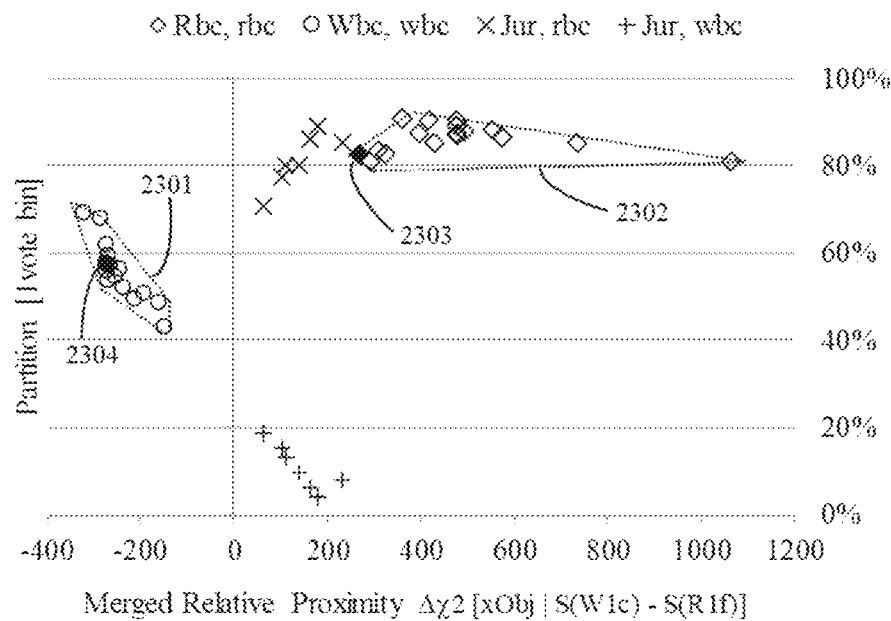
FIG. 23 is a plot illustrating Wbc and Rbc class regions.

Another example uses Jurkat cells as an unknown population "{xJur}", training class samples Rbc and Wbc, and corresponding binary decision ensemble "S(R1f)^S(W1c)". FIG. 23 shows class regions Wbc, designated as 2301, and Rbc, designated as 2302, comprising respective test populations, and training class samples S(R1f) (dark diamond, designated 2303) and S(W1c) (dark circle, designated 2304).

Figure 24:
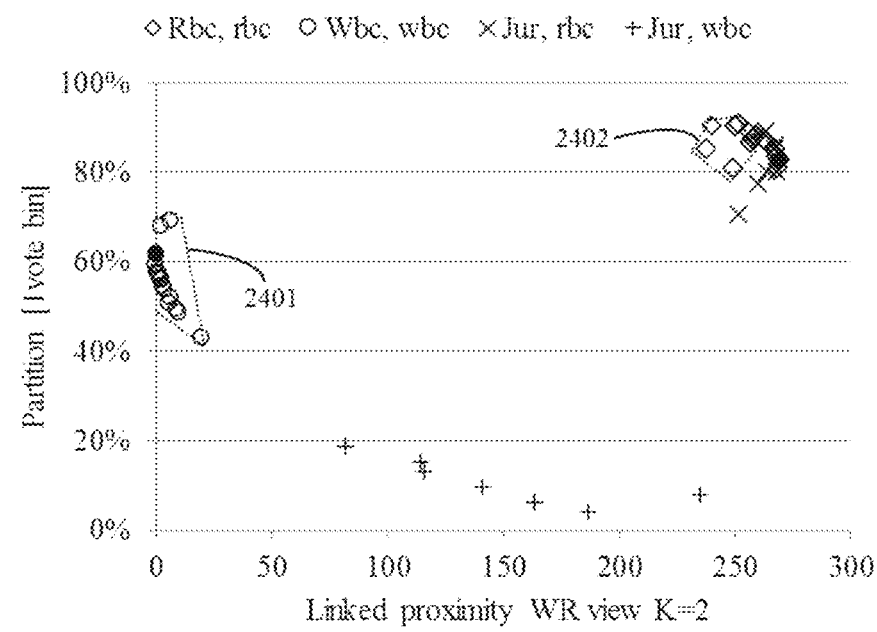
FIG. 24 is a linked view plot illustrating Wbc and Rbc class regions.

It may be desirable to display another view of differences and class regions. A linked proximity view, discussed in more detail below, displays training class samples "S(A)" and "S(B)" and a random object "xObj" with bins "a" and "b" by: χ2[xObj−S(A)] for xObj, bin=a; and χ2[S(A)−S(B)]−χ2[xObj−S(B)] for xObj, bin=b. A linked proximity WR-view is plotted in FIG. 24 for training class samples S(W1c) and S(R1f), previously discussed above. Wbc and Rbc test populations are designated respectively as items 2401 and 2402. Jurkat random objects, in this example, here, serve as an unknown population. A linked "AB-view" display approach in this example shows training class sample "A" as located at the x-axis (abscissa) origin and training class sample "B" as plotted in a manner showing relative proximity to "A". Choice of training class sample order may potentially affect a linked view orientation approach, such as by producing a positive or a negative value for relative proximity, as least in part as a result of selected order. An ordered linked proximity view provides an alternative manner in which to arrange multiple binary test classification region views, e.g., as shown in a multi-classification embodiment below.

Figure 25:
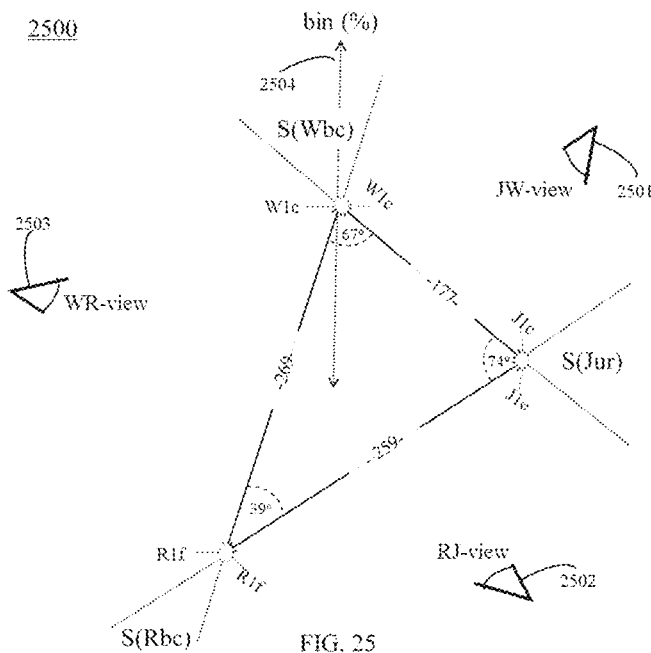
FIG. 25 is a schematic diagram illustrating a view for an example showing a metric or semi-metric space involving training object classes.

K training classes may be combined pairwise, $$\binom{K}{2} = K(K-1)/2$$

times and produce K(K−1)/2 binary decision ensembles, where $$\binom{K}{2}$$

is the well known result expressed as a binomial coefficient for number of pair combinations taken from K items, e.g. K training classes. Thus, for examples provided by FIGS. 21-23, example unknown random object populations ":X" are located exterior to class regions generated independently, or otherwise separately, e.g. as a sequence of binary decision ensembles generated by three training class sample pairs and corresponding test populations. TABLE V shows training class K=3 examples with three corresponding binary decision ensembles and FIG. 25 plots three respective training class pair partition separations. As shown in TABLE V, columns are organized by binary decision ensemble and rows by training class sample, and if evaluated as unknown is denoted by a suffix ":X". The example employs a Jurkat composite training sample tJur=(J1e+J1c) as both Jurkat cells are used in binary ML classification, described previously.

TABLE V

|  |  | S(J1c) ⌒ S(W1c) (xRbc:X) |  |  | S(R1f) ⌒ S(W1c) (xRbc:Rbc) |  |  | S(R1f) ⌒ S(J1e) (xRbc:Rbc) |  |  |
|---|---|---|---|---|---|---|---|---|---|---|
| tRbc = R1f | tRbc, jur | | 340 | 58% | tRbc, x2 | 52 | 9% | tRbc, jur | 45 | 8% |
| | tRbc, wbc | | 84 | 14% | tRbc, wbc | 49 | 8% | tRbc, rbc | 435 | 74% |
| | tRbc, x1 | | 165 | 28% | tRbc, rbc | 488 | 83% | tRbc, x3 | 109 | 19% |
| | | R1f | 589 | 100% | R1f | 589 | 100% | R1f | 589 | 100% |
| | | (xJur:Jur) | | | (xJur:X) | | | (xJur:Jur) | | |
| tJur = J1c + J1e | tJur, jur | | 351 | 81% | tJur, x2 | 45 | 10% | tJur, jur | 208 | 48% |
| | tJur, wbc | | 16 | 4% | tJur, wbc | 59 | 14% | tJur, rbc | 96 | 22% |
| | tJur, x1 | | 64 | 15% | tJur, rbc | 327 | 76% | tJur, x3 | 127 | 29% |
| | | J1c + J1e | 431 | 100% | J1c + J1e | 431 | 100% | J1c + J1e | 431 | 100% |
| | | (xWbc:Wbc) | | | (xWbc:Wbc) | | | (wWbc:X) | | |
| tWbc = W1c | W1c, jur | | 67 | 28% | W1c, x2 | 14 | 6% | xW1c, jur | 42 | 18% |
| | W1c, wbc | | 147 | 62% | W1c, wbc | 147 | 62% | xW1c, rbc | 92 | 39% |
| | W1c, x1 | | 24 | 10% | W1c, rbc | 77 | 32% | xW1c, x3 | 104 | 44% |
| | | W1c | 238 | 100% | W1c | 238 | 100% | W1c | 238 | 100% |

A semi-metric structure of training class inter-sample distances is shown as a triangular arrangement in FIG. 25. The out of plane axis, designated as 2504, corresponds to relative bin size and the in-plane measures shown correspond to intra-pair training class sample proximity. Mutual independence of three training class sample pairs is represented by open circle vertices. Linked views shown external to the illustrated triangular geometry (JW-view, designated as 2501, RJ-view, designated as 2502, and WR-view, designated as 2503) are consistent with previous approaches to proximity sign, e.g., WR-view 2503 is associated with a corresponding classification region plot shown in FIG. 24.

In some cases, it may be useful to have many training class samples. For example, hundreds of clusters of differentiation exist for leukocytes (e.g., Wbc cells) which may be employed for improved differentiation, see "The human leucocyte differentiation antigens (HLDA) workshops: the evolving role of antibodies in research, diagnosis and therapy." Zola H. and Swart B. *Cell Research* 15, 691-694 (2005). There are also a growing number of medical imaging applications, see, e.g., "Medical hyperspectral imaging: a review." Lu G. and Fei B. Journal of Biomedical Optics 19(1) 010901 pp 1-23. January 2014. Multiple object classes may provide greater accuracy and/or uncover other relationships that may be beneficial to facilitate ML classification comprehension, as shown in examples below.

Figure 26:
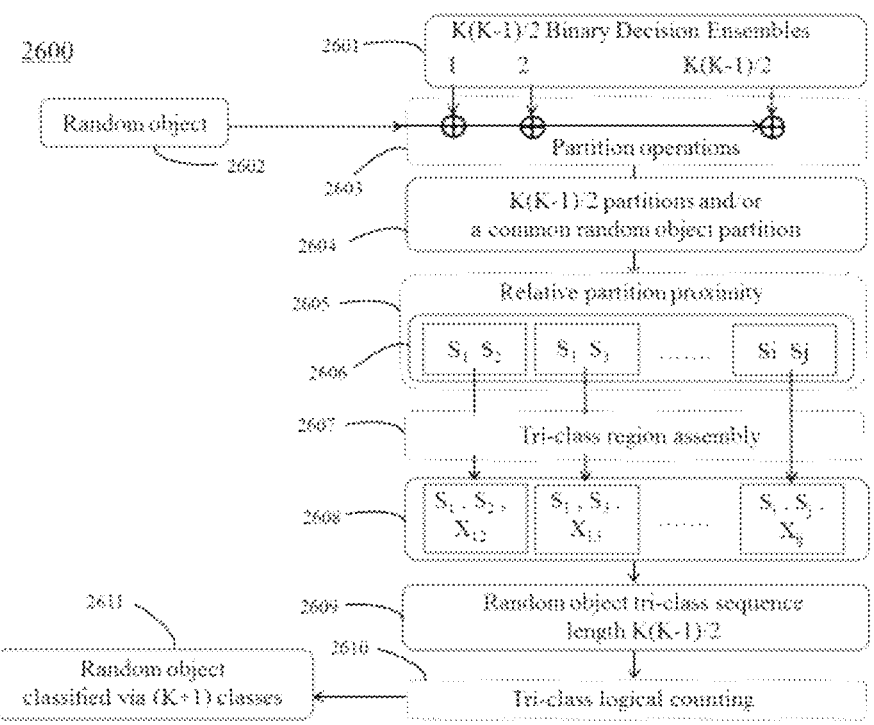
FIG. 26 is a schematic diagram illustrating an embodiment of spectral object multi-ML classification.

A signal processor spectral object classification system, as one illustration, may employ more than two training classes for spectral object multi-ML classification. FIG. 26 shows a schematic diagram of an embodiment 2600. A spectral object multi-ML classification system may employ a number K of training classes in a pairwise fashion, such that corresponding K(K−1)/2 binary decision ensembles result, as shown by 2601 in FIG. 26. In other words, to be more specific, as an illustration, for K respective test populations, the populations may be combined in K(K−1)/2 or fewer different combinations. Likewise, a transform operation may be generated to result in a binary decision ensemble for the different combinations, thus, in this example, producing K(K−1)/2 or fewer binary decision ensembles. Here, for convenience, we assume K(K−1)/2 binary decision ensembles are generated. As previously described, in one embodiment, a binary decision ensemble may produce a partition, such as in accordance with an illustration of an embodiment, as shown by a schematic flow diagram in FIG. 13, for example. Thus, computer instructions may be executed, such as by a signal processor, for example, with respect to a random object fetched from memory, as shown by 2602 of FIG. 26. K(K−1)/2 binary decision ensembles, shown by 2601, and as a result, partition operations may generate K(K−1)/2 partitions, as shown by 2604. Thus, for an illustrative embodiment, a random object, such as shown by 2602, corresponds to K(K−1)/2 partitions, as shown by 2604.

Using relative partition proximity, as shown in 2605, for example, for an embodiment, comprises: measuring random object relative size and relative proximity to K(K−1)/2 pairs of training class sample pairs, as shown in 2606. Likewise, measurements may be substantially in accordance with relation (4), in an embodiment. As a result, three class regions (tri-class regions) may be generated for a particular binary decision ensemble, such that a tri-class region may be determined as one of three regions, two of which result from a measure of relative proximity and relative size to a training class sample pair and a third as a result of regions excluded by the first two, for example. In this context, the term tri-class, therefore refers to having two known classes (e.g., classifications) and a third classification known to be other than the two known classifications.

In an embodiment, therefore, three ML classification regions may be assembled per binary decision ensemble, as shown by 2607. A random object may be located in one of three regions, by a measure of relative size and relative proximity to a corresponding training class sample pair. Two ML classification regions may be populated with respective test samples and a third region may be external to the two test population tri-class regions. Likewise, a tri-class region approach, shown as 2607, may assign a tri-class region to a random object, such that a random object may be tri-classified K(K−1)/2 times with a random object tri-class sequence length K(K−1)/2.

Thus, in an embodiment, a random object may be ML classified substantially according to one or more of (K+1) object-classes. For ML classification, a random object tri-class may be substantially in accordance with one of three tri-class regions for a sequence (e.g., multiple binary signals) of K(K−1)/2 training class sample pairs. As shown by 2609, a random object tri-class sequence (e.g., multiple random object tri-classes) may be generated. For example, a random object tri-class sequence of length K(K−1)/2 may be generated from K(K−1)/2 training class sample pairs for a random object classified into tri-class regions, such as shown in 2608.

A rule or other evaluation method, e.g., a tri-class logical count approach, may evaluate a random object tri-class sequence, such as a sequence intended to represent a binary decision ensemble, at least for an embodiment. For example, in an embodiment, a rule, such as shown in 2610, may parse a character string (e.g., binary decision ensemble), such that a constituent string structure, e.g., a string sequence, may be evaluated. For example, a uniform composition tri-class string may be related to a class (e.g., class type) associated with unanimous results, and/or a mixed character string composition may be associated with a mixed class. As a result, an object tri-class sequence may be referenced to at least one of (K+1) object-classes, which may result in ML classification. For example, a random object may be assigned a class determined by a logical count of tri-class occurrences in a sequence substantially in accordance with a rule, such as shown by 2610. In an embodiment, for example, a random object may be assigned an object class corresponding to a tri-class with numerous sequence occurrences. If more than one frequent tri-class is a result, more than one class may be assigned to a random object; or if a single class is desired, a tie-breaking rule may be invoked, for example, in an embodiment. A $(K+1)^{st}$ class may also be a result, such as, for an embodiment, if an object is located exterior to K(K−1)/2 tri-class regions associated with corresponding training class sample pairs.

As described above, a random object may be assigned at least one of (K+1) object-classes by a tri-class logical count, as shown by 2610. Thus, in an embodiment, a random object multi-ML classification process may classify a random object by at least one of (K+1) object-classes, as shown by 2611, which, for example, may correspond to K training classes and a class external to training class regions, e.g., designated as "X" or "unknown". This is similar to a previously described example. By counting the number of tri-class occurrences in a sequence, a random object may be located in K(K−1)/2 tri-class regions as a result, as shown in 2611, to facilitate ML classification, e.g. as a result of number of occurrences.

K samples of K test populations may correspond to K training classes where K comprises a positive integer. K classes may be associated with K test samples, and a $(K+1)^{st}$ class, such as associated with none of the training class samples, may be labeled as another, untrained, or unknown class. Binary (K=2) ML classification may comprise a special case, in an embodiment. For example, if binary ML classification involves two training classes "A" and "B", a third unknown class may be evaluated as a "not A and not B" class, such that a tri-class object-ML classification results. An ML classification employing (K+1) object-classes may be employed by counting a frequency of a particular tri-class occurrence, as shown by 205c. Thus, one or more of (K+1) object-classes may be assigned to a random object.

A K class training embodiment may generate (K+1) object-classes (e.g., object-type classes). In an alternative embodiment, however, which may include a common random object partition, as described in more detail below, (K+2) object-type classes may be generated from a random object assigned to a $(K+1)^{st}$ object-class (e.g., object-type class), which may comprise an object-class (e.g., object-type class) not associated with K known training classes. In an alternative embodiment, thus, a random object classified with a $(K+1)^{st}$ object-class may be employed as a training class sample, such that K binary decision ensembles may be generated via a combination with K known K training class samples. As a result, random (e.g., spectral) object partitions may be produced and assigned one or more of (K+2) object-type classes. Thus, an alternative embodiment, while similar to previously described approaches, may include an addition of a $(K+1)^{st}$ training class sample corresponding to a random object classified with a $(K+1)^{st}$ object-class.

Thus, a (e.g., spectral) object multi-ML classification embodiment 2600 may be improved by employing a random object common partition, rather than via K(K−1)/2 random object partitions, as was illustrated and described above. A K=3 training class common partition example is described and compared with results for a three binary decision ensemble example above, which produces FIG. 25 results to demonstrate how a common partition may result in an improved training class pair partition separation.

TABLE VI

| Random object member | Binary decision ensemble tri-bin partitions | | |
|---|---|---|---|
| measurement vector | S(A)^S(B) | S(B)^S(C) | S(A)^S(C) |
| $\pi_e$ | a | b | a |
| $\pi_f$ | b | c | c |
| $\pi_g$ | x1 | x2 | x3 |

In an embodiment, a random object common partition may be produced with additional partition operations, for example, as shown by the embodiment of FIG. 26 and discussed in more detail using an illustrative example below. Thus, as an example, a tri-class sequence for a random object, such as shown by 2602, which may comprise a random object measurement vector, for example, may be formed from a set of binary decision ensembles associated with the particular random object. Binary decision ensembles are shown by 2601 and partition operations, for example, are shown in 2603.

Thus, in this illustrative example embodiment, for a particular binary decision ensemble, a random object measurement vector may be assigned to a bin, e.g., a tri-bin (also referred to as a tri-class, as previously described). Thus, K(K−1)/2 binary decision ensembles may generate a tri-bin (e.g., tri-class) sequence of length K(K−1)/2, for example.

Furthermore, a parsing operation, for example, may generate a random object partition, in which bin sequence composition for a measurement vector may include different sequences of corresponding binary decision ensembles. As an example, a spectral object multi-classifier system embodiment may use three binary decision ensembles (shown in TABLE V) as part of a K=3 training class embodiment. TABLE VI shows, for three random object member measurement vectors ($\pi_e$, $\pi_f$, and $\pi_g$), example tri-bin sequences produced from three binary decision ensembles. Thus, for an example embodiment in which K=3 training classes, three [K(K−1)/2=3] binary decision ensembles may be generated via a sieve type process, such as illustrative embodiment 600, discussed previously, e.g., a tri-bin label "a" or tri-bin label "b" may be associated with a unanimous set of outcomes for a particular binary decision ensemble, and a label "x1", may correspond to a binary decision ensemble outcome "Not "a" and Not "b"". Thus, in the present illustrative example, K=3 training classes may be employed to generate three [K(K−1)/2=3] binary decision ensembles, to produce a bin sequence of length three [K(K−1)/2=3], e.g., tri-bin sequence.

TABLE VII

| Random object member measurement vector | Three binary decision ensembles tri-bin outcomes | | | Common block count |
|---|---|---|---|---|
| $\pi_j$ | a | x2 | a | 2 votes for block a |
| $\pi_k$ | b | b | c | 2 votes for block b |
| $\pi_n$ | x1 | c | c | 2 votes for block c |
| $\pi_l$ | a | b | x3 | 1 vote for block "mix" |
| $\pi_m$ | x1 | x2 | x3 | 1 vote for block "other" |

If a common random object partition is to be employed, a random object member measurement vector bin sequence may be assigned as described in more detail below. As one possible example, an assignment may be made by number of occurrences with respect to particular bins in a bin sequence. A number of occurrences in this context refers to as a number of votes. Likewise, in an embodiment, a vote may count a number of times a random object member measurement vector is assigned a particular bin substantially in accordance with K(K−1)/2 binary decision ensembles associated with the random object member measurement vector. Likewise, bins may be combined or subdivided for convenience of discussion with respect to a common partition of bins. More than one bin in combination is referred to in this context as a block. In an embodiment, for K training classes, no more than (K−1) occurrences of a particular bin may be associated with one of K classes in a bin sequence generated by K(K−1)/2 binary decision ensembles for a particular random object member measurement vector. Likewise, therefore, in such an embodiment, a common random object partition may also receive no more than (K−1) votes per bin for a random object member measurement vector substantially in accordance with K(K−1)/2 binary decision ensembles associated with the random object member measurement vector.

For example, continuing with this illustration, if training K=3 classes, a random object member measurement vector, e.g. $\pi_i \in xObj$ with $1 \le i \le n(xObj)$ and n(xObj), object set size, provides no more than two votes for a particular block. TABLE VII shows example binary decision ensemble tri-bin sequence block assignments. In a K=3 training class embodiment, a particular unanimous tri-bin partition may occur twice for a particular object member measurement vector, e.g., as shown in TABLE VII for three binary decision ensembles, which generate a measurement vector "$\pi_j$" with two occurrences of tri-bin partition "a" and measurement vector "$\pi_k$" with two occurrences of tri-bin partition "b".

TABLE VIII

| Jurkat member pixel | | Binary decision ensemble outcomes | | | Common |
|---|---|---|---|---|---|
| y | x | S(J1c)^S(W1c) | S(R1f)^S(W1c) | S(R1f)^S(J1e) | block |
| 264 | 509 | Jur; jur | Jur; rbc | Jur; jur | Jur: 2vote.jur |
| 264 | 511 | Jur; jur | Jur; rbc | Jur; rbc | Jur: 2vote.rbc |

TABLE VIII-continued

| Jurkat member pixel | | Binary decision ensemble outcomes | | | Common |
| --- | --- | --- | --- | --- | --- |
| y | x | S(J1c)^S(W1c) | S(R1f)^S(W1c) | S(R1f)^S(J1e) | block |
| 264 | 512 | Jur; jur | Jur; rbc | Jur; x3 | Jur: 1vote.mix |
| 264 | 513 | Jur; jur | Jur; rbc | Jur; x3 | Jur: 1vote.mix |
| 264 | 519 | Jur; wbc | Jur; wbc | Jur; rbc | Jur: 2vote.wbc |

A training K=3 class embodiment that includes a common random object partition with five pixelized Jurkat member measurement vectors, shown by TABLE VIII, for example. Thus, common partition TABLE VII may be further divided or decomposed, e.g., a 5-block common partition may be created, again, shown by TABLE VIII. From TABLE VII, a common partition block, e.g., "x1+x2+x3", may identify a member measurement vector not having any unanimous binary decisions for an ensemble. Likewise, from TABLE VII, a common partition block, e.g., "1vote.mix", may contain other single decision combinations.

TABLE IX

| Training class common partitions | | | | Partition differences $\chi^2$ | | |
| --- | --- | --- | --- | --- | --- | --- |
| | | % | Group | S(Rbc) | S(Jur) | S(Wbc) |
| Rbc, 2vote.jur | 34 | 6% | U(Rbc) | 0 | 175 | 14 |
| Rbc, 2vote.wbc | 31 | 5% | | 0 | 6 | 210 |
| Rbc, 2vote.rbc | 371 | 63% | | 0 | 111 | 92 |
| Rbc, 1vote.mix | 149 | 25% | | 0 | 6 | 3 |
| Rbc x1 + x2 + x3 | 4 | 1% | | 0 | 3 | 0 |
| n(R1f) | 589 | 100% | | 0 | 302 | 318 |
| Jur, 2vote.jur | 197 | 46% | U(Jur) | 175 | 0 | 45 |
| Jur, 2vote.wbc | 9 | 2% | | 6 | 0 | 202 |
| Jur, 2vote.rbc | 80 | 19% | | 111 | 0 | 4 |
| Jur, 1 vote.mix | 145 | 34% | | 6 | 0 | 11 |
| Jur x1 + x2 + x3 | | 0% | | 3 | 0 | 4 |
| n(J1c + J1e) | 431 | 100% | | 302 | 0 | 266 |
| Wbc, 2vote.jur | 33 | 14% | U(Wbc) | 14 | 45 | 0 |
| Wbc, 2vote.wbc | 129 | 54% | | 210 | 202 | 0 |
| Wbc, 2vote.rbc | 28 | 12% | | 92 | 4 | 0 |
| Wbc, 1vote.mix | 46 | 19% | | 3 | 11 | 0 |
| Wbc, x1 + x2 + x3 | 2 | 1% | | 0 | 4 | 0 |
| n(W1c) | 238 | 100% | | 318 | 266 | 0 |

Figure 27:
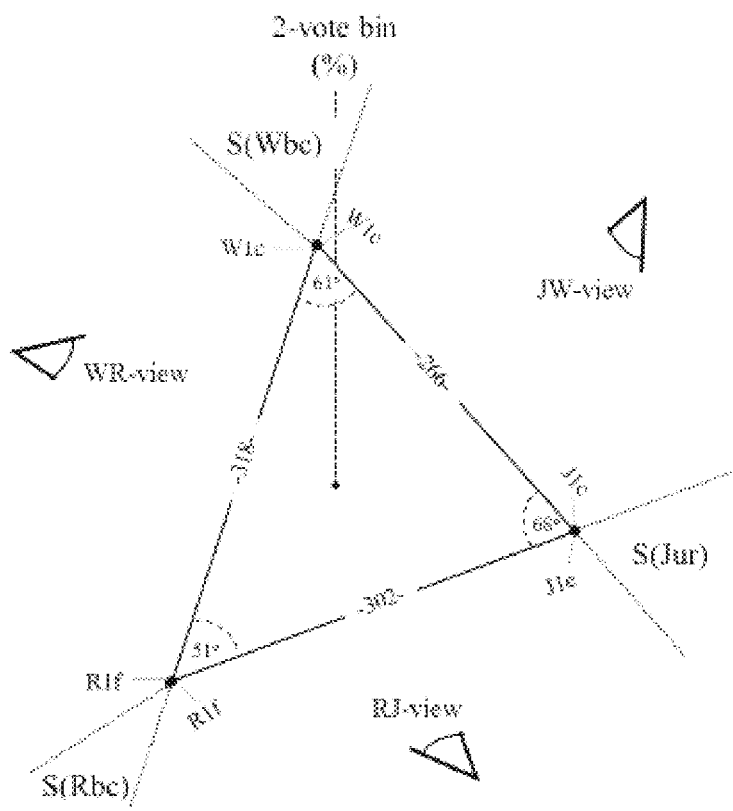
FIG. 27 is a schematic diagram illustrating a view for an example showing a metric or semi-metric space involving training object classes.

A common random object partition embodiment for training K=3 class samples is shown in TABLE IX. The common partition example is assembled with TABLE V binary decision ensembles, which have intra-pair partition proximity differences 177, 269, and 259, respectively, as shown in FIG. 25. These results may be compared, showing an increase of separations to 266, 318, and 302, for the corresponding samples with use of a common partition, as shown in FIG. 27. Thus, as shown, a relatively larger intra-pair training class common partition separation may result compared to a respective partition generated from training K=2 classes As illustrated, use of a common partition to supplement bin sequences associated with binary decision ensembles may increase a relative proximity difference between a particular training class sample pair, improving ML classification performance, ultimately. A comparison of the FIG. 25 and FIG. 27 results shows a benefit of employing a common partition. In particular, an increase in separation of a training class pair results as compared to a partition generated from a particular corresponding binary decision ensemble without use of a common partition. Thus, relative discrimination of a training class pair, such as for ML classification in an embodiment, is greater if a common partition is used, rather than a corresponding partition from a respective binary decision ensemble without use of a common partition, as shown in FIG. 25 and FIG. 27 examples.

A graphical view may present a series of oriented K(K−1)/2 views of binary decision classification regions, e.g., as in the training K=3 class embodiment shown in FIG. 27. In this manner, K-classes may be visualized, such that a graphical view may be displayed as a K-sided polygon with K vertices corresponding to K training class samples. A binary decision ensemble may be associated with one of K(K−1)/2 line segments between vertices. An out of plane axis displays a common partition relative bin size.

Figure 28:
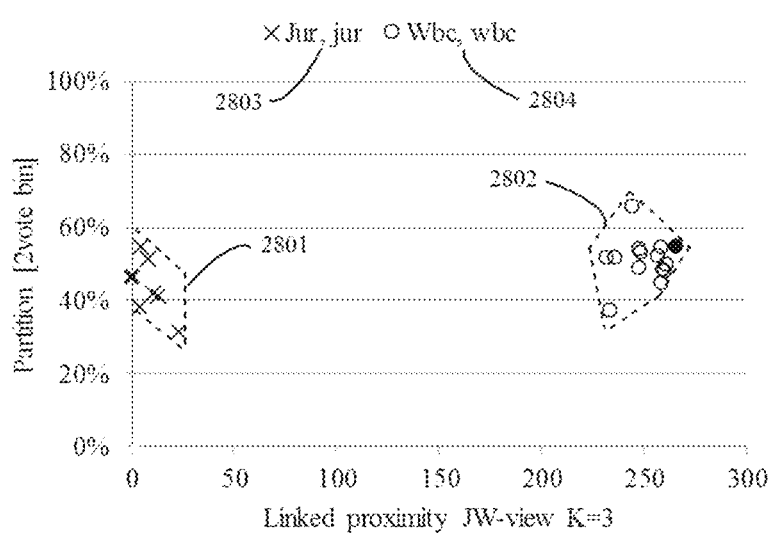
FIG. 28 is a linked view plot illustrating an example of multi-ML classification regions for training object classes.

Using techniques described above, embodiments for Rbc, Jur, and Wbc training (K=3) class sample partitions shown in TABLE IX, classify test populations without error. For example, a linked JW-view in FIG. 28 shows sufficiently distinct class regions: Jur, designated as 2801, and Wbc, designated as 2802, associated with respective member measurement vector unanimous binary decisions for bin-jur, designated as 2803, and bin-wbc, designated as 2804. Jurkat-Wbc inter training class separation shown in FIG. 28 corresponds to FIG. 27 measure of common partition proximity with a value of 266, which is an increase from a value of 177, shown in FIG. 25.

Figure 29:
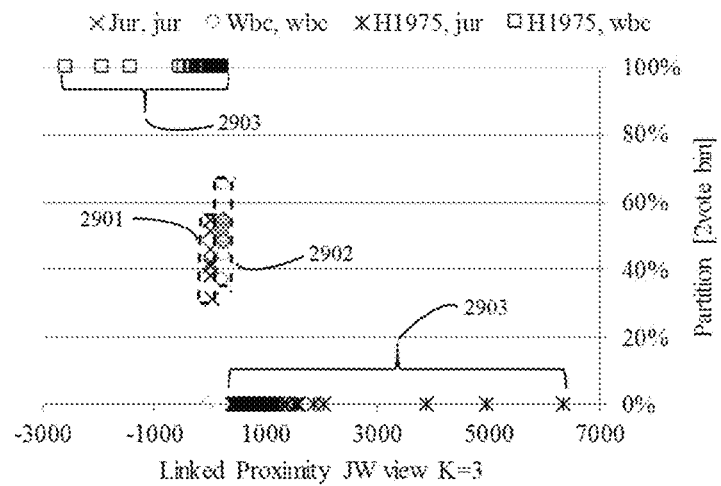
FIG. 29 is a linked view plot illustrating an example of multi-ML classification regions for training object classes that include unknown xH1975 lung cancer cells.

As part of a training K=3 class embodiment, unknown random spectral objects may be classified. An accuracy may be inferred for an embodiment of a multi-ML classification process utilizing a test class as an unknown class, as described above. For example, an embodiment here uses unknown cells from non-small cell lung cancer adenocarcinoma samples labeled H1975, (ATCC® Number: CRL-5908, http://www.atcc.org/). H1975 cells are compared to training K=3 class samples Rbc, Jur, and Wbc partitions shown in TABLE IX. H1975 cells, used as an unknown population, are shown with respect to training K=3 class samples in FIG. 29. Note expanded abscissa scales to include H1975 cells as a result of relatively distant proximity compared to training class sample pairs shown in FIG. 28. In linked proximity views, unknown H1975 lung cancer cells are relatively widely separated from Rbc, Wbc, and Jur test populations. For example, in an example, FIG. 29 plots classification regions for Jur, designated as 2901, and Wbc, designated as 2902, test populations compared to a relatively distant unknown H1975 population, designated as 2903.

Figure 30:
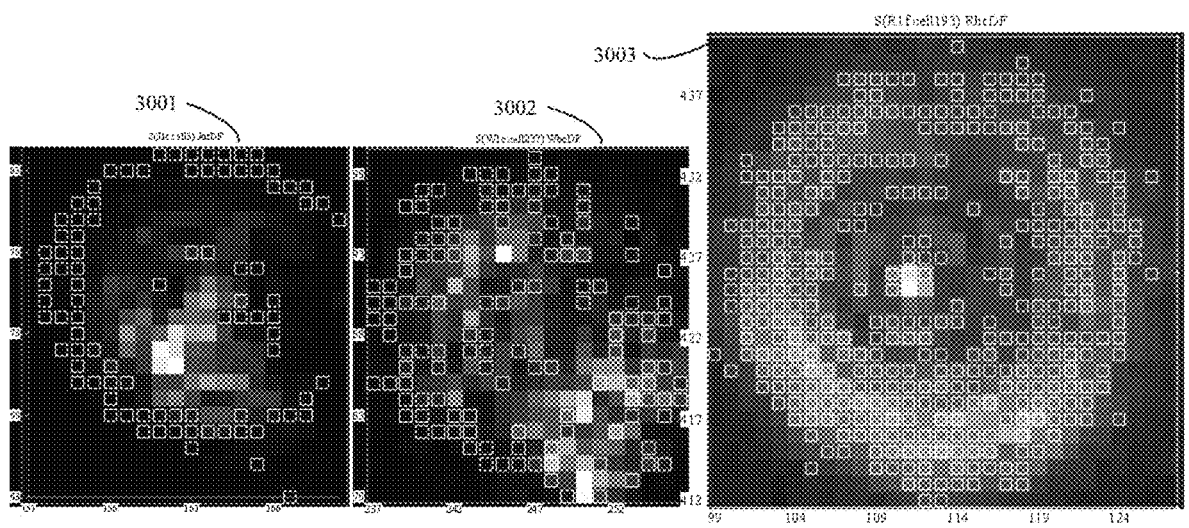
FIG. 30 illustrates dark field optical images with examples of object members for training cells.
Figure 31:
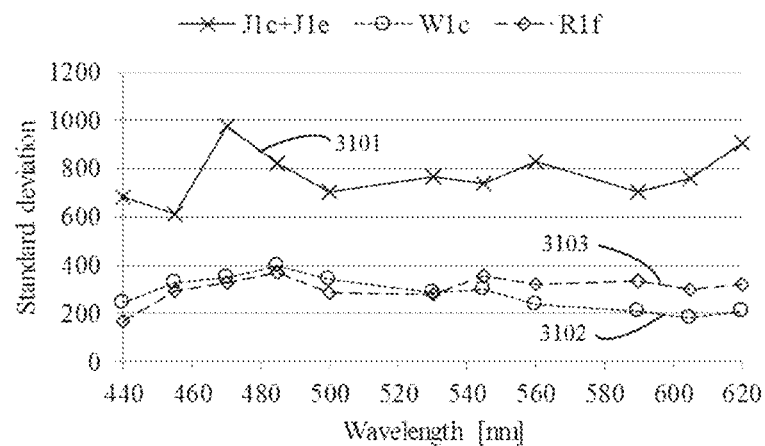
FIG. 31 is a plot showing example pixel spectra associated with training sample cells, in which example sample statistics comprise a standard deviation of spectral intensity.

It may be desirable to identify, recognize, and/or classify random spectral objects, such as by using spectral object member measurement vectors spatial and/or spectral distributions. Underlying heterogeneous physical entity attributes, as previously described, for example, may be associated with signal measurement vectors, e.g., if identifying a training class sample, recognizing a test object from a known population, and/or classifying a random object from an unknown population. Spectral image characteristics may produce useful results, e.g., a cell structure determined, at least in part, by spectral object member vector intensity values measured with a visible light scattering optics. For example, FIG. 30 shows dark field images of three training class sample cells: Jurkat, designated as 3001, Wbc, designated as 3002, and Rbc, designated as 3003, shown at a scale of 1 pixel/0.4 µm with pixel spectra (white boxes) associated with a respective training class partition bin, e.g. two-vote bins: U(Rbc), U(Jur), and U(Wbc) in TABLE IX. FIG. 31 shows an example of pixel spectra associated with training sample cells: Jur, designated as 3101, Wbc, designated as 3102, and Rbc, designated as 3103, where example statistics comprise a standard deviation of spectral intensity, such that a relatively larger Jurkat training class member variance compared to Wbc (W1c) and Rbc (R1f) samples is shown, for example.

Figure 32:
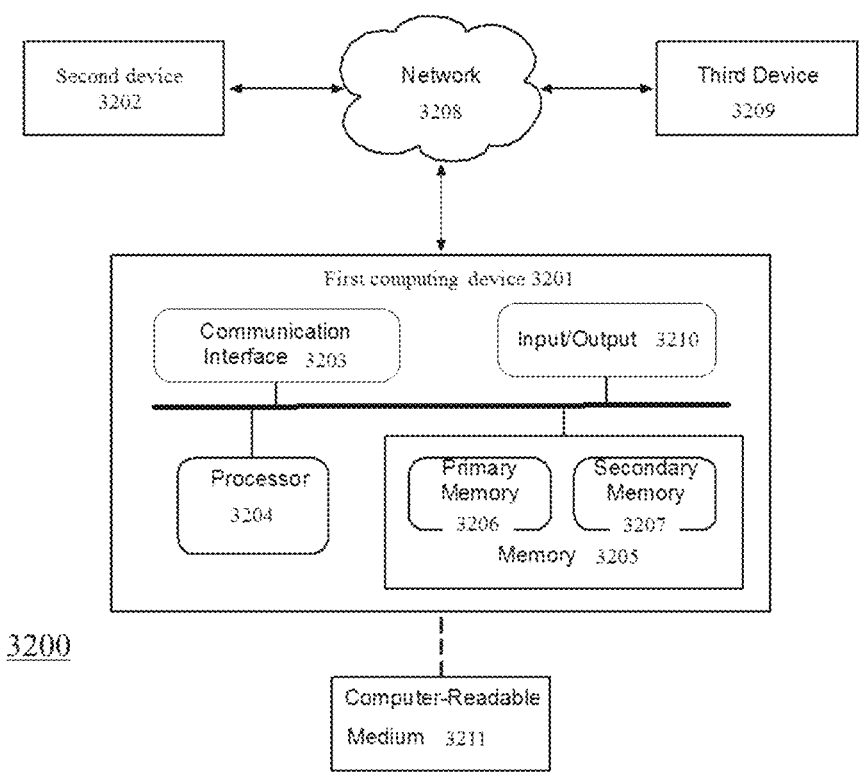
FIG. 32 is a schematic diagram illustrating an embodiment of a computing and/or communicating network environment that may be used to execute ML classification of spectral objects.

Spectral object classification, as specified here in a context of supervised machine learning, may be executed, such as via a signal processor, which may be a component in a special purpose computing device, such as shown in FIG. 32, illustrating an embodiment 3200. Claimed subject matter includes using measurements of physical entities comprising heterogeneous spectral objects for multi-ML classification. Systematic errors may originate from various apparatus and/or affect signal sample measurements. Thus, it may be desirable to adjust signal measurements and thereby at least partially compensate, reduce, or eliminate systematic errors. Various artifacts may likewise exist due at least in part to optics or sample preparation quality, e.g., defects shown in FIG. 4 FOV 400 may include: type I defects 418-419, which may be independent of sample changes, out of focus and/or associated with a detector, lens, illuminator, or sample holder; type II defects 420-421, which may be specific to a given sample and frame set and/or may appear as Airy rings generated by small out of focus objects; and/or type III defect 423, which may include localized in focus objects related to an optical and/or sample defect.

Various known (or to be developed) signal processing techniques may be used to adjust captured measurements, such as for key-value pairs of a map, as previously described, for example. An equipment operating characteristic may be impressed on maps comprising key vectors, e.g., pixelized spectra generated by a spectral image may be distorted by chromatic aberration. Some equipment characteristics may be neglected by maintaining a time invariant optics calibration, e.g., for source luminance, optics illumination, digital sensor detection sensitivity and/or quantum efficiency. However, some equipment errors may be reduced by adjustment of measurement signals so that accuracy (e.g., ML classification accuracy) may be improved.

Figure 33:
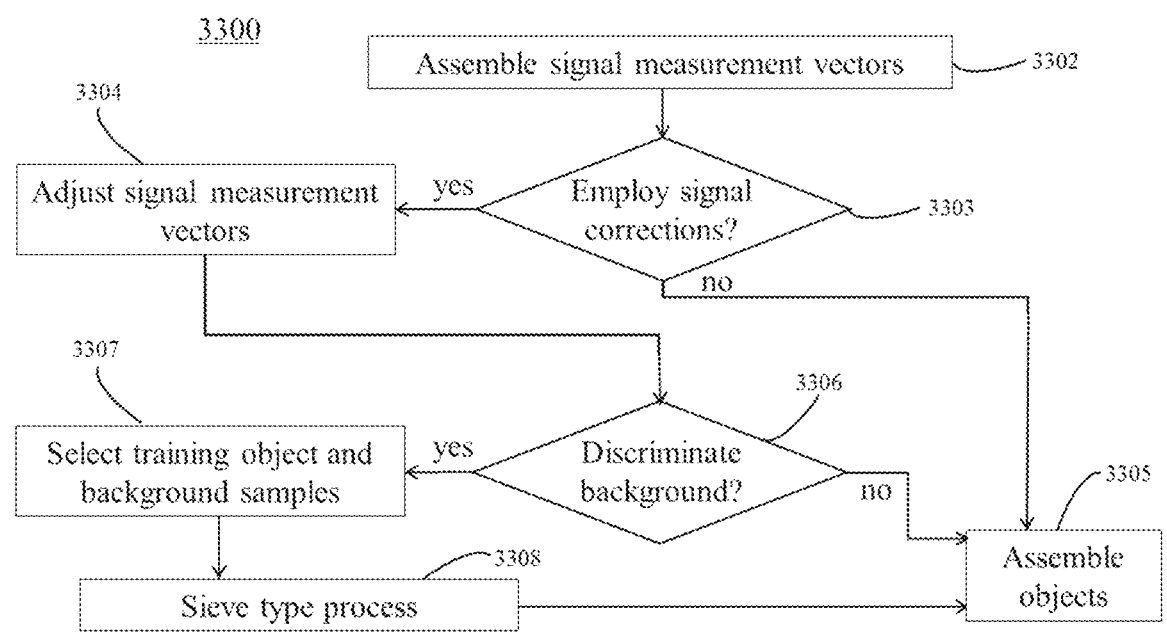
FIG. 33 is a flow diagram showing an embodiment of spectral image processing that may be employed for background discrimination.

FIG. 33 is a flow diagram showing an embodiment 3300 of a signal corrections method. Signal processing may employ various measurement signal corrections to improve ML classification accuracy and/or reduce processing complexity. Accurate score distributions may depend at least partially on signal sample measurement vectors 3302. A decision to employ signal corrections, shown by 3303, may depend at least partially on allowable measurement signal tolerances and/or classification error sensitivity to systematic errors for a particular use and/or embodiment, for example. Adjusting signal measurement vectors, as intended to be illustrated by 3304, e.g., may also comprise: input threshold filtering, brightness variations between fields of view (FOV) and/or chromatic distortion compensation (CDC) across a FOV, as examples. Equipment errors may be compensated by adjusting measurement signals and/or assembled signal measurement vectors, such as may be read from memory, for example.

A special purpose computing device may include executable instructions for spectral image processing corresponding to a flow diagram embodiment 3300, shown in FIG. 33. Likewise, a variety of other techniques, such as known signal processing approaches, as mentioned, may be employed to make appropriate adjustments. Assembling objects, shown by 3305, may, in an embodiment, include dimensional reduction process, for example, as described. Measurement equipment frame generator errors may be compensated prior to assembling spectral objects. As a result, random objects may be rendered from a spectral image with a discriminated background and assembled, such as shown by 3305, for an embodiment. Likewise, assembled objects may, for example, be stored in memory.

Threshold filtering may be used in some cases. Background discrimination may be useful as a signal processing technique to simplify spectral object assembly, and/or improve classification accuracy. A decision to use background discrimination may be made, shown by 3306, for an embodiment. Background discrimination may eliminate, or at least reduce, non-objects involved in classification and thus may improve accuracy. A rendered training class sample object may include some background region for ease of selection without necessarily engaging in precise determination of an object boundary in an embodiment. A binary decision ensemble from a sieve process embodiment, described below, illustrates filtering background discriminated signal measurement vectors.

A binary decision ensemble may be employed for filtering non-object pixel-vectors in a background discrimination embodiment. A type of sieve process (e.g., sieve discrimination) may be employed, shown at 3308, to sample a pair of test populations comprising a spectral object sample and a background non-object region sample comprising a portion of a field of view devoid of objects of interest, shown at 3307. A sieve discrimination process, such as an embodiment shown by 3308, may employ a training sample pair, shown by 3307, comprising a spectral object and a background non-object region to produce a binary decision ensemble, which may be used to discriminate background measurement vectors from objects of interest. In random spectral object ML classification embodiments, such as shown above, training class samples comprise background discriminated human blood cell spectral objects. In an example background discrimination dark field Jurkat (JurDF) embodiment, a result of a sieve type process or scheme for seven Jurkat cells is shown in the FIG. 15 dark field image (rotated counter clockwise with respect to FIG. 4).

In this illustrative example, sieve discrimination comprises a particular type of signal or signal sample input/output (i/o) and a particular use with an approach to make a series of successive binary decisions to result in discrimination of a background devoid of objects of interest in a field of view, for example. Particular input signal samples used for sieve discrimination in this example comprise a training sample relative to a non-object background region sample. A binary decision ensemble generated by an embodiment of a sieve-type discrimination process in this illustrative example may be employed for background discrimination. A field of view (FOV) or spatially partitioned random objects may employ such a binary decision ensemble, wherein corresponding scalar signal values may be employed as threshold filters to measurement vectors.

Claimed subject matter comprises other embodiments of a signal processor for spectral object classification, e.g., if two disparate measurement systems share common keys, such as a shared coordinate system. For an embodiment of supervised machine learning object classification (SMLC), it may, for example, be desirable to employ some combination of resolution, speed, and/or classification accuracy to potentially enhance performance for a combined system. For example, a relatively high-resolution system may be used to identify training class samples, whereas relatively larger ML classification regions may be measured with a relatively higher-speed system in which resolution may be less. A system embodiment that combines relatively high resolution with relatively high processing speed may, for example, include, but are not limited to: energy dispersive scanning electron microscopy for relatively higher resolution with spectral imaging with light for relatively higher speed; Raman spectroscopy for relatively higher resolution with spectral imaging with light for relatively higher speed; spectral imaging in two regions of the electromagnetic spectrum, e.g., infra-red for relatively higher speed and x-ray for relatively higher resolution; and/or spectral imaging by ground based apparatus for relatively higher resolution with satellite apparatus for relatively higher speed.

FIG. 32 shows a diagram illustrating an embodiment 3200 of a computing and/or communication network environment for a spectral object classifier system comprising computing and/or network devices that may be employed, e.g. in a client-server type interaction or an object-oriented program. For example, computing device platform 3201 ('first computing device' in figure) may interface with a computing platform or device 3202 ('second device' in figure), which may comprise features of a client computing device, for example a graphical display. Communications interface 3203, processor (e.g., processing unit) 3204, and memory 3205, which may comprise primary memory 3206 and secondary memory 3207, may communicate by way of a communication bus with input/output 3210, for example. Computing platform 3201 may represent one or more sources of analog, uncompressed digital, lossless compressed digital, and/or lossy compressed digital formats for content of various types, such as video, imaging, text, audio, etc. in the form of physical states and/or signals, for example. Computing device 3202 may communicate with computing platform 3201 by way of a connection, such as an internet connection, such as via network 3208, for example. Serial or ISO/IEC 7498-1 or other similar existing or future ISO/IEC connections may be interposed between devices, as one illustrative and non-limiting example. Although computing platform 3201 of FIG. 32 shows the above-identified components, claimed subject matter is not limited to computing devices having only these components as other implementations may include alternative arrangements that may comprise additional components or fewer components, such as components that operate differently while achieving similar results. Rather, examples are provided merely as illustrations. It is not intended that claimed subject matter be limited in scope to illustrative examples.

The term "computing device" as used herein, refers to a system and/or a device, such as a computing platform apparatus, that includes a capability to process (e.g., perform computations) and/or store content, such as measurements, text, images, video, audio, etc. in the form of signals and/or states, which may, for example, include signal samples. Thus, a computing device, in this context, may comprise hardware, software, firmware, or any combination thereof (other than software per se). Computing device 3201, as depicted in FIG. 32, is merely one example, and, again, claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process and/or method as described herein, with reference to flow diagrams and/or otherwise, may also be executed and/or affected, in whole or in part, by a computing platform, such as via executing instructions, such as computer instructions. A process may likewise comprise a result of executing an application that may further also include a physical process that may occur other than via a computing platform or device and/or in conjunction with executing an application via a computing platform or device, in an embodiment. An application may comprise a program, such as software e.g. a code string comprising source and/or executable code, such as a run time version, wherein startup and/or library codes may be linked, as an example. Flow diagram components are intended to refer to a logical representation of one or more embodiments to describe more complex functionality. However, an implementation may be based at least in part on related operations, performance considerations, communication links, and/or other criteria.

Processor 3204 may be representative of one or more circuits, such as digital circuits, to perform at least a portion of a computing procedure and/or process. By way of example, but not limitation, processor 3204 may comprise one or more processors, such as controllers, microprocessors, microcontrollers, application specific integrated circuits, digital signal processors, programmable logic devices, field programmable gate arrays, multiprocessors and/or graphic processors with application interfaces, the like, or any combination thereof. In implementations, processor 3204 may perform signal processing to manipulate signals and/or states, to construct signals and/or states, and/or to construct spectral images, for example.

Memory 3205 may be representative of any storage mechanism. Memory 3205 may comprise, for example, primary memory 3206 and secondary memory 3207, additional memory circuits, mechanisms, or combinations thereof may be used. Memory 3205 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 3205 may be utilized to store a program. Memory 3205 may also comprise a memory controller for accessing computer readable-medium 3211 that may carry and/or make accessible content, which may include code, and/or instructions, for example, executable by processor 3204 and/or some other unit, such as a controller and/or processor, capable of executing instructions, for example.

Under direction of processor 3204, memory, such as memory cells storing physical states, representing, for example, a program, may be executed by processor 3204 and generated signals may be transmitted via the Internet, for example, in an embodiment. Processor 3204 may also receive digitally-encoded signals from client computing device 3202.

Memory 3205 may store cookies relating to one or more users and may also comprise a computer-readable medium that may carry and/or make accessible content, including code and/or instructions, for example, executable by processor 3204 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Signal packets and/or signal frames, also referred to as signal packet transmissions and/or signal frame transmissions, may be communicated between nodes of a network, such as 3208, where a node may comprise one or more network devices and/or one or more computing devices, for example as shown in FIG. 32, illustrating an embodiment. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path, such as comprising a portion of the Internet and/or the Web, from a site via an access node coupled to the Internet. Likewise, a signal packet and/or frame may be forwarded via network nodes to a target site coupled to a local network, for example. A signal packet and/or frame communicated via the Internet and/or the Web, for example, may be routed via a path comprising one or more gateways, servers, etc. that may, for example, route a signal packet and/or frame substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

Network 3208 may comprise one or more network communication links, processes, services, applications and/or resources to support exchanging communication signals between a client computing device, such as 3202, and computing device 3209 ('third device' in figure), which may, for example, comprise one or more servers (not shown). By way of example, but not limitation, network 3208 may comprise wireless and/or wired communication links, telephone and/or telecommunications systems, Wi-Fi networks, Wi-MAX networks, the Internet, a local area network (LAN), a wide area network (WAN), or any combinations thereof.

As used herein, the terms "entry", "electronic entry", "document", "electronic document", "content", "digital content", "item", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Likewise, in this context, content (e.g., digital content) provided to a user in a form so that the user is able to perceive the underlying content itself (e.g., hear audio or see images, as examples) is referred to, with respect to the user, as 'consuming' content, 'consumption' of content, 'consumable' content and/or similar terms. For one or more embodiments, an electronic document may comprise a Web page coded in a markup language, such as, for example, HTML (hypertext markup language). In another embodiment, an electronic document may comprise a portion or a region of a Web page. However, claimed subject matter is not intended to be limited in these respects. Also, for one or more embodiments, an electronic document and/or electronic entry may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, content may comprise, for example, text, images, audio, video, and/or other types of electronic documents and/or portions thereof, for example.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to content, such as content comprising a technical article, may include one or more authors. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), encoding formats and/or standards used for encoding an electronic document, and so forth.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example. A computing system may include a graphical user interface (GUI) with interactions via a wired and/or wireless connection.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video. The foregoing is provided merely to illustrate that claimed subject matter is intended to include a wide range of possible features and/or capabilities.

A network may also be extended to another device communicating as part of another network, such as via a private network (PN). To support a PN, broadcast domain signal transmissions may be forwarded to the PN device via another network. For example, a software tunnel may be created between a logical broadcast domain, and a PN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be substantially compliant and/or substantially compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

A communication protocol comprises a set of rules that allow two or more entities of a communications system to transmit and/or receive signals and/or signal samples via any kind of variation of a physical quantity. These are the rules and/or specification regarding syntax, semantics, synchronization of communication and/or possible error recovery methods. Protocols may be implemented by hardware, software, firmware or any combination thereof other than software per se. In particular implementations, a network protocol for communicating between devices may be characterized, at least in part, substantially in accordance with a layered description, such as the so-called Open Systems Interconnection (OSI) seven layer approach and/or description. A network protocol here is meant to refer to a set of signaling conventions, such as for computing and/or communications transmissions, for example, as may take place between and/or among devices in a network, typically network devices; for example, devices that substantially comply with the protocol and/or that are substantially compatible with the protocol. In this context, the term "between" and/or similar terms are understood to include "among" if appropriate for the particular usage and vice-versa. Likewise, in this context, the terms "compatible with", "comply with" and/or similar terms are understood to include substantial compliance and/or substantial compatibility.

Typically, a network protocol, e.g. a protocol characterized substantially in accordance with the aforementioned OSI description, has several layers. These layers may be referred to here as a network stack. Various types of transmissions, such as network transmissions, may occur across various layers. A lowest level layer in a network stack, such as the so-called physical layer, may characterize how symbols (e.g., bits and/or bytes) are transmitted as one or more signals (and/or signal samples) over a physical medium (e.g., twisted pair copper wire, coaxial cable, fiber optic cable, wireless air interface, combinations thereof, etc.).

Progressing to higher-level layers in a network protocol stack, additional operations may be available by initiating network transmissions that are substantially compatible and/or substantially compliant with a particular network protocol at these higher-level layers. For example, higher-level layers of a network protocol may, for example, affect device or user permissions.

A private network (PN) may enable a remote device to more securely (e.g., more privately) communicate via a local network. A router may allow network communications in the form of network transmissions (e.g., signal packets and/or frames), for example, to occur from a remote device to a PN server on a local network. A remote device may be authenticated and a PN server, for example, may create a special route between a local network and the remote device through an intervening router. However, a route may be generated and/or also regenerated if the remote device is power cycled, for example. Also, a PN typically affects a single remote device.

With advances in technology, it has become more typical to employ distributed computing approaches in which portions of a problem, such as signal processing of sample measurements, for example, may be allocated among computing devices, including one or more clients and/or one or more servers, via a computing and/or communications network, for example. Allocation may also refer to computer programs executing on a hardware device e.g. a client and a server, such that the server provides resources for the client, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

An example of a distributed computing system comprises the Hadoop distributed computing system, which employs a map-reduce type of architecture. In this context, the terms map-reduce architecture and/or similar terms are intended to refer a distributed computing system implementation for processing and/or for generating large sets of signal samples employing a parallel, distributed process performed over a network of individual computing devices. A map operation and/or similar terms refer to processing of signals to generate one or more key-value pairs and to distribute the one or more pairs to the computing devices of the network. A reduce operation and/or similar terms refer to processing of signals via a summary operation (e.g., such as counting the number of students in a queue, yielding name frequencies). A system may employ such an architecture for processing by marshalling distributed servers, running various tasks in parallel, and managing communications and signal transfers between various parts of the system, in an embodiment. (See, for example Jeffrey Dean et al. "Large Scale Distributed Neural Networks," Advances in Neural Information Processing Systems 25, 2012, pp 1232-1240.) As mentioned, one non-limiting, but well-known example comprises the Hadoop distributed computing system, which comprises an open source implementation of a map-reduce type architecture, but may include other aspects, such as the Hadoop distributed file system (HDFS). In general, therefore, Hadoop and/or similar terms refer to an implementation scheduler for executing large processing jobs using a map-reduce architecture.

Another example of a distributed computing system comprises a distributed computing system, which employs a library database for structured data. One non-limiting, but well-known example comprises open source support technologies. An example of such an open source implementation that uses a structured query language, but may include other aspects, such as found in MySQL, which is an open-source relational database management system. In general, therefore, relational database and/or similar terms refer to an implementation for executing large processing jobs using structured data. More generally a distributed computing system that employs a large library database may support structured, semi-structured and/or unstructured data.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes, such as to be capable to transmit signal packets and/or frames between devices of particular nodes, including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but devices outside the private network may not necessarily be able to direct inbound network communications to devices included in the private network.

The Internet here refers to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although here it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise a service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms refer to any electronic file and/or electronic document, such as may be accessible via a network, including by specifying a URL for accessibility via the Web, in an example embodiment. As alluded to above, in one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

It will, of course, also be understood that, although particular embodiments have just been described, claimed subject matter is not limited in scope to a particular embodiment or implementation. For example, one embodiment may be in hardware, such as implemented on a device or combination of devices, as previously described. Another embodiment may be implemented in software, such as implemented in an application layer, which itself is embodied in hardware. Likewise, although claimed subject matter is not limited in scope in this respect, one embodiment may comprise one or more articles, such as a storage medium or storage media that may have stored thereon instructions executable by a specific or special purpose system or apparatus. As one potential example, a special purpose computing platform may include input/output devices, such as a display, a keyboard or a mouse, or one or more memories, such as static random access memory, dynamic random access memory, flash memory, or a hard drive, although claimed subject matter is not limited in scope to this example. Although embodiments have been described with reference to accompanying drawings, it is to be noted that various changes or modifications, whether apparent to one of ordinary skill in the art or not, are to be understood as being intended to be subject matter within the scope of the claims that follow.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

It is further noted that the terms "type" and/or "like," if used, such as with a feature, structure, characteristic, and/or the like, using "optical" or "class" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being a "class-type" or being "optical-like," for example) if the minor variations are sufficiently minor so that the feature, structure, characteristic, and/or the like would still be considered to be predominantly present with such variations also present. Thus, continuing with this example, the terms class-type and/or class-like properties are necessarily intended to include class and/or optical properties respectively. Likewise, the terms optical-type and/or optical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if an accuracy measurement is produced and implementation of claimed subject matter refers to employing an accuracy measurement, but a variety of reasonable and alternative techniques to estimate accuracy exist, claimed subject matter is intended to cover those reasonable alternative techniques, even if those reasonable alternative techniques do not provide identical values, identical measurements or identical results, unless otherwise expressly indicated.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions pursuant to instructions from program software.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. An apparatus comprising: at least one device to execute instructions in which the at least one device includes at least one processor and at least one memory; the at least one device to fetch instructions from the at least one memory of the at least one device for execution on the at least one processor of the at least one device; the at least one device to execute the fetched instructions on the at least one processor of the at least one device; and the at least one device to store in the at least one memory of the at least one device results of having executed the fetched instructions on the at least one processor of the at least one device;
  wherein the instructions to be executed comprise instructions to perform heterogeneous object machine learning (ML) classification;
  wherein the instructions to be executed to perform heterogeneous object ML classification further to: obtain spectral measurements for a heterogeneous object to be in a form of one or more heterogeneous spectral objects, wherein the one or more heterogeneous spectral objects to comprise spectral measurement vectors to correspond to different classes, wherein the different classes to correspond to two or more respective heterogeneous object populations, and wherein the one or more heterogeneous spectral objects are to be rendered;
  ML classifier transform the to be obtained spectral measurements using an ML classifier transform operation to be generated from sample statistics for one or more combinations of one or more heterogeneous spectral objects to be respectively from the two or more respective heterogeneous object populations; and
  ML classify the heterogeneous object to be based at least in part on the to be ML classifier transformed spectral measurements of the heterogeneous object.

2. The apparatus of claim 1, wherein the instructions to be executed to be perform heterogeneous object ML classification are further to:
  measure performance of the ML classifier transform operation substantially in accordance with a classification error to be quantified by relative proximity of one or more to be known heterogeneous training class spectral object samples to one or more other to be known heterogeneous spectral object samples for the two or more respective heterogeneous object populations.

3. The apparatus of claim 1, wherein the instructions to be executed to perform heterogeneous object ML classification are further to:
  generate mean and variance sample statistics for different combinations of to be sampled to be known heterogeneous spectral objects for the two or more respective heterogeneous object populations.

4. The apparatus of claim 1, wherein, for the instructions to be executed to perform heterogeneous object ML classification:
  the ML classifier transform operation to comprise one or more linear transform operations.

5. The apparatus of claim 4, wherein, for the instructions to be executed to perform heterogeneous object ML classification:
  the ML classifier transform operation to produce one or more scalar value distributions to be in a dual space from the to be obtained spectral measurements of the heterogeneous object; the ML classifier linear transform operation further to result in the one or more scalar value distributions for the to be obtained spectral measurements to be sufficiently distinct to ML classify the heterogeneous object.

6. An apparatus comprising: at least one device to execute instructions in which the at least one device includes at least one processor and at least one memory; the at least one device to fetch instructions from the at least one memory of the at least one device for execution on the at least one processor of the at least one device; the at least one device to execute the fetched instructions on the at least one processor of the at least one device; and the at least one device to store in the at least one memory of the at least one device results of having executed the fetched instructions on the at least one processor of the at least one device;
  wherein the instructions to be executed to comprise instructions to perform machine learning (ML) heterogeneous object classification training;
  wherein the instructions to be executed to comprise instructions to perform ML heterogeneous object classification training further to: obtain spectral measurements from two or more heterogeneous objects, wherein at least one of the two or more heterogeneous objects to correspond to one of two or more respective heterogeneous object populations, wherein at least another of the two or more heterogeneous objects to correspond to another of the two or more respective heterogeneous object populations, wherein the spectral measurements for a heterogeneous object are to be in a form of one or more heterogeneous spectral objects, and wherein the heterogeneous spectral objects are to be rendered; respectively sample one or more to be known heterogeneous spectral objects from the two or more respective heterogeneous object populations, the one or more to be known heterogeneous objects respectively to be sampled as one or more training class samples for the two or more respective heterogeneous object populations, wherein the one or more to be known heterogeneous spectral objects to comprise spectral measurement vectors to correspond to different classes, wherein the different classes to correspond to the two or more respective heterogeneous object populations;
  process the obtained spectral measurements for the to be sampled one or more to be known heterogeneous spectral objects via partitioning thereof to generate sample statistics for the two or more respective heterogeneous object populations; and
  produce an ML classifier transform operation to be based at least in part on the to be generated sample statistics for the two or more respective heterogeneous object populations.

7. The apparatus of claim 6, wherein the instructions to be executed to comprise instructions to perform ML heterogeneous object classification training are further to:
  measure performance of the ML classifier transform operation substantially in accordance with a classification error to be quantified by relative proximity of one or more to be known heterogeneous training class spectral object samples, after being transformed substantially in accordance with the ML classifier transform operation, for the two or more respective heterogeneous object populations.

8. The apparatus of claim 6, wherein the instructions to be executed to comprise instructions to perform ML heterogeneous object classification training are further to:

generate mean and variance sample statistics for different combinations of to be sampled to be known heterogeneous spectral objects for the two or more respective heterogeneous object populations.

9. The apparatus of claim 6, wherein the instructions to be executed to comprise instructions to perform ML heterogeneous object classification training are further, combinatorically, for a respective combination of the different combinations, to:

produce an ML classifier linear transform operation with the mean and variance to be generated with respect to the to be sampled to be known heterogeneous spectral objects for the respective combination; compute performance of the ML classifier transform for the respective combination with respect to other combinations of the different combinations; select the mean and variance for the respective combination of the different combinations that is to perform adequately to produce sufficiently accurate ML classification to be quantified by relative proximity of one or more to be known heterogeneous training class spectral object samples after being transformed substantially in accordance with the ML classifier transform operation, for the two or more respective heterogeneous object populations; and produce an ML classifier with the selected mean and variance.

10. The apparatus of claim 9, wherein the instructions to be executed to comprise instructions to perform ML heterogeneous object classification training are further to:

process the obtained spectral measurements to generate sample statistics for $K(K-1)/2$ or fewer different combinations of the to be sampled to be known heterogeneous spectral objects of K respective heterogeneous object populations, where K is to comprise a positive integer greater than two; and produce $K(K-1)/2$ or fewer ML classifier transform operations from the to be obtained spectral measurements to be based at least in part on the to be generated sample statistics for the $K(K-1)/2$ or fewer different combinations.

11. An article comprising: a non-transitory storage medium having stored thereon instructions executable on at least one device in which the at least one device includes at least one processor and at least one memory; the at least one device to fetch the instructions from the at least one memory of the at least one device for execution on the at least one processor of the at least one device; the at least one device to execute the fetched instructions on the at least one processor of the at least one device; and the at least one device to store in the at least one memory of the at least one device results of having executed the fetched instructions on the at least one processor of the at least one device; wherein the instructions to be executed comprise instructions to perform heterogeneous object machine learning (ML) classification; wherein the instructions to be executed to comprise instructions to perform heterogeneous object ML classification further to: obtain spectral measurements for a heterogeneous object, to be in a form of one or more heterogeneous spectral objects wherein the one or more heterogeneous spectral objects to comprise spectral measurement vectors to correspond to different classes, wherein the different classes to correspond to two or more respective heterogeneous object populations, and wherein the one or more heterogeneous spectral objects are to be rendered; ML classifier transform the to be obtained spectral measurements using an ML classifier transform operation to be generated from sample statistics for one or more combinations of one or more heterogeneous spectral objects to be respectively from the two or more respective heterogeneous object populations; and ML classify the heterogeneous object to be based at least in part on the to be ML classifier transformed spectral measurements of the heterogeneous object.

12. The article of claim 11, wherein the instructions to be executed to comprise instructions to perform heterogeneous object ML classification are further to:

measure performance of the ML classifier transform operation substantially in accordance with a classification error to be quantified by relative proximity of one or more to be known heterogeneous training class spectral object samples to one or more other to be known heterogeneous spectral object samples for the two or more respective heterogeneous object populations.

13. The article of claim 11, wherein the instructions to be executed to comprise instructions to perform heterogeneous object ML classification are further to:

generate mean and variance sample statistics for different combinations of to be sampled to be known heterogeneous spectral objects for the two or more respective heterogeneous object populations.

14. The article of claim 11, wherein, for the instructions to be executed to comprise instructions to perform heterogeneous object ML classification:

a ML classifier transform operation to comprise one or more linear transform operations.

15. The article of claim 14, wherein, for the instructions to be executed to comprise instructions to perform heterogeneous object ML classification:

the ML classifier transform operation to produce one or more scalar value distributions to be in a dual space from the to be obtained spectral measurements of the heterogeneous object; and the ML classifier linear transform operation further to result in the one or more scalar value distributions for the to be obtained spectral measurements to be sufficiently distinct to ML classify the heterogeneous object.

16. An article comprising: a non-transitory storage medium having stored thereon instructions executable on at least one device in which the at least one device includes at least one processor and at least one memory; the at least one device to fetch the instructions from the at least one memory of the at least one device for execution on the at least one processor of the at least one device; the at least one device to execute the fetched instructions on the at least one processor of the at least one device; and the at least one device to store in the at least one memory of the at least one device results of having executed the fetched instructions on the at least one processor of the at least one device; wherein the instructions to be executed to comprise instructions to perform machine learning (ML) heterogeneous object classification training; wherein the instructions to be executed to comprise instructions to perform ML heterogeneous object classification training further to: obtain spectral measurements from two or more heterogeneous objects, wherein at least one of the two or more heterogeneous objects to correspond to one of two or more respective heterogeneous object populations, wherein at least another of the two or more heterogeneous objects to correspond to another of the two or more respective heterogeneous object populations, wherein the spectral measurements for a heterogeneous object are to be in a form of one or more heterogeneous spectral objects, and wherein the heterogeneous spectral objects are to be rendered; respectively sample one or more to be known heterogeneous spectral objects from the two or more respective heterogeneous object populations, the one or more to be known heterogeneous objects to be respectively sampled as one or more training class samples for the two or more respective heterogeneous object populations, wherein the one or more to be known heterogeneous spectral objects to comprise spectral measurement vectors to correspond to different classes, wherein the different classes to correspond to the two or more respective heterogeneous object populations; process the to be obtained spectral measurements for the to be sampled one or more to be known heterogeneous spectral objects via partitioning thereof to generate sample statistics for the two or more respective heterogeneous object populations; and produce an ML classifier transform operation to be based at least in part on the to be generated sample statistics for the two or more respective heterogeneous object populations.

17. The article of claim 16, wherein the instructions to be executed to comprise instructions to perform ML heterogeneous object classification training are further to:
   measure performance of the ML classifier transform operation substantially in accordance with a classification error to be quantified by relative proximity of one or more to be known heterogeneous training class spectral object samples, after being transformed substantially in accordance with the ML classifier transform operation, for the two or more respective heterogeneous object populations.

18. The article of claim 16, wherein the instructions to be executed to comprise instructions to perform ML heterogeneous object classification training are further to:
   generate mean and variance sample statistics for different combinations of to be sampled to be known heterogeneous spectral objects for the two or more respective heterogeneous object populations.

19. The article of claim 18, wherein the instructions to be executed to comprise instructions to perform ML heterogeneous object classification training are further, combinatorically, for a respective combination of the different combinations, to:
   produce an ML classifier linear transform operation with the mean and variance to be generated with respect to the to be sampled to be known heterogeneous spectral objects for the respective combination; compute performance of the ML classifier transform for the respective combination with respect to other combinations of the different combinations; select the mean and variance for the respective combination of the different combinations that is to perform adequately to produce sufficiently accurate ML classification to be quantified by relative proximity of one or more to be known heterogeneous training class spectral object samples after being transformed substantially in accordance with the ML classifier transform operation, for the two or more respective heterogeneous object populations; and produce an ML classifier with the selected mean and variance.

20. The article of claim 19, wherein the instructions to be executed to comprise instructions to perform ML heterogeneous object classification training are further to:
   process the to be obtained spectral measurements to generate sample statistics for $K(K-1)/2$ or fewer different combinations of the to be sampled to be known heterogeneous spectral objects of K respective heterogeneous object populations, where K is to comprise a positive integer greater than two; and produce $K(K-1)/2$ or fewer ML classifier transform operations from the to be obtained spectral measurements to be based at least in part on the to be generated sample statistics for the $K(K-1)/2$ or fewer different combinations.

* * * * *